(12) United States Patent
Takatsuka et al.

(10) Patent No.: US 7,827,207 B2
(45) Date of Patent: Nov. 2, 2010

(54) REPRODUCTION APPARATUS, REPRODUCTION METHOD, AND SIGNAL

(75) Inventors: Susumu Takatsuka, Tokyo (JP); Hideo Tsukazaki, Tokyo (JP); Junichiro Sakata, Tokyo (JP)

(73) Assignee: Sony Corporation, Tokyo (JP)

( * ) Notice: Subject to any disclaimer, the term of this patent is extended or adjusted under 35 U.S.C. 154(b) by 1209 days.

(21) Appl. No.: 11/432,428

(22) Filed: May 12, 2006

(65) Prior Publication Data
US 2006/0272479 A1 Dec. 7, 2006

(30) Foreign Application Priority Data
May 13, 2005 (JP) .............................. 2005-140903
Jul. 7, 2005 (JP) .............................. 2005-199411

(51) Int. Cl.
*G06F 17/30* (2006.01)
(52) U.S. Cl. ...................................... 707/802; 707/769
(58) Field of Classification Search ................. 707/769, 707/802, 999.1
See application file for complete search history.

(56) References Cited

U.S. PATENT DOCUMENTS

| 6,622,223 | B2 * | 9/2003 | Igami et al. ................. 711/156 |
|---|---|---|---|
| 2001/0036112 | A1 * | 11/2001 | Igami et al. ................. 365/200 |
| 2004/0001085 | A1 * | 1/2004 | Iwasaki ....................... 345/738 |
| 2005/0158018 | A1 * | 7/2005 | Sawada ........................ 386/46 |
| 2005/0276571 | A1 * | 12/2005 | Miyajima et al. ............. 386/46 |

FOREIGN PATENT DOCUMENTS

| JP | 2002-74911 | 3/2002 |
|---|---|---|
| JP | 2002-183152 | 6/2002 |
| JP | 2003-259310 | 9/2003 |

OTHER PUBLICATIONS

Masakazu Honda, "Thorough explanation Windows Media 9 series", vol. 26, No. 12, ASCII Co., Ltd., Japan, Dec. 1, 2002, p. 228-231.

* cited by examiner

*Primary Examiner*—Cheryl Lewis
(74) *Attorney, Agent, or Firm*—Oblon, Spivak, McClelland, Maier & Neustadt, L.L.P.

(57) ABSTRACT

A reproduction apparatus, a reproduction method, and a reproduction program that allow a desired content to be easily and quickly selected from those recorded on a recording medium. The reproduction apparatus includes a reproduction section that reproduces first content data, an input section that accepts an operation to search for content information data associated with the first content data, and a control section that searches the content information data when the first content is being reproduced and that controls the reproduction section to reproduce at least a part of second content data corresponding to the content information data.

17 Claims, 44 Drawing Sheets

Fig. 5

| CONTENT ID | ALBUM ID | GENRE ID | ARTIST ID | REPRODUCTION HISTORY | RANKING INFORMATION |
|---|---|---|---|---|---|
| C_1 | Al_1 | G_1 | Ar_1 | PT_1 | R_1 |
| C_2 | Al_1 | G_1 | Ar_1 | PT_2 | R_2 |
| C_3 | Al_2 | G_1 | Ar_1 | PT_3 | R_3 |
| C_4 | Al_3 | G_2 | Ar_2 | PT_4 | R_4 |
| C_5 | Al_3 | G_2 | Ar_2 | PT_5 | R_5 |

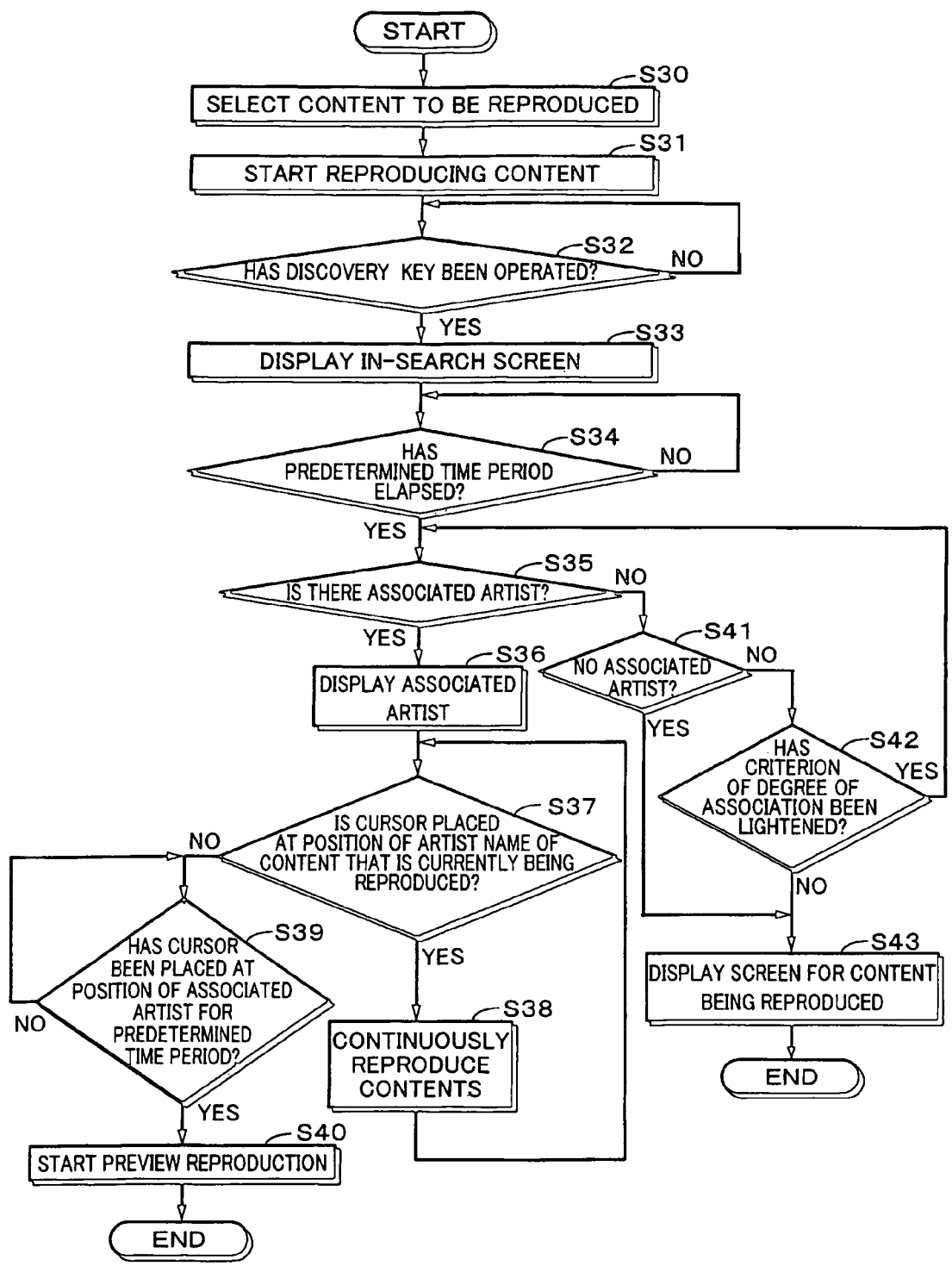

Fig. 13
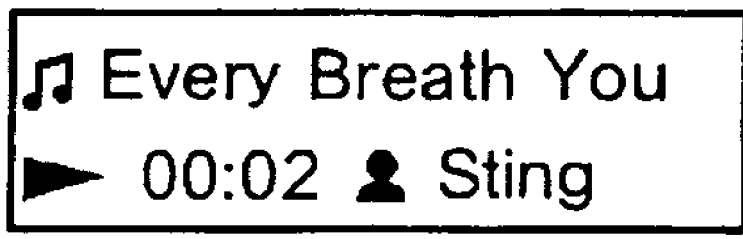

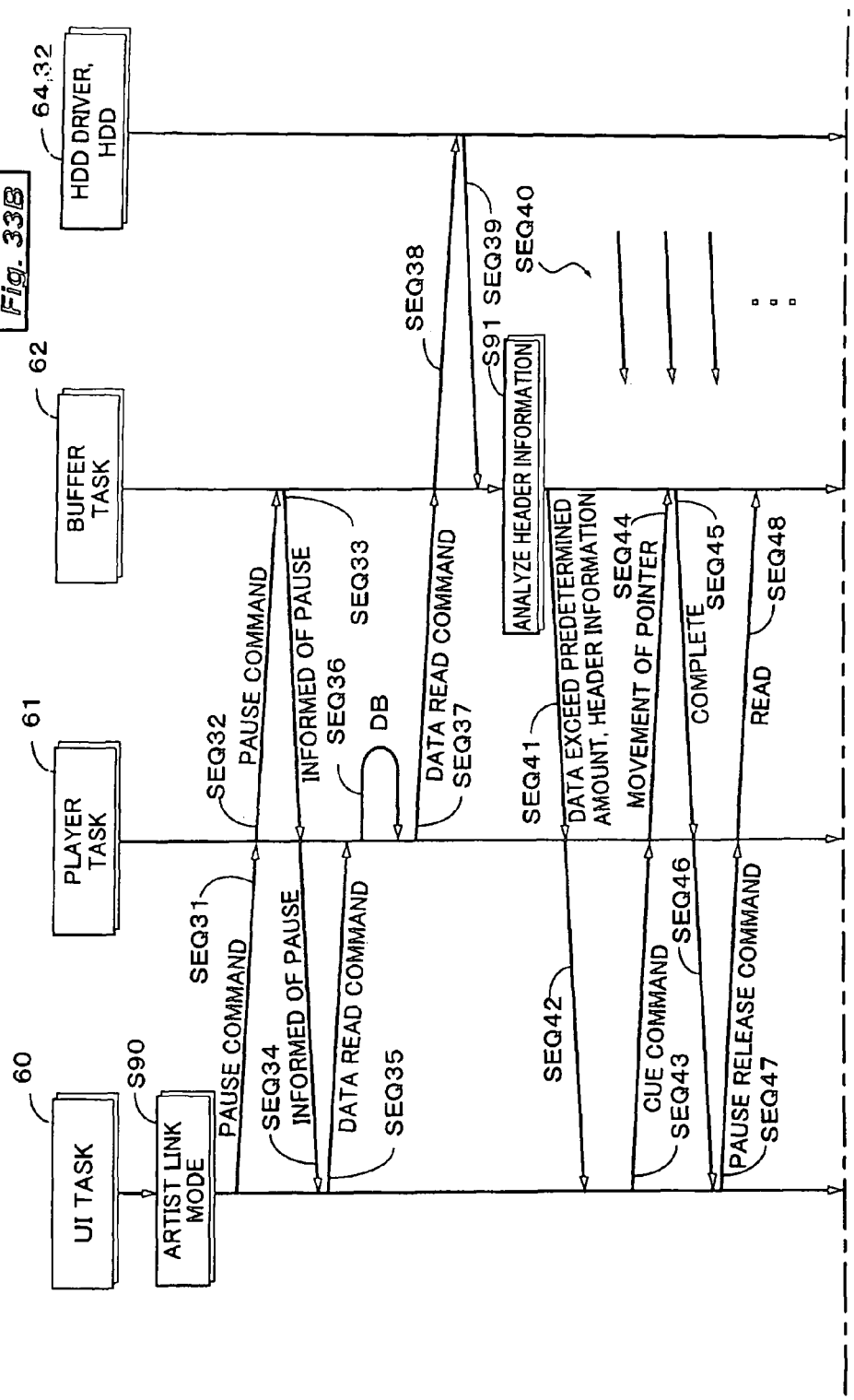

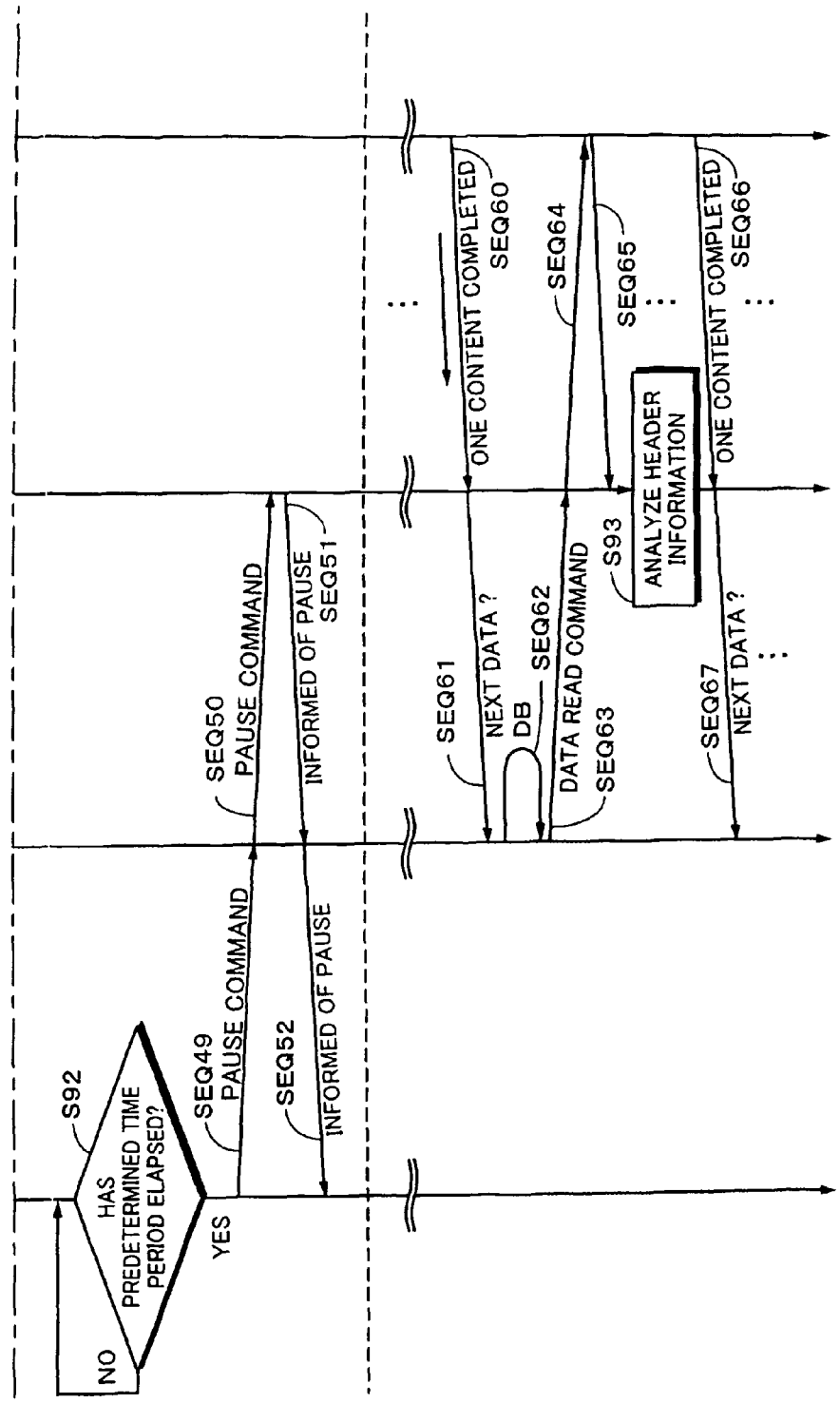

Fig. 39

| CONTENT ID | START POSITION OF REGION TO BE PREVIEW-REPRODUCED |
|---|---|
| xxx01 | 00'30" |
| xxx02 | 01'00" |
| yyy05 | 00'45" |
| ⋮ | ⋮ |

REPRODUCTION APPARATUS, REPRODUCTION METHOD, AND SIGNAL

CROSS-REFERENCE TO RELATED APPLICATION

The present application is related to and claims priority to JP 2005-140903 filed in the Japan Patent Office on May 13, 2005, and JP 2005-199411 filed in the Japan Patent Office on Jul. 7, 2005, the entire contents of each of which are hereby incorporated herein by reference.

BACKGROUND OF THE INVENTION

1. Field of the Invention

The present invention relates to a reproduction apparatus, a reproduction method, and a reproduction program that select one from a plurality of tracks of audio data recorded on a record medium and reproduce the selected track of audio data.

2. Discussion of the Background

In recent years, many portable reproduction apparatuses that use a small hard disk drive as a record medium have been manufactured. Small hard disk drives have a record capacity ranging from several GBs (gigabytes) to several ten GBs that allow a large number of tracks ranging from several hundred tracks to several thousand tracks to be recorded. These reproduction apparatuses have come into widespread use. Since these reproduction apparatuses are contained in a small and light housing and contents of for example music data of songs are recorded as tracks on a record medium, the users can enjoy music that the apparatuses reproduce from the record medium outdoors.

When a large number of tracks are recorded on a record medium and used, an interface that allows the user to quickly select his or her desired track song and designate the selected track song is required. A method that uses a rotation wheel or multi-directional keys that designate up and down directions or up, down, left, and right directions to move a cursor on a track list displayed on a display section and select a user's desired track has been used. In this method, when for example a reproduction key is pressed, a track corresponding to the cursor position is reproduced.

When a large number of tracks are recorded on the record medium, the user may not know all album names and track names (song names) of albums and tracks recorded on the record medium. In addition, sometimes, the user may know melodies and so forth, but not text information such as track names. Moreover, these portable reproduction apparatuses are often used while the users are walking. Thus, it may be difficult for the users to select their desired tracks only with text information.

In this case, the user needs to have the apparatus reproduce each track recorded on the record medium to select his or her desired track. This operation is very troublesome.

SUMMARY OF THE INVENTION

Therefore, an object of the present invention is to provide a reproduction apparatus, a reproduction method, and a reproduction program that allow a desired content to be easily and quickly selected from those recorded on a record medium.

In one embodiment a novel reproduction apparatus of the present invention includes a reproduction section that reproduces content data; an input section that is capable of starting an artist link mode that searches for associated content data; a control section that causes the reproduction section to reproduce a part of content data associated with a reproducing content data when a predetermined operation of the operation section is performed while the reproducing content data is being reproduced.

In one embodiment a novel reproduction apparatus of the present invention includes a reproduction section that reproduces content data; a display section that displays a plurality of pieces of content identification data that identify content data; a first input section configured to move a cursor displayed on the display section according to an input; and a control section that causes the reproduction section to reproduce a part of content data corresponding to content identification data when it has been determined that the cursor has been placed at the position of the same piece of the content identification data for a predetermined time period or longer.

In one embodiment a novel reproduction method of the present invention includes displaying a plurality of pieces of content identification data that identify content data on a display section; determining whether a cursor moved corresponding to an input has been placed at the position of the same piece of the content identification data for a predetermined time period; and when it has been determined that the cursor has been placed at the position of the same content identification data for the predetermined time period, starting reproducing a part of content data corresponding to the content identification data.

In one embodiment a novel reproduction program of the present invention causes a computer device to execute a reproduction method including displaying a plurality of pieces of content identification data that identify content data on a display section; determining whether a cursor moved corresponding to an input has been placed at the position of the same piece of the content identification data for a predetermined time period; and when it has been determined that the cursor has been placed at the position of the same content identification data for the predetermined time period, starting reproducing a part of content data corresponding to the content identification data.

In one embodiment, as described above, when content data of the selected target artist and content data of an associated artist of the target artist are automatically preview-reproduced, the user can search for his or her desired content data without the need to perform a complicated operation. Thus, while the user is operating the reproduction apparatus outdoors, he or she can search for his or her desired content data without the need to watch data displayed on the display section.

As described above, according to an embodiment of the present invention, a plurality of pieces of content identification data that identify content data are displayed on a display section. It is determined whether a cursor moved corresponding to an input has been placed at the position of the same piece of the content identification data for a predetermined time period. When it has been determined that the cursor has been placed at the position of the same content identification data for the predetermined time period, the reproduction for a part of the content data corresponding to the content identification data is started. Thus, only by moving the cursor, content data can be preview-reproduced.

According to an embodiment of the present invention, as described above, a plurality of pieces of content identification data that identify content data are displayed on a display section. It is determined whether a cursor moved corresponding to an input has been placed at the position of the same piece of the content identification data for a predetermined time period. When it has been determined that the cursor has been placed at the position of the same content identification data for the predetermined time period, the reproduction for a part of content data corresponding to the content identification data is started. Thus, as an effect of the present invention, only by moving the cursor, content data can be preview-reproduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a schematic diagram showing an example of the structure of an attribute information table.

FIG. 12 is a flow chart showing an example of a process in the case that the artist link mode is started while particular content data are being reproduced.

FIG. 13 is a schematic diagram showing an example of a normal reproduction screen.

FIGS. 33A and 33B show an example of a sequence of the preview reproduction in a second preview reproduction control method.

FIG. 39 is a schematic diagram showing an example of a table of information about a region to be preview-reproduced.

DESCRIPTION OF THE PREFERRED EMBODIMENTS

Next, an embodiment of the present invention will be described in the following order.
1. System according to an embodiment of the present invention
  1-1. System to which the present invention is applied
  1-2. Structure of reproduction apparatus
  1-3. Outline of operation of preview reproduction
  1-4. Outline of operation of artist link mode
2. More specific operation of artist link mode and GUI
3. Control method of preview reproduction
  3-1. File structure
  3-2. First preview reproduction control method
  3-2-1. Flow of process
  3-2-2. Operation that changes preview reproduction mode to normal reproduction mode
  3-3. Second preview reproduction control method
  3-3-1. Flow of process
  3-3-2. Operation that changes preview reproduction mode to normal reproduction mode
4. Modification of embodiment of present invention
  4-1. Obtainment of region to be preview-reproduced from outside
  4-2. Another system of modification of embodiment
5. Another modification of embodiment of present invention

1. System According to an Embodiment of the Present Invention

1-1. System to which the Present Invention is Applied

Figure 1:
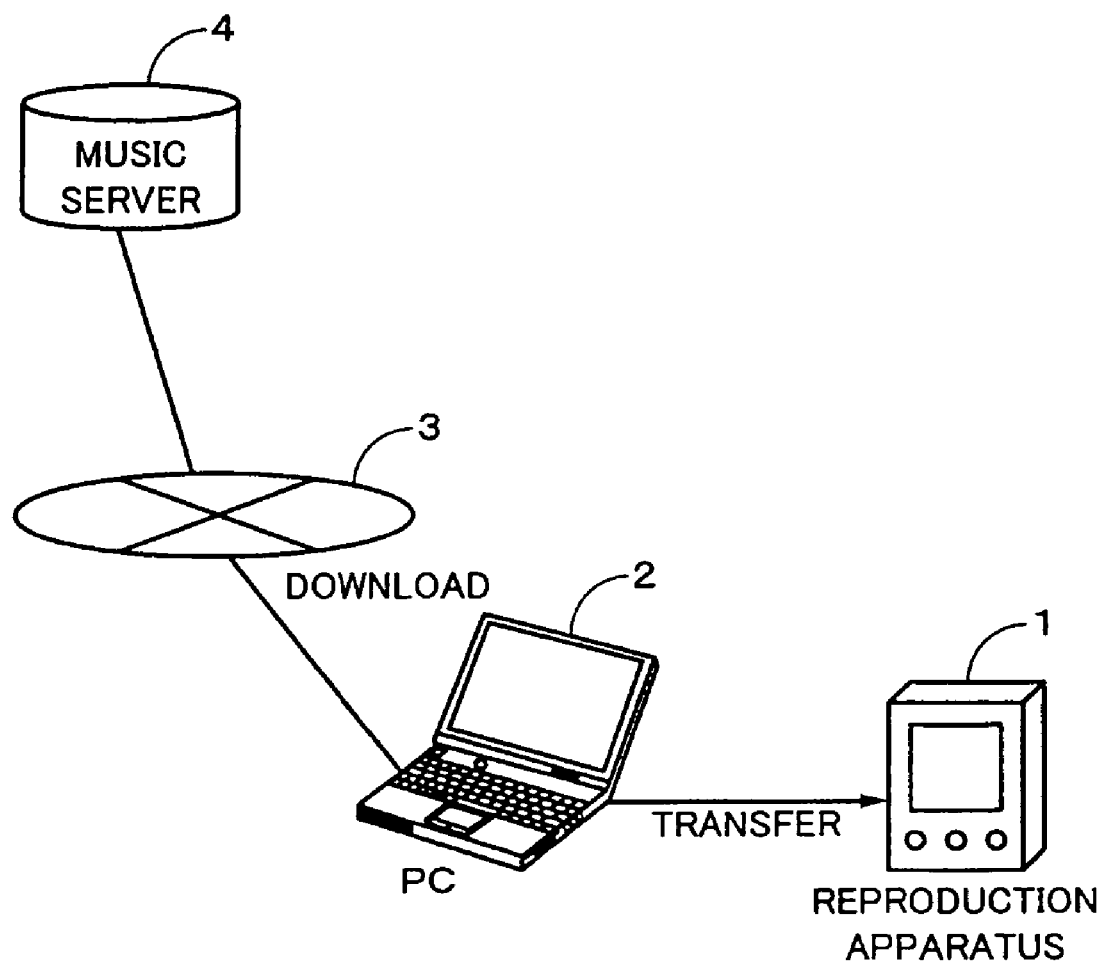
FIG. 1 shows an example of an application of which a reproduction apparatus according to an embodiment of the present invention is used.

FIG. 1 shows an application to which a reproduction apparatus 1 according to an embodiment of the present invention is used. The reproduction apparatus 1 is a portable device (PD), which is contained in a small and light housing. The reproduction apparatus 1 uses a hard disk drive, flash memory, or other storage as a record medium. The reproduction apparatus 1 reproduces content data from the record medium. The reproduction apparatus 1 has an interface that can communicate with a personal computer 2 (hereinafter referred to as the PC 2). The interface is for example a USB (Universal Serial Bus) or IEEE 1394 (Institute Electrical and Electronics Engineers 1394) interface. In this example, the reproduction apparatus 1 and the PC 2 are connected with the USB as a communication interface.

Next, it is assumed that content data recorded on the record medium of the reproduction apparatus 1 are music data, namely audio data. A unit of music data is also referred to as a track.

A music server 4 provides services such as downloading of content data through the Internet 3. The music server 4 manages content data for example by associating them with attribute information such as artists, albums that contain the content data, and music genres. It is preferred that the attribute information with which content data are associated contain melodies and tempos of music data. In addition, the music server 4 also manages ranking information according to a download count of content data and associated information among artists (this associated information is referred to as artist link information). The music server 4 provides services that use these information through the Internet 3. The music server 4 adds for example these ranking information, artist link information, and so forth to the foregoing attribute information and provides the resultant data to the user. The attribute information may contain release dates of albums and content data.

The user connects for example the PC 2 to the Internet 3 and causes the PC 2 to download content data from the music server 4 through the Internet 3. The downloaded content is stored in for example the hard disk drive of the PC 2. In addition, the user connects the reproduction apparatus 1 and the PC 2 with a USB cable and transfers the content data stored in the hard disk drive of the PC 2 to the reproduction apparatus 1. The reproduction apparatus 1 records the transferred content data to an internal record medium. Thereafter, the user disconnects the PC 2 from the reproduction apparatus 1. The user can use the reproduction apparatus 1 outdoors, reproduce content data from the record medium, and enjoy the reproduced content data.

When the content data are downloaded from the music server 4, if ranking information is obtained as attribute information along with the content data, the user can easily search for currently popular contents. When content data are downloaded, if artist link information can be obtained as attribute information along with the content data, the user can know other artists with which the artist of the selected content is associated. As a result, the user can easily search for contents of the associated artists. When the history of content data that were reproduced by the reproduction apparatus 1 is stored, the user can easily search for his or her favorite contents.

1-2. Structure of Reproduction Apparatus

Figure 2:
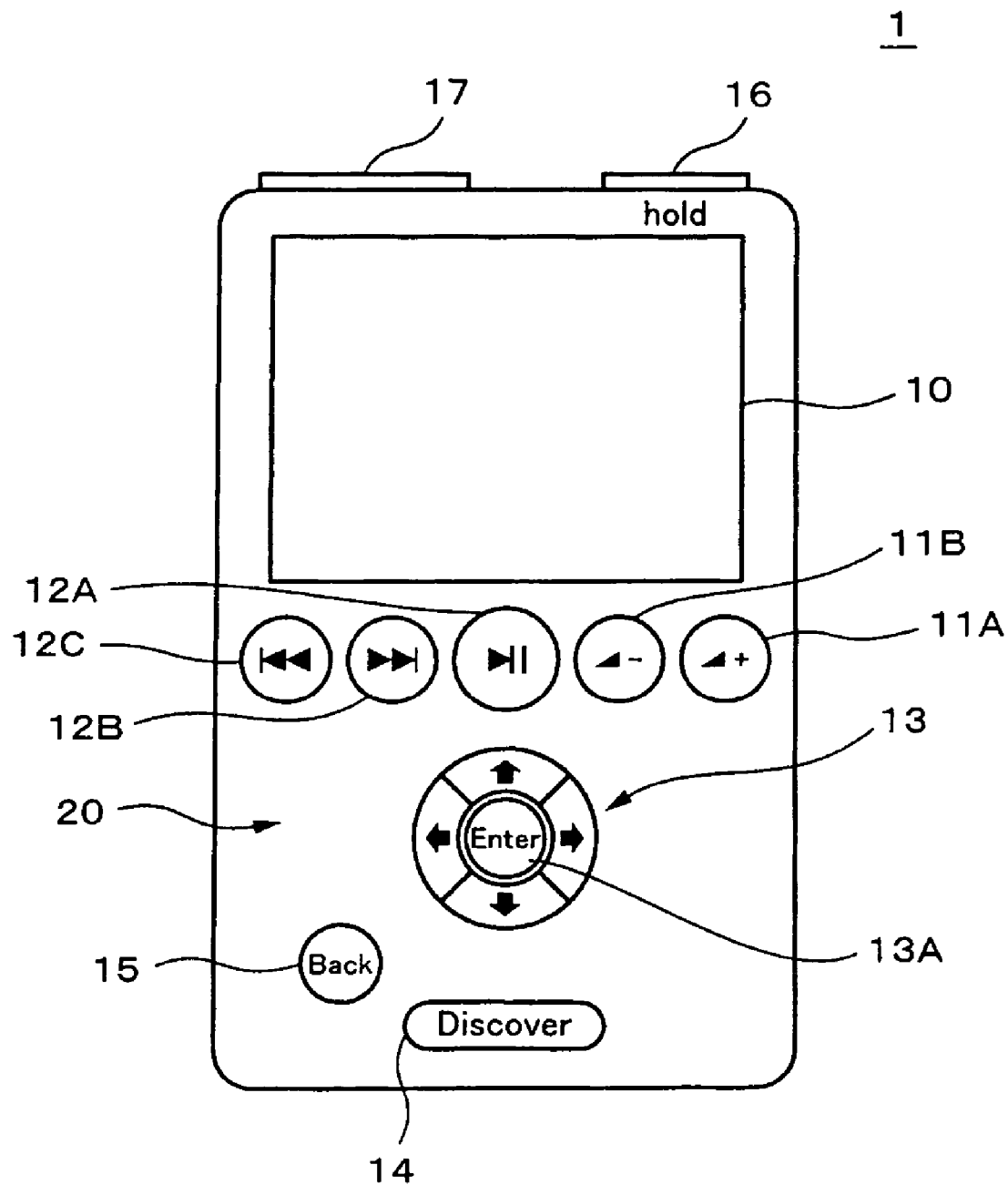
FIG. 2 is an external view showing an example of the portable reproduction apparatus according to the embodiment of the present invention.

FIG. 2 shows an example of the appearance of the portable reproduction apparatus 1 according to this embodiment of the present invention. Disposed on the front of the reproduction apparatus 1 are mainly a display section 10 and an operation section 20. The display section 10 is composed of for example an LCD (Liquid Crystal Display) and displays information to the user. The operation section 20 has a plurality of keys and accepts a user's operation therewith. The display section 10 can perform a display control in the accuracy of for example one dot. The display section 10 can display text, simple figures, icons, and so forth.

Disposed at the top of the apparatus are a hold switch 16 and a connector section 17. The hold switch 16 enables or disables the operation of the operation section 20. The connector section 17 has a connector and a headphone terminal. The connector is used to exchange digital data between the reproduction apparatus 1 and an external device, for example the PC 2. The headphone terminal is used to output an analog audio signal reproduced by the reproduction apparatus 1.

Next, the keys disposed on the operation section 20 will be described. When each key is pressed, a control signal corresponding thereto is output. Each key can be assigned different functions corresponding to the durations of the pressing thereof. For example, different functions can be assigned to a long pressing operation of which the duration of the pressing of the key is for example equal to or longer than a predetermined time period and a short pressing operation of which the duration of the pressing of the key is for example shorter than the predetermined time period. When the short pressing operation is performed for a key, at timing of which the key is released in a predetermined time period after the key is pressed, the assigned function is executed. In contrast, when the long pressing operation is performed for a key, if the key is continuously pressed for a predetermined time period or longer, the assigned function is executed. When only the short pressing operation is defined for a key, at the time the key is pressed the assigned function is executed. When a key is pressed for a predetermined time period or longer, this operation can be defined as if the key were continuously pressed (referred to as the key repeat).

Keys 11A and 11B are volume keys that increase and decrease the reproduction sound volume of content data, respectively. Whenever the key 11A or 11B is shortly pressed, the sound volume varies by one step. The key repeat is valid with the keys 11A and 11B.

Keys 12A, 12B, and 12C are keys that mainly control the reproduction for content data. Whenever the key 12A is shortly pressed, it causes the reproduction apparatus 1 to alternately reproduce content data and pause the reproduction. When the key 12A is longly pressed, the operation mode of the reproduction apparatus 1 is changed to a sleep mode. When the key 12B is shortly pressed, it causes the reproduction apparatus 1 to reproduce the next content data. When the key 12B is longly pressed, it causes the reproduction apparatus 1 to perform the fast forward reproduction for content data that are currently being reproduced. Likewise, when the key 12C is shortly pressed, it causes the reproduction apparatus 1 to reproduce the preceding content data. When the key 12C is longly pressed, it causes the reproduction apparatus 1 to perform the fast reverse reproduction for content data that are being reproduced.

A key 13 is a five-direction key set composed of an enter key 13A at the center and arrow keys that represent up, down, left, and right and that are disposed around the enter key 13A (these arrow keys are referred to as an up direction key, a down direction key, a left direction key, and a right direction key) with which an operation is designated on a screen displayed on the display section 10.

When the display section 10 displays a content that the reproduction apparatus 1 is reproducing, whenever the enter key 13A is shortly pressed, it causes the reproduction apparatus 1 to alternately reproduce the content and pause the reproduction. When the display section 10 does not display a content and when the enter key 13A is shortly pressed, it causes a selected item on the display section 10 to be confirmed. When the display section 10 displays a list of contents, when the enter key 13A is pressed, it causes the reproduction apparatus 1 to reproduce all contents in the list.

When the up direction key and the down direction key of the key 13 are shortly pressed, they cause an item selected on the display section 10 to be moved upward and downward, respectively. When the up direction key and the down direction key are longly pressed, they cause a list displayed on the display section 10 to be rapidly scrolled upward and downward, respectively. Until the long pressing function is executed, the key repeat of the up direction key and down direction key is valid. Thus, with the up direction key and the down direction key, data displayed on the screen can be scrolled upward and downward, respectively.

When the left direction key and the right direction key of the key 13 are shortly pressed, they cause an item selected on the display section 10 to be moved leftward and rightward, respectively. When data displayed on the display section 10 have a plurality of pages and when the left direction key and the right direction key are pressed, they cause the current page to be changed to the previous page and the next page, respectively. For the left direction key and the right direction key, the long pressing operation is not defined. In addition, the key repeat is valid with the left direction key and the right direction key.

When a discovery key 14 is shortly pressed, it causes an artist link function that uses artist link information to be called. When the discovery key 14 is longly pressed, it causes the artist link function to be called and all contents of all artists displayed on the display section 10 to be reproduced. Details of the artist link function will be described later.

When a key 15 is shortly pressed, it causes the history of operations for the reproduction apparatus 1 to be traced back. When the key 15 is longly pressed, it causes a top menu to be displayed on the display section 10.

The functions of the keys 13-15 are just examples. Thus, the functions of the keys 13-19 are not restricted to these examples. The keys 13-15 can be assigned functions corresponding to operation states by software.

Figure 3:
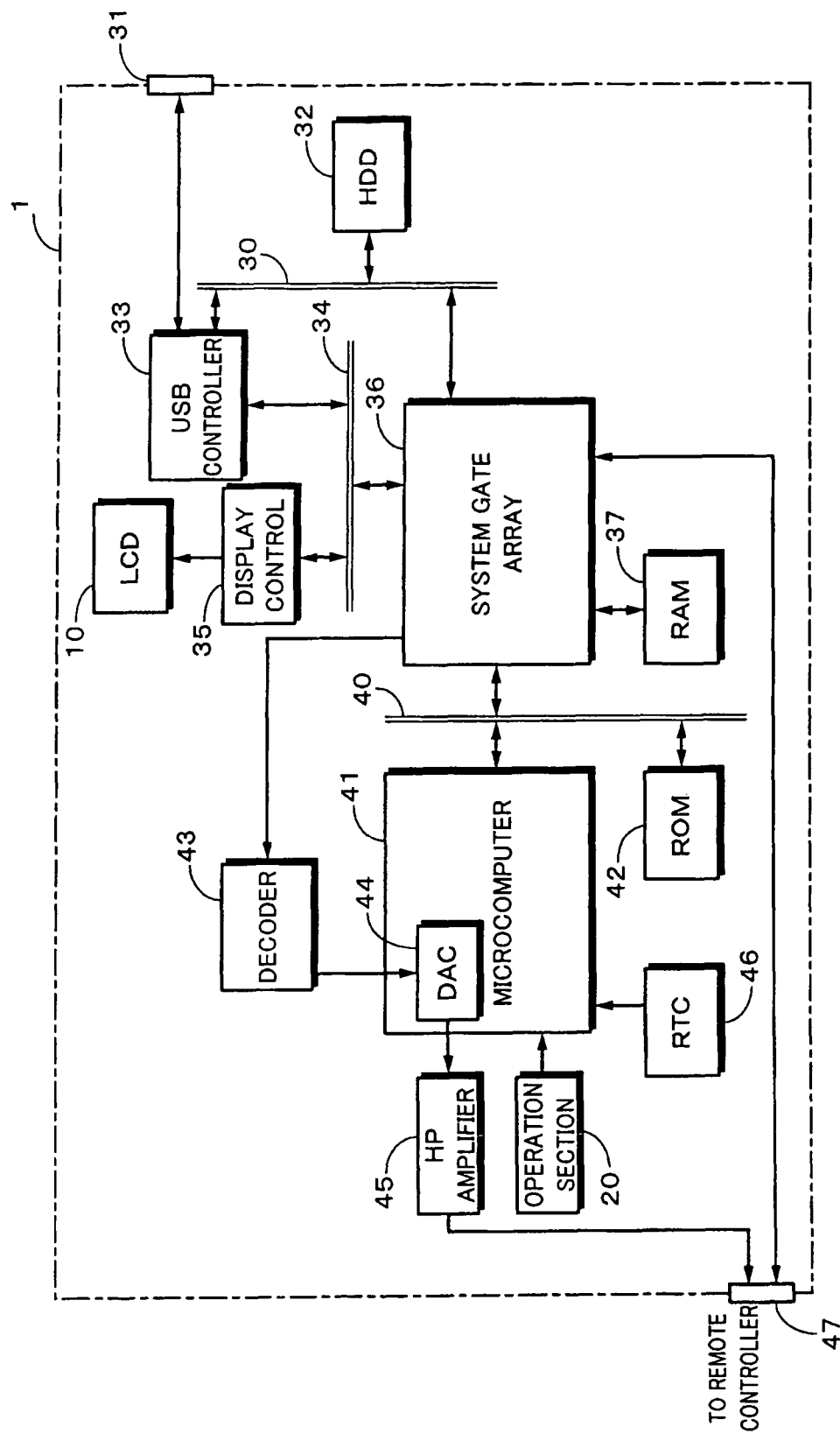
FIG. 3 is a block diagram showing an example of the structure of the reproduction apparatus.

FIG. 3 shows an example of the structure of the reproduction apparatus 1. In the example shown in FIG. 3, the reproduction apparatus 1 has three buses 30, 34, and 40. Connected to the bus 30 are a hard disk drive (HDD) 32, a USB (Universal Serial Bus) controller 33, and a system gate array 36. The bus 30 mainly transfers content data. Connected to the USB controller 33 is a USB connector 31. The USB controller 33 controls communication with an external device connected to the USB connector 31.

Connected to the bus 34 are the USB controller 33, a display control section 35, and the system gate array 36. The bus 34 mainly transfers commands. The display control section 35 drives the display section 10 composed of for example an LCD according to a display control signal supplied thorough the bus 34 and displays a screen according to the display control signal on the display section 10.

Connected to the bus 40 are a microcomputer 41, the system gate array 36, and a ROM (Read Only Memory) 42. The bus 40 mainly transfers commands. Connected to the microcomputer 41 are a real time clock (RTC) 46 and the operation section 20. The operation section 20 generates control signals according to the foregoing keys 11 to 15 and supplies them to the microcomputer 41. The microcomputer 41 controls the whole reproduction apparatus 1 according to the control signals supplied from the operation section 20 and according to a program pre-stored in for example the ROM 42. The microcomputer 41 generates a predetermined display control signal according to the program.

The microcomputer 41 has an internal D/A conversion (DAC) section 44 that converts audio data supplied from a decoder 43 that will be described later into an analog audio signal and supplies the analog audio signal to a headphone (HP) amplifier 45.

The ROM 42 is a rewritable memory, for example an EEPROM (Electrically Erasable Programmable Read Only Memory) that allows a stored program to be updated. An update program is supplied from for example an external computer device through the USB connector 31.

Since the reproduction apparatus 1 is controlled by the microcomputer 41 according to a program stored in the ROM 42, the reproduction apparatus 1 can be substantially considered as a computer device.

The system gate array 36 controls the exchanging of data and commands among the buses 30, 34, and 40. Connected to the system gate array 36 are a RAM 37 and the decoder 43 that decodes audio data that have been compression-encoded. The RAM 37 is used as a work area for the microcomputer 41. In addition, the RAM 37 is also used as a buffer for audio data that the decoder 43 decodes. The RAM 37 has a storage capacity of for example 16 MBs (Megabytes). A predetermined area of 12 MB of this storage capacity is allocated as a buffer memory area for audio data.

Connected to a remote control terminal 47 is a remote control commander that remotely and non-wirelessly controls the reproduction apparatus 1 and that has a headphone terminal. An analog audio signal that is output from the headphone amplifier 45 is supplied to the remote control terminal 47. In addition, the system gate array 36 and the remote control terminal 47 are connected. A control signal according to an operation of the remote control commander is input from the remote control terminal 47 and supplied to the microcomputer 41 through the system gate array 36 and the bus 40.

The USB terminal 31 and the remote control terminal 47 are disposed in the connector section 17 shown in FIG. 2. The hold switch 16 (not shown) is connected to the microcomputer 20.

In the foregoing description, the reproduction apparatus 1 and the PC 2 are non-wirelessly connected. However, the present invention is not limited to this example. Instead, for example a wireless communication I/F (not shown) that controls a wireless communication may be connected to the bus 30 to exchange commands between the reproduction apparatus 1 and the PC 2 and transfer content data from the PC 2 to the reproduction apparatus 1.

Figure 4:
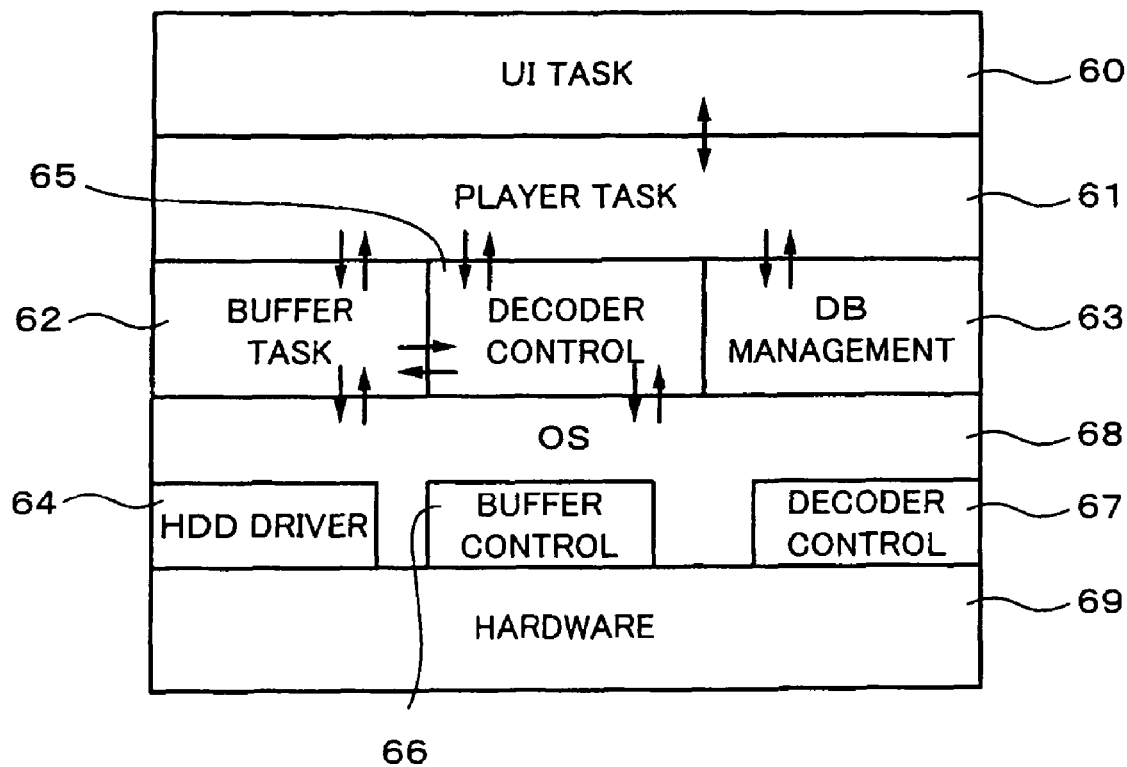
FIG. 4 is a conceptual schematic diagram showing the architecture applicable to the reproduction apparatus.

FIG. 4 shows an outline of the architecture applicable to the reproduction apparatus 1. An UI (User Interface) task 60 serves as a user interface that displays data on the display section 10 and generates for example a control signal according to an operation of the operation section 20. For example, the UI task 60 controls a cursor indication 70 (see FIGS. 7A-7D) according to an operation of the key 13 of the operation section 20 and generates control commands according to operations of the keys 12A to 12C with which the reproduction of audio data is controlled. There are reproduction control commands such as play (reproduction), stop (reproduction stop), feed forward (fast forward reproduction), rewind (fast reverse reproduction), cue (forward to predetermined position without reproduction), review (rewind to predetermined position without reproduction), pause (reproduction pause), and so forth.

A player task 61 is placed under the UI task 60. The player task 61 serves to control the reproduction for content data. The player task 61 communicates with a database (that will be described later) according to a command received from the UI task 60, knows a content to be reproduced, and issues a reproduction control command for the content data to a lower task. In addition, the player task 61 always knows the current play mode, returns the play mode to the UI task 60, and controls the reproduction for content data according to the play mode.

In this example, the play mode is an operation mode with respect to the reproduction order of contents. The play mode includes for example a normal mode, a shuffle mode, and so forth. In the normal mode, contents are reproduced according to a list. In the shuffle mode, contents are reproduced at random.

A buffer task 62, a database (DB) management task 63, and a decoder control task 65 are placed under the player task 61. The buffer task 62 controls the reading and writing of data from and to a buffer memory area of the RAM 37 and controls the reading of audio data from the hard disk drive 32. The buffer task 62 analyzes header information of audio data stored in the buffer memory. The buffer memory is controlled by the buffer task 62 as a ring buffer of which the start address and the end address are logically connected.

The database management task 63 manages content data recorded in the hard disk drive 32. The database management task 63 associatively manages identification information (ID) that identifies content data recorded in the hard disk drive 32, information that represents the record locations of the content data, and attribute information of the content data. The database management task 63 also manages artist link information. Details of the database managed by the database management task 63 will be described later.

The decoder control task 65 controls a decode process of audio data that the decoder 43 performs. The control by the decoder control task 65 is interlocked with the process of for example the buffer task 62.

An OS (Operating System) 68 totally manages upper tasks such as the UI task 60, the player task 61, the buffer task 62, the decoder control task 65, and the database management task 63. In addition, the OS 68 provides each task with basic software functions. The OS 68 provides each of the upper tasks with for example a file system that manages files recoded in the hard disk drive 32. The file system manages the record area of the hard disk drive 32 according to for example logical addresses, manages files in the hard disk drive 32, and provides a scheme for reading and writing data from and to the hard disk drive 32.

In addition, the OS 68 manages each section of hardware that composes the reproduction apparatus 1 and performs an intermediate process between the upper tasks and hardware 69 of the reproduction apparatus 1. The OS 68 has for example a HDD driver 64 that controls the hard disk drive 32, a buffer control section 66 that controls the reading and writing of data from and to the buffer memory area of the RAM 37, and a decoder control section 67 that controls the decoder 43.

The OS 68 and the tasks 60 to 65 shown in FIG. 4 are accomplished by operations of the microcomputer 41 according to programs stored or recorded in the ROM 42 and/or the hard disk drive 32.

When the reproduction apparatus 1 and the PC 2 are connected with the USB cable in this structure, the USB controller 33 communicates with the PC 2 so that the PC 2 recognizes the reproduction apparatus 1 as a removable hard disk drive. In other words, the PC 2 can record content data stored in the hard disk drive of the PC 2 to the hard disk drive 32 of the reproduction apparatus 1 with a file copy function that the OS of the PC 2 provides.

The PC 2 transmits content data and commands through the USB cable. These content data and commands are received by the USB controller 33. The USB controller 33 transfers the received content data to the hard disk drive 32 through the bus 30. The transferred content data are written to the hard disk drive 32. On the other hand, the received commands are supplied from the USB controller 33 to the microcomputer 41 through the system gate array 36.

Next, a process that reproduces a content will be described. For example, the microcomputer 41 references the database of contents recorded in the hard disk drive 32 and generates a display control signal that causes a list of contents to be displayed. The display control signal is supplied to the display control section 35 through the system gate array 36 and the bus 34. The display control section 35 converts the display control signal into a drive signal that drives the display section 10. The drive signal is supplied to the display section 10. The display section 10 displays the list of content data that can be reproduced according to the display control signal.

The user operates the operation section 20 according to data displayed on the display section 10 and selects content data that he or she wants to reproduce. A control signal according to the operation is output from the operation section 20. The microcomputer 41 monitors the control signal outputted from the operation section 20. When the microcomputer 41 receives the control signal that causes the content data to be reproduced, the microcomputer 41 issues a command that causes the content data to be read. This command is sent to the hard disk drive 32 through the system gate array 36 and the bus 30.

The content data that are read from the hard disk drive 32 are supplied to the system gate array 36 through the bus 30. The system gate array 36 stores the supplied content data in the buffer memory area of the RAM 37. In addition, the system gate array 36 reads a predetermined amount of content data from the buffer memory area of the RAM 37 at a time and transfers the content data to the decoder 43. The microcomputer 41 monitors the amount of content data stored in the buffer memory area of the RAM 37. When the amount of stored data became a predetermined amount or below, the microcomputer 41 issues a command to the hard disk drive 32 through the system gate array 36 and the bus 30 to read content data from the hard disk drive 32.

The decoder 43 decodes the transferred content data and transfers the decoded data as base band audio data to the microcomputer 41. When necessary, the microcomputer 41 performs a predetermined sound process for the audio data transferred from the decoder 43. The DAC section 44 converts the audio data as a digital signal into an analog audio signal. The analog audio signal is supplied to the HP amplifier 45. The HP amplifier 45 performs an amplification process for the analog audio signal and supplies the amplified signal to the remote control terminal 47.

Next, the database that manages content data recorded in the hard disk drive 32 will be described. The database is managed by the foregoing database management task 63. FIG. 5 shows an example of the structure of an attribute information table with which attribute information of content data of the database is managed. In the example shown in FIG. 5, each record of the attribute information table has field "content ID," field "album ID," field "genre ID," field "artist ID," field "reproduction history," and field "ranking information."

In the example shown in FIG. 5, a value stored in each field of each record is pointer information of real data as an ID. For example, each field describes pointer information to a record of another table that describes real data. As a whole, a relational database is structured. Content ID is a unique value for each content. Content ID associates each record of the attribute information table with real content data. Instead, real data may be described in each field other than field "content ID."

Field "reproduction history" in the attribute information table is incremented by 1 whenever content data associated with the record is reproduced. It is preferred that ranking information be updated at a predetermined timing. For example, when new content data are downloaded from the music server 4 to the PC 2, ranking information of content data stored in the PC 2 is also downloaded. When content data are transferred from the PC 2 to the reproduction apparatus 1, ranking information may be also transferred and the database may be updated therewith.

The database management task 63 also manages the artist link information. The artist link information is for example what artist A is associated with information about artists B, C, and so forth who are associated with artist A. For example, when artist A created album Z in association with artist B and artist C, artist B and artist C are associated artists of artist A. In addition, according to the style and so forth of artist A, he, she, or they may be associated with other artists. For example, according to the melody and tempo of a major content of artist A, other artists may be associated with artist A. In addition, according to the years in which artist A worked, he, she, or they may be associated with other artists. Moreover, according to a plurality of types of information of an artist or contents thereof, information about artists may be associated.

Artist link information can be phased according to the degree of association with a target artist. For example, first artist link information composed of information about artists B, C, D, and so forth strongly associated with artist A are associated with second artist link information composed of information about artists O, P, Q, and so forth weakly associated with artist A. For example, two types of tables are created for artist information managed by the database management task 63. All artist information managed by the database management task 63 is arranged in a matrix. The degree of association may be designated for each element of the matrix. The structure of artist link information is not limited to this example.

The artist link information is provided as a service of for example the music server 4 to the user side. The artist link information is downloaded from the music server 4 to the PC 2 through the Internet 3, transferred from the PC 2 to the reproduction apparatus 1, and then recorded to the hard disk drive 32. For example, the PC 2 transmits a list of contents recorded in the hard disk drive of the PC 2 and the hard disk drive 32 of the reproduction apparatus 1 to the music server 4. The music server 4 references the attribute information according to the list of contents, creates the artist link information, and transmits it to the PC 2. Instead, the user side may be able to create the artist link information.

1-3. Outline of Operation of Preview Reproduction

According to this embodiment of the present invention, when the cursor has been stopped at the position of a content for a predetermined time period in the foregoing content selection operation, a predetermined portion of the content is automatically reproduced. In the following description, the reproduction for only a selected portion of a content is referred to as the preview reproduction. The reproduction for a whole content is referred to as the normal reproduction. The method of the preview reproduction will be described later.

Figure 6:
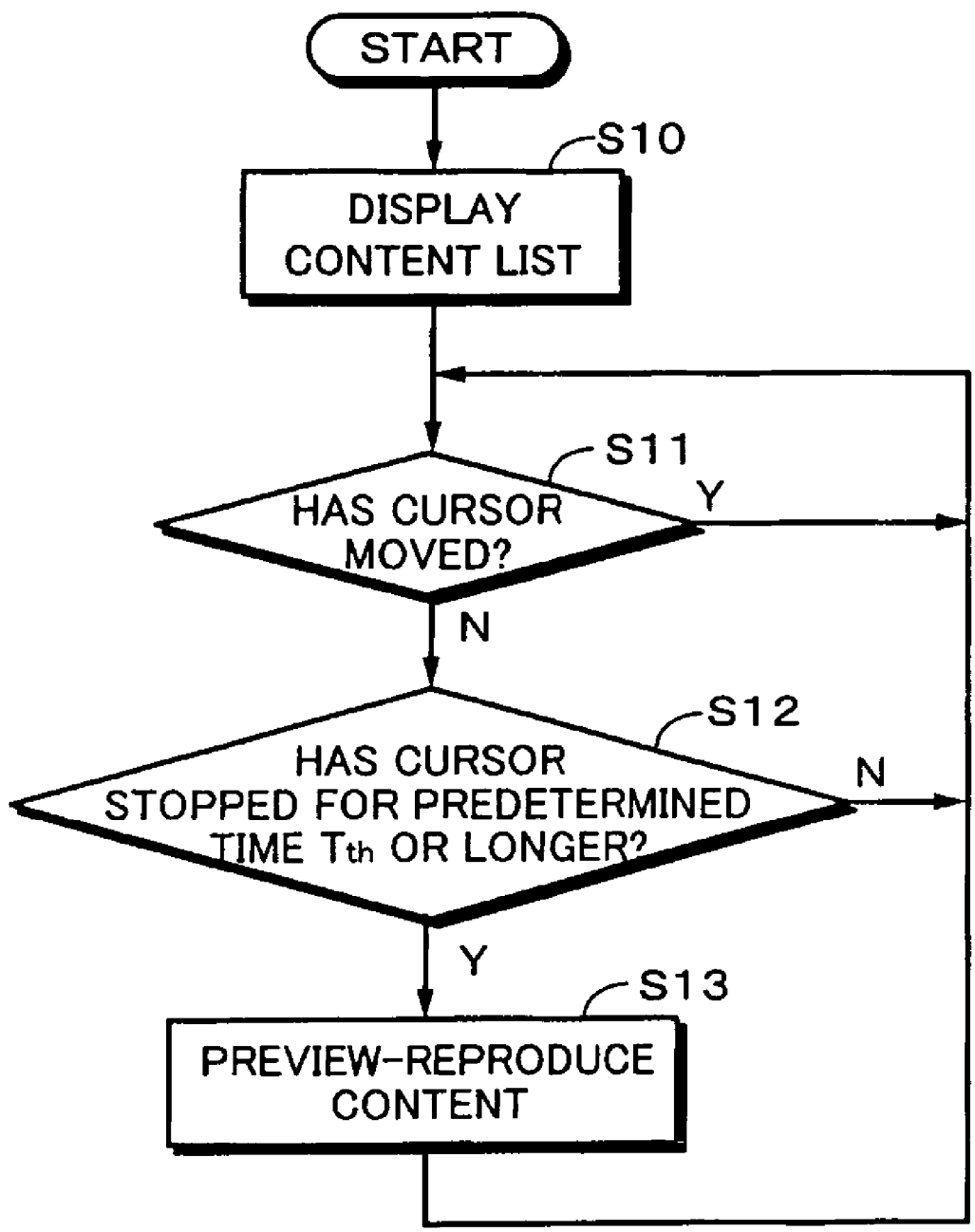
FIG. 6 is a flow chart showing an example of a process that automatically starts a preview reproduction.
Figure 7A:
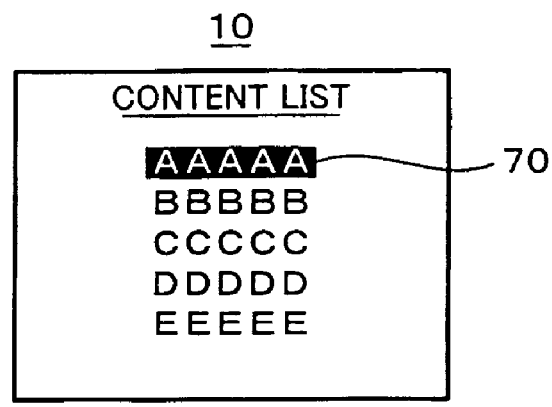
FIGS. 7A-7D show an example of data displayed on a display section according to the flow chart.

FIG. 6 shows an example of a flow chart showing a process that automatically starts the preview reproduction. FIG. 7 shows an example of data displayed on the display section 10 according to the flow chart shown in FIG. 6. The display section 10 displays a content list (at step S10). As shown in FIG. 7A, a list of content names is displayed on the display section 10. In addition, a cursor indication 70 is displayed at an initial position.

The cursor indication 70 is displayed when a display control signal that is generated by for example the microcomputer 41 and that causes the cursor to be displayed at a predetermined position is supplied to the display control section 35 through the system gate array 36 and the bus 34 and the display control section 35 drives the display section 10 according to the display control signal. The position of the cursor indication 70 is designated and the cursor indication 70 is moved by operating for example the up direction key and/or the down direction key of the key 13.

In the example shown in FIG. 7, the cursor indication 70 is generated by inverting the display color of a content name. The display method of the cursor indication 70 is not limited to this example. In other words, the cursor indication needs to be displayed at the position of a content name. For example, the cursor indication may be a predetermined mark displayed at the beginning of a content name.

Figure 7B:
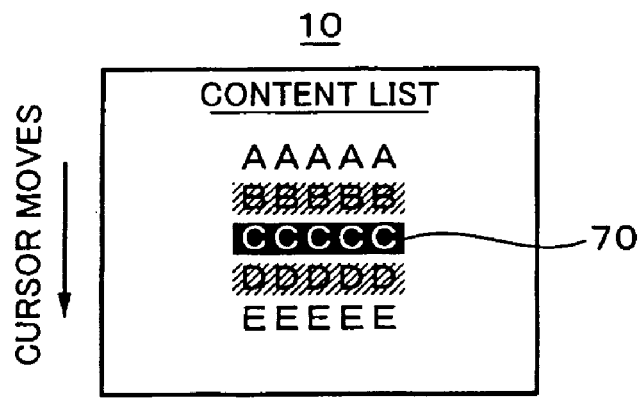

At step S11, it is determined whether the cursor indication 70 has been moved. When the user has not performed a key input with the up direction key, the down direction key, or the like of the key 13 and the cursor indication 70 has not been moved, the flow advances to step S12. At step S12, the microcomputer 41 measures time T for which the cursor indication 70 has been stopped at the position of a particular content name and determines whether time T exceeds predetermined time $T_{th}$. For example, when the cursor indication 70 has been moved to the position of content name "CCCCC" as shown in FIG. 7B, the microcomputer 41 starts counting time T according to the output of the real time clock 46. Before time T exceeds predetermined time $T_{th}$, the microcomputer 41 determines whether the cursor indication 70 moves from the position of content name "CCCCC" to another position.

Predetermined time $T_{th}$ is for example around 0.5 seconds. It is preferred that the value of predetermined time $T_{th}$ be able to be set by the user.

When the determined result at step S12 represents that time T exceeds predetermined time $T_{th}$, the flow advances to step S13. At step S13, a part of a content corresponding to the position of the cursor indication 70 is reproduced. When the cursor indication 70 has been moved to the position of content name "CCCCC" as shown in FIG. 7B and has been stopped at the position of content name "CCCCC" for predetermined time $T_{th}$ or longer as exemplified in FIG. 7C, a part of content data corresponding to content name "CCCCC" is reproduced. The content of content name "CCCCC" is preview-reproduced.

The preview reproduction reproduces content data for example from the beginning for a predetermined time period (for example, 10 seconds). At this point, after real whole content data have been reproduced from the beginning for a predetermined time period, the preview reproduction may be stopped. A file dedicated for the preview reproduction may be created and reproduced. The preview reproduction position extracted from each content may be different in each content. For example, a file dedicated for the preview reproduction can be automatically created when content data are recorded to the hard disk drive 32.

After the preview reproduction for a particular content has been completed, the preview reproduction can be automatically started for the next content of the particular content. In the example shown in FIG. 7, after the preview reproduction for a content of content name "CCCCC" has been completed and the cursor indication 70 has not been moved, the preview reproduction for a content of content name "DDDDD" can be automatically started.

In addition, while the preview reproduction is being performed, the cursor indication 70 can be moved with a key operation. In this case, when the cursor indication 70 has been moved to the position of a content name and has been stopped for predetermined time $T_{th}$ or longer, the preview reproduction can be performed for the content corresponding to the position of the cursor indication 70.

Figure 7C:
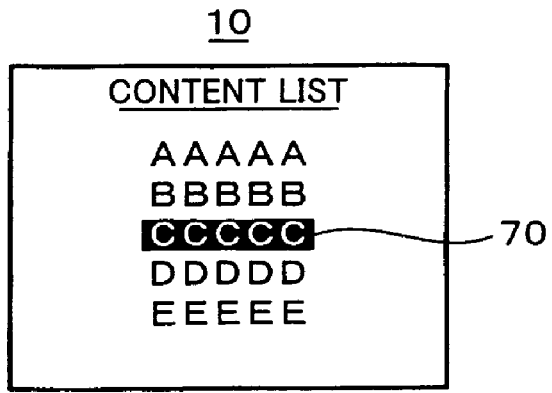

For example, as shown in FIG. 7C, when the cursor indication 70 is placed at the position of content name "CCCCC" and while the preview reproduction is being performed for the content, the cursor indication 70 is moved by a key operation. Thereafter, the cursor indication 70 is moved to the position of content name "EEEEE" through the position of content name "DDDDD" within predetermined time $T_{th}$. The cursor indication 70 is placed at the position of content name "EEEEE." The microcomputer 41 measures time T for which the cursor indication 70 has been stopped. When time T exceeds predetermined time $T_{th}$, the microcomputer 41 stops the preview reproduction for the content of content name "CCCCC" and then starts the preview reproduction for the content of content name "EEEEE."

Figure 7D:

While the preview reproduction is being performed, when a confirmation operation is performed for the selected content, the preview reproduction for the content can be changed to the normal reproduction for the content. When the preview reproduction is changed to the normal reproduction, the display section 10 displays data that represents that the normal reproduction is being performed as shown in FIG. 7D. In the example shown in FIG. 7D, text "Now Playing" that represents that the normal reproduction is being performed is displayed along with attribute information of content name "CCCCC" that is being reproduced.

When a confirmation operation is performed for a selected content by operating for example the enter key 13A while the preview reproduction is being performed, a process that changes the reproduction method of a content from the preview reproduction to the normal reproduction is performed. Next, this process will be described. In this case, as the reproduction method of the normal reproduction, there are two methods. In the first method, the content data that have been preview-reproduced are normally reproduced from the beginning. In the second method, the normal reproduction is started after the stop position of the content data that have been preview-reproduced.

Next, with reference to FIG. 8, this process will be described. It is assumed that the preview reproduction duration is 10 seconds from the beginning of content data, that the preview reproduction is performed for track 3 of tracks 1, 2, and 3 of the content data, and that the confirmation operation is performed while the preview reproduction for track 3 is being preformed.

Figure 8A:
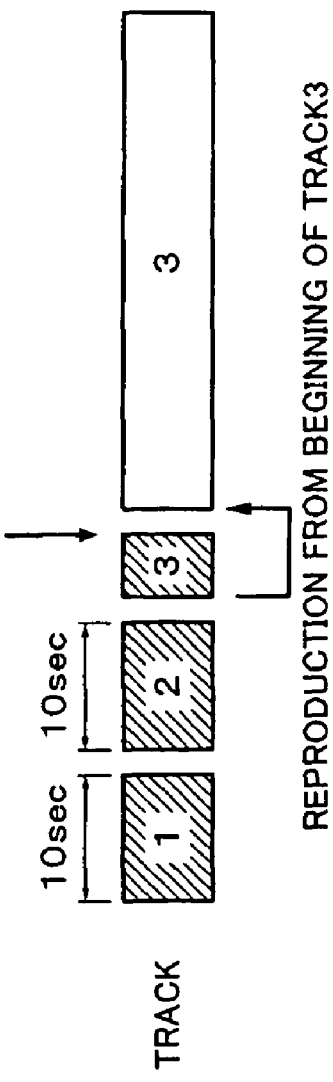
FIGS. 8A and 8B are schematic diagrams describing a process that changes a preview reproduction to a normal reproduction.

In the foregoing first method, as exemplified in FIG. 8A, when the confirmation operation is performed by operating for example the enter key 13A (designating the reproduction) while the preview operation for track 3 is being performed, at timing of which the confirmation operation is performed, the preview reproduction for track 3 is stopped. After a predetermined time period has elapsed, whole content data of track 3 are reproduced from the beginning.

Figure 8B:
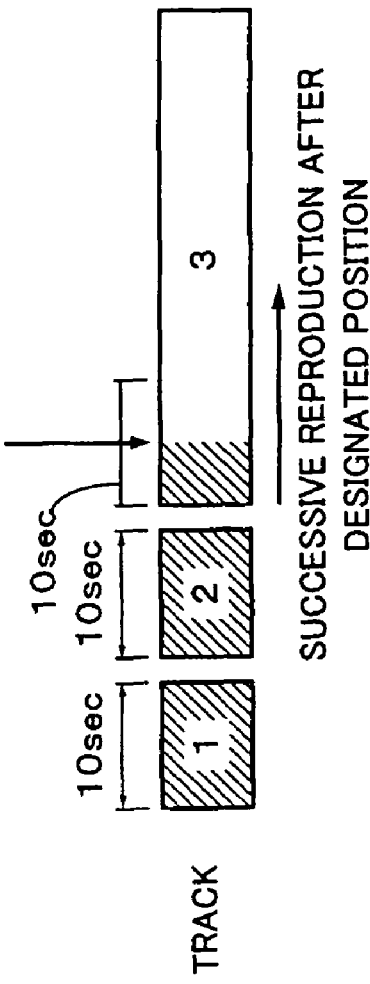

On the other hand, in the foregoing second method, as exemplified in FIG. 8B, when the confirmation operation is performed while the preview reproduction is being performed for track 3, at timing of which the confirmation operation is performed, the preview reproduction for the content data is stopped and the content data are successively reproduced after the stop position of the content data that have been preview-reproduced.

In the foregoing example, a list of contents recorded in the hard disk drive 32 is directly displayed on the display section 10. However, the present invention is not limited to this method. In other words, several hundred tracks to several thousand tracks of content data can be recorded. When the automatic preview reproduction according to the stop time period of the cursor indication 70 and the content attribute information are used, a search operation that searches a large amount of data for a desired content can be easily performed.

1-4. Outline of Operation of Artist Link Mode

Next, a selection mode using the foregoing artist link information as an example of an application of the preview reproduction will be described. In the following description, a mode that selects a content with artist link information is referred to as the artist link mode.

Figure 9:
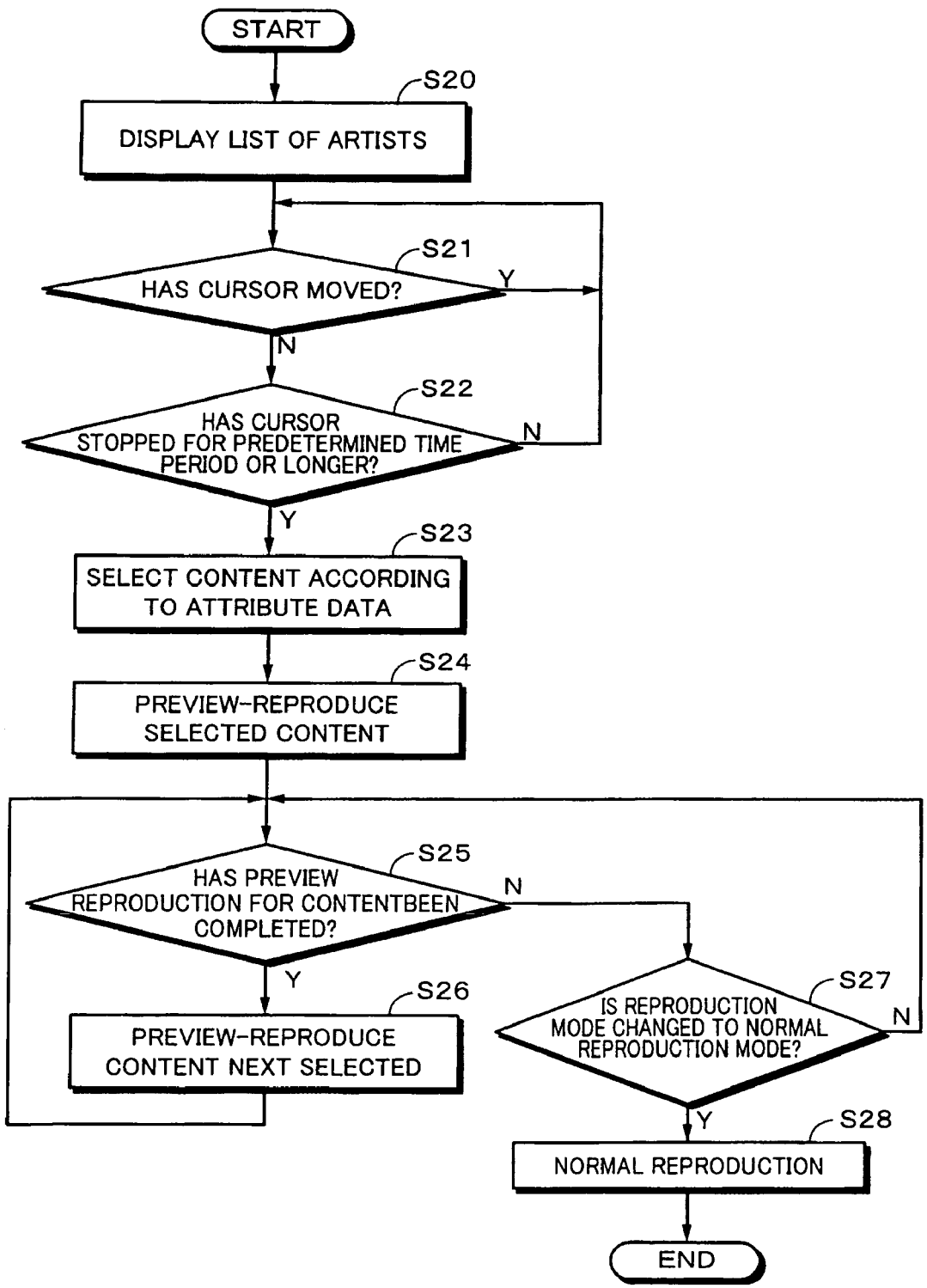
FIG. 9 is a flow chart showing an example of a process in an artist link mode.
Figure 10A:
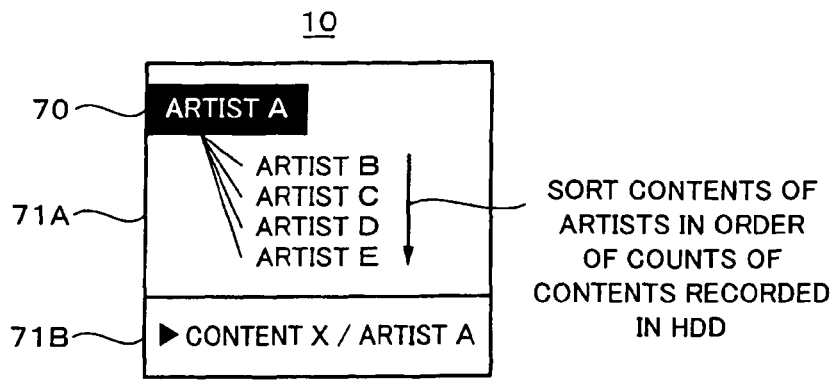
FIGS. 10A-10C are schematic diagrams showing an example of changes of data displayed in the process of the artist link mode.

FIG. 9 is a flow chart showing an example of a process of the artist link mode. FIG. 10 and FIG. 11 show examples of data displayed on the display section 10 in the process shown in FIG. 9. First, it is assumed that the reproduction operation mode of the reproduction apparatus 1 is the normal reproduction mode and content X of artist A is being normally reproduced. By operating for example the discovery key 14 of the operation section 20, the artist link mode is started. When the artist link mode is started, the microcomputer 41 references the artist link information. In addition, as exemplified in FIG. 10A, the microcomputer 41 causes the display section 10 to display the artist link screen. The artist link screen displays a list of artist A and his, her, or their associated artists B, C, and so forth in a list display portion 71A (at step S20).

In this example, with reference to the attribute information table, artist names are sorted and listed in the order of counts of contents recorded in the hard disk drive 32. The cursor indication 70 is displayed at the position of artist A. Content information of a content that is currently being reproduced is displayed in a reproduction content display portion 71B. Instead, artist names may be sorted in another manner. When the cursor indication 70 is displayed at the position of artist A, the normal reproduction for a content (in this example, content X of artist A) that had been reproduced in the normal reproduction mode immediately before the artist link mode has been started is resumed.

Figure 10B:
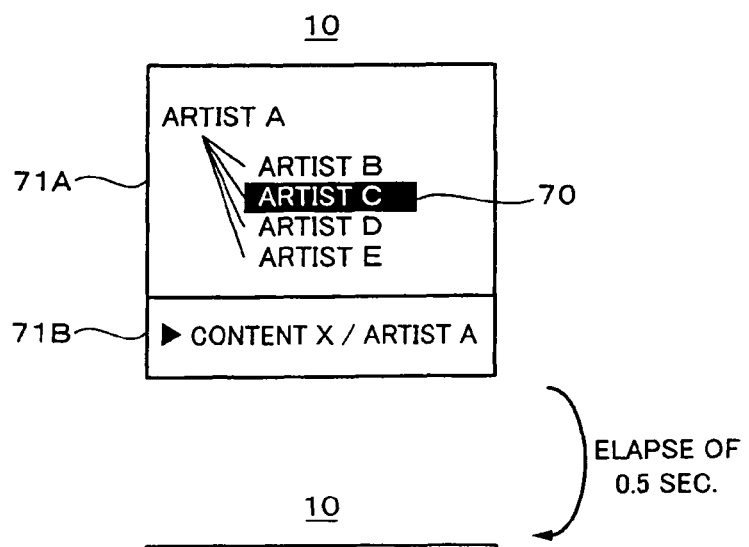

In this state, when for example the down direction key of the key 13 is operated, as exemplified in FIG. 10B, the cursor indication 70 is moved to the positions of associated artists B, C, and so forth (at step S21). In addition, the operation mode is changed to the preview reproduction mode. In the example shown in FIG. 10B, when the user operates the down direction key, the cursor indication 70 move and stops the position of artist C through the position of artist B within time $T_{th}$ (for example, 0.5 seconds).

It is determined whether the cursor indication 70 has been stopped at the position of artist C for predetermined time $T_{th}$ or longer according to the measured result of the microcomputer 41 (at step S22). When the determined result represents that time T is predetermined time $T_{th}$ or longer, the flow advances to step S23. At step S23, with reference to the attribute information table 30, a content is automatically selected from content data associated with the item at the position of the cursor indication 70.

For example, as shown in FIG. 10B, it is assumed that the cursor indication 70 is placed at the position of "artist C" and that contents P, Q, R, and S of artist C are recorded in the hard disk drive 32. These contents P, Q, R, and S are sorted in the order of ratings according to the attribute information table 30. As a rating item, field "reproduction history" of the attribute information table 30 is used. Contents are sorted in the order of reproduction frequency. Instead, with field "ranking information" of the attribute information table 30, contents may be sorted in the order of popularity. Instead, reproduction counts of contents obtained from the reproduction history and favorite degrees according to skip counts may be rated. It is preferred that the user be able to designate an item to be rated. At step S23, the microcomputer 41 automatically selects content P with the highest rating.

Figure 10C:
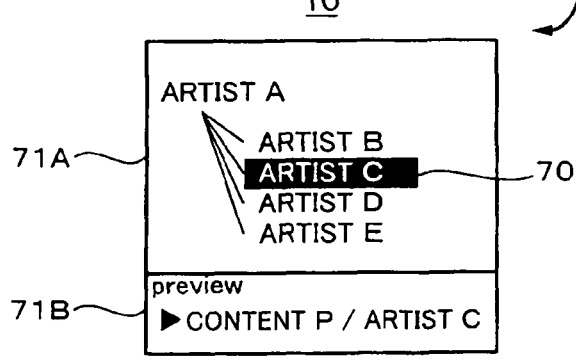

The selected content P is preview-reproduced at the next step, S24. The display section 10 still displays the artist link screen. A content that is being preview-reproduced is displayed in the reproduction content display portion 71B (FIG. 10C).

Figure 11A:
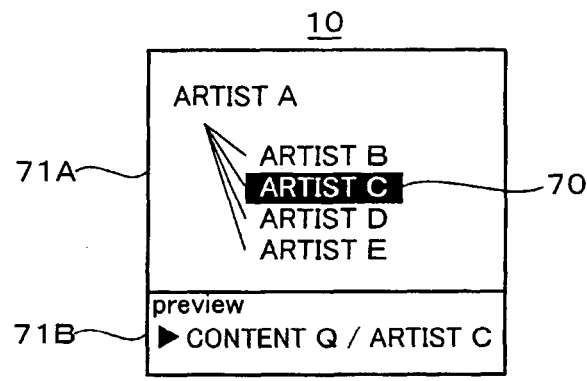
FIGS. 11A-11D are schematic diagrams showing an example of changes of data displayed in the process of the artist link mode.

At the next step, S25, it is determined whether the cursor indication 70 has been stopped at the position of artist C and the preview reproduction has been completed. When the determined result represents that the preview reproduction has been completed, the flow advances to step S26. At step S26, a content that is selected next is automatically preview-reproduced. For example, a content (content Q) having the next highest rating, assuming that content P has the highest rating, is automatically preview-reproduced. The display section 10 still displays the artist link screen. A content that is currently being preview-reproduced is displayed in the reproduction content display portion 71B (FIG. 11A). Thereafter, the flow returns to step S25.

Figure 11B:
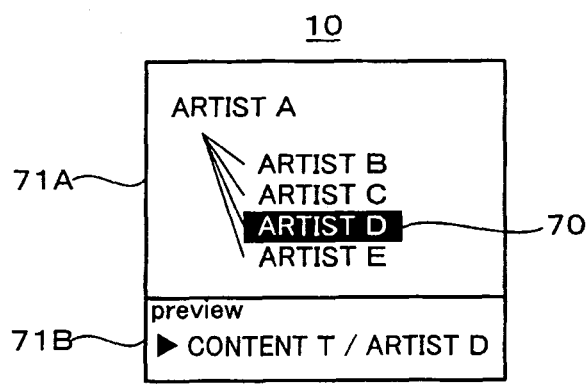

Thereafter, steps S25 and S26 are repeated. When all contents of artist C at which the cursor indication 70 has been stopped have been preview-reproduced from the hard disk drive 32, contents of the next artist (for example, artist D) are automatically preview-reproduced. At this point, the display section 10 still displays the artist link screen. The cursor indication 70 is automatically moved to the position of artist D in the list display portion 71A (FIG. 11B). In addition, content T that is currently being preview-reproduced is displayed in the reproduction content display portion 71B.

In contrast, when the determined result at step S25 represents that content P is being preview-reproduced, the flow advances to step S27. At step S27, it is determined whether the reproduction mode is changed from the preview reproduction mode to the normal reproduction mode.

Figure 11C:
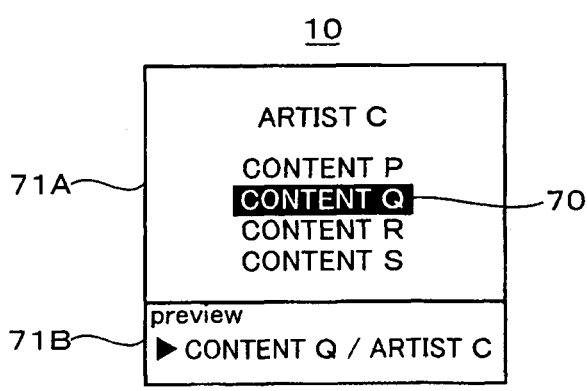
Figure 11D:
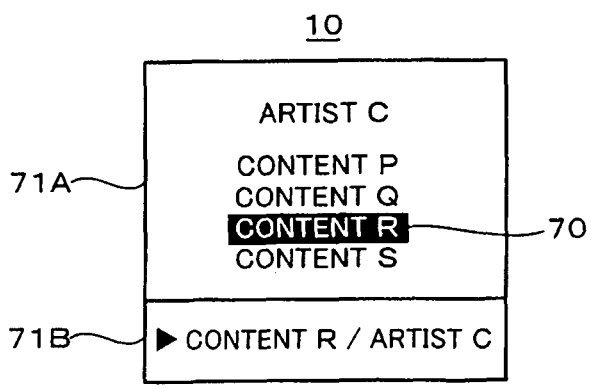

When the confirmation operation is performed by operating for example the enter key 13A in the state shown in FIG. 11A, the display section 10 displays the content list screen as exemplified in FIG. 11C. On the content list screen, a content of artist C can be selected. On the content list screen, a list of contents of artist C is displayed in the list display portion 71A. A content that is currently being preview-reproduced is displayed in the reproduction content display portion 71B.

When the confirmation operation is performed for a content by operating for example the enter key 13A in the state shown in FIG. 11B, it is determined that the reproduction mode be changed to the normal reproduction mode. At the next step, S28, content Q that is currently being preview-reproduced is normally reproduced. The display section 10 still displays the content list screen. The content selected to be normally reproduced is displayed in the reproduction content display portion 711B (FIG. 11C). When content Q is normally reproduced, "1" is added to the value of field "reproduction history" of the record of content Q of the attribute information table 30.

When the normal reproduction is not designated (No in step S27), the flow returns to step S25. At step S25, the preview reproduction is continuously performed. When the preview reproduction for content Q has been completed and the cursor indication 70 has not been moved, the preview reproduction for content R having the next highest rating is automatically started. The cursor indication 70 is moved to the position of content R.

When the determined result at step S25 represents that content P is currently being preview-reproduced, on the artist link screen shown in FIG. 11A, by moving the cursor indication 70, another artist can be selected. In other words, when the determined result at step S25 represents that content P is currently being preview-reproduced and the cursor indication 70 has been moved, the flow returns to step S23. At step S23, a content of an artist at the position of the cursor indication 70 can be preview-reproduced.

As described above, according to this embodiment of the present invention, only by moving the cursor indication 70 to the position of an artist name and stopping the cursor indication 70 at the position for a predetermined time period, contents of the artist at the position of the cursor indication 70 can be automatically preview-reproduced.

2. More Specific Operation of Artist Link Mode and GUI

Next, the operation of the artist link mode and GUI (Graphical User Interface) will be described with reference to a specific example. As described above, artist link information can be phased according to degree of association of artists. In the following description, it is assumed that artist link information is phased in two levels of first artist link information that strongly associates with an artist and second artist link information that weakly associates with an artist.

FIG. 12 is a flow chart showing an example of a process that is performed when the artist link mode is started by operating the discovery key 14 while particular content data are being reproduced. It is assumed that before the process of the flow chart shown in FIG. 12 is performed, the display section 10 displays a list of contents of a particular artist (for example, "The Police") recorded in the hard disk drive 32. In the following description, an artist who has been selected before the process of the flow chart shown in FIG. 12 is performed (in this example, "The Police") is referred to as a target artist. An artist described in artist link information corresponding to the target artist is referred to as an associated artist.

At step S30, with for example the up direction key and/or the down direction key of the key 13, the cursor indication 70 is moved. A desired content is selected from those displayed in the list. When the cursor indication 70 has been moved to the position of the content (for example, "Every Breath You") to be reproduced, by operating for example the enter key 13A, the normal reproduction for content data at the position of the cursor indication 70 is started (at step S31).

At this point, the display section 10 displays a normal reproduction screen on which content data are normally reproduced. FIG. 13 shows an example of a normal reproduction screen 100. The normal reproduction screen displays a content name ("Every Breath You"), an album name ("The Police best") that contains the content, an artist name ("The Police"), a genre to which the content data belong ("Rock"), and a current reproduction elapse time of the content data ("00:02") with respect to the content that is currently being reproduced along with icons that represent the meaning of these information.

In the following example, an icon that symbolizes a musical note represents a content name. An icon that symbolizes a disc represents an album name. An icon that symbolizes a human's breast-up represents an artist name. An icon that symbolizes a boxed musical note represents a genre. The meanings of these icons are the same in each screen displayed on the display section 10.

The rating of content data that are currently being reproduced is represented with asterisks in the list display portion 71A along with the released year of the content. Information about the content that is currently being reproduced is displayed in brief in the reproduction content display portion 71B along with the reproduction elapse time of the content. Although the list display portion 71A and the reproduction content display portion 71B are illustrated as separate portions, they are actually displayed in different areas of one screen of the display section 10.

When the determined result represents that the discovery key 14 has been operated while the content data have been being reproduced (Yes at step S32), the operation mode of the reproduction apparatus 1 is changed to the artist link mode. The hard disk drive 32 is searched for artist information strongly associated with the artist of the content data that are currently being reproduced (step S33). In addition, the screen of the display section 10 is changed to an in-search screen 101 exemplified in FIG. 14.

Figure 14:
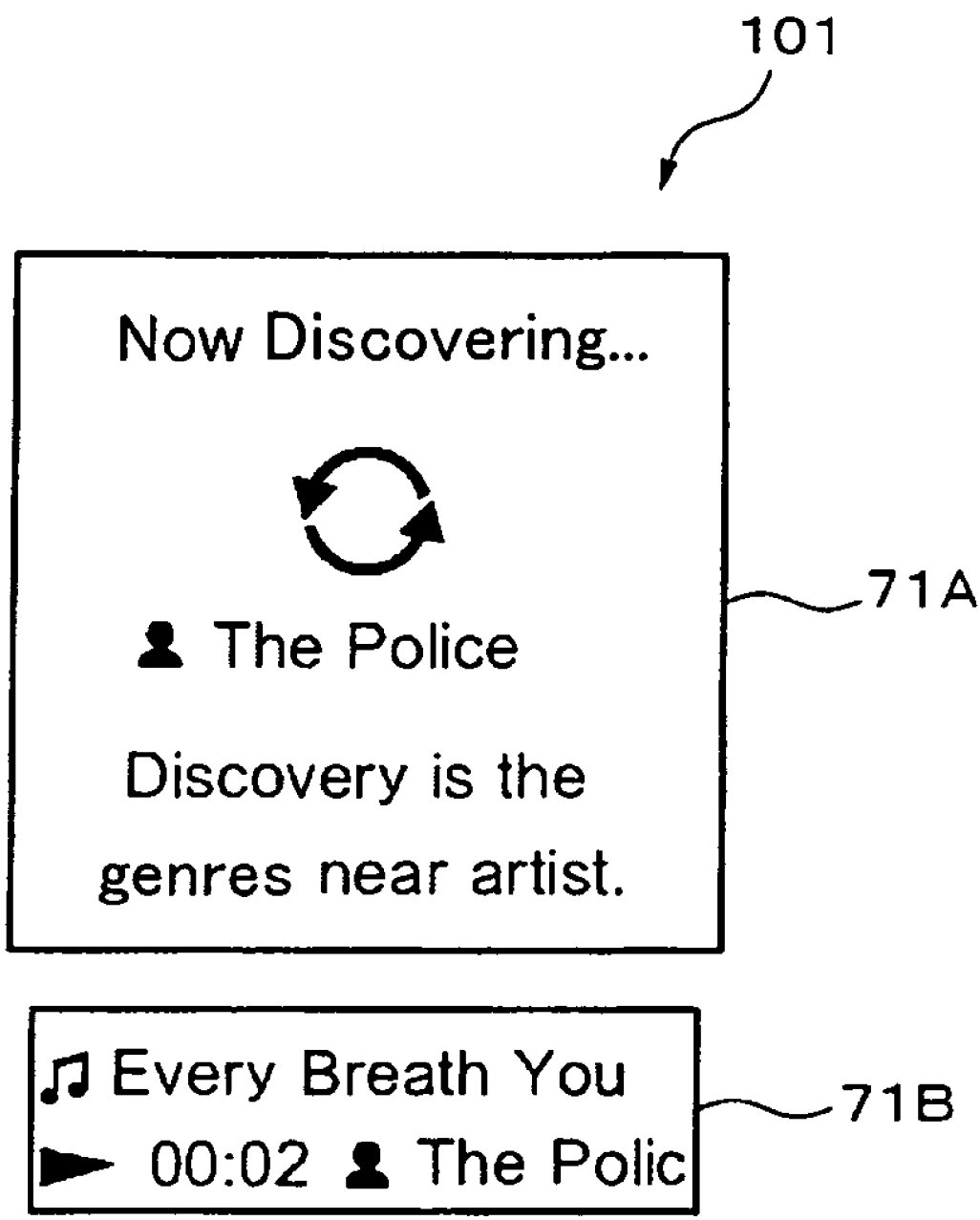
FIG. 14 is a schematic diagram showing an example of an in-search screen.

The in-search screen 101 displays a target artist name ("The Police") with which artist link information is searched for an associated artist, a text message that represents that the artist link information is currently being searched, and an icon (in the example shown in FIG. 14, two semi-circular arrow marks that rotate). In addition, content data are continuously reproduced. Information that represents a content that is currently being reproduced is displayed in the reproduction content display portion 71B.

When the determined result represents that a predetermined time period has elapsed after the screen of the display section 10 has been changed to the in-search screen 101 (at step S34), the flow advances to step S35. At step S35, it is determined whether there is first artist link information, which is artist information strongly associated with an artist of the content data that is currently being reproduced according to the search result of step S33. When the determined result represents that there is first artist link information, the flow advances to step S36.

When the determined result at step S35 represents that there is no artist information strongly associated, the flow advances to step S41. At step S41, it is determined whether there are second artist link information of the artist of the content data that are currently being reproduced, the second artist link information is artist link information weakly associated with the artist. When the determined result represents that there are neither the first artist link information of the target artist, nor the second artist link information of the target artist, the flow advances to step S42.

In contrast, when the determined result at step S41 represents that there is second artist link information of the target artist, the flow advances to step S43.

At step S42, the display section 10 displays a screen 102 (see FIG. 15) that prompts the user whether to lighten the criterion of degree of association of the artist link information of the target artist. In the example shown in FIG. 15, the display section 10 displays text that prompts the user whether to lighten (enlarge) the criterion of degree of association and display the associated artist link information and a guidance for a key to be operated (for example, the discovery key 14) in the list display portion 71A.

At step S43, the content data are being reproduced in the normal reproduction mode. Information that represents a content that is currently being reproduced is displayed in the reproduction content display portion 71B.

At step S42, when the discovery key 14 or the enter key 13A has been operated and it has been confirmed that the criterion of degree of association is lightened and the associated artist link information is displayed, the artist link information of the target artist is changed from the first artist link information to the second artist link information. Thereafter, the flow returns to step S35.

When the determined result at step S42 represents that the criterion of degree of association is not lightened, the flow advances to step S43. At step S43, the display section 10 displays a content that is currently being reproduced as shown in FIG. 13. The normal reproduction for the content that is currently being reproduced is continuously performed.

Figure 15:
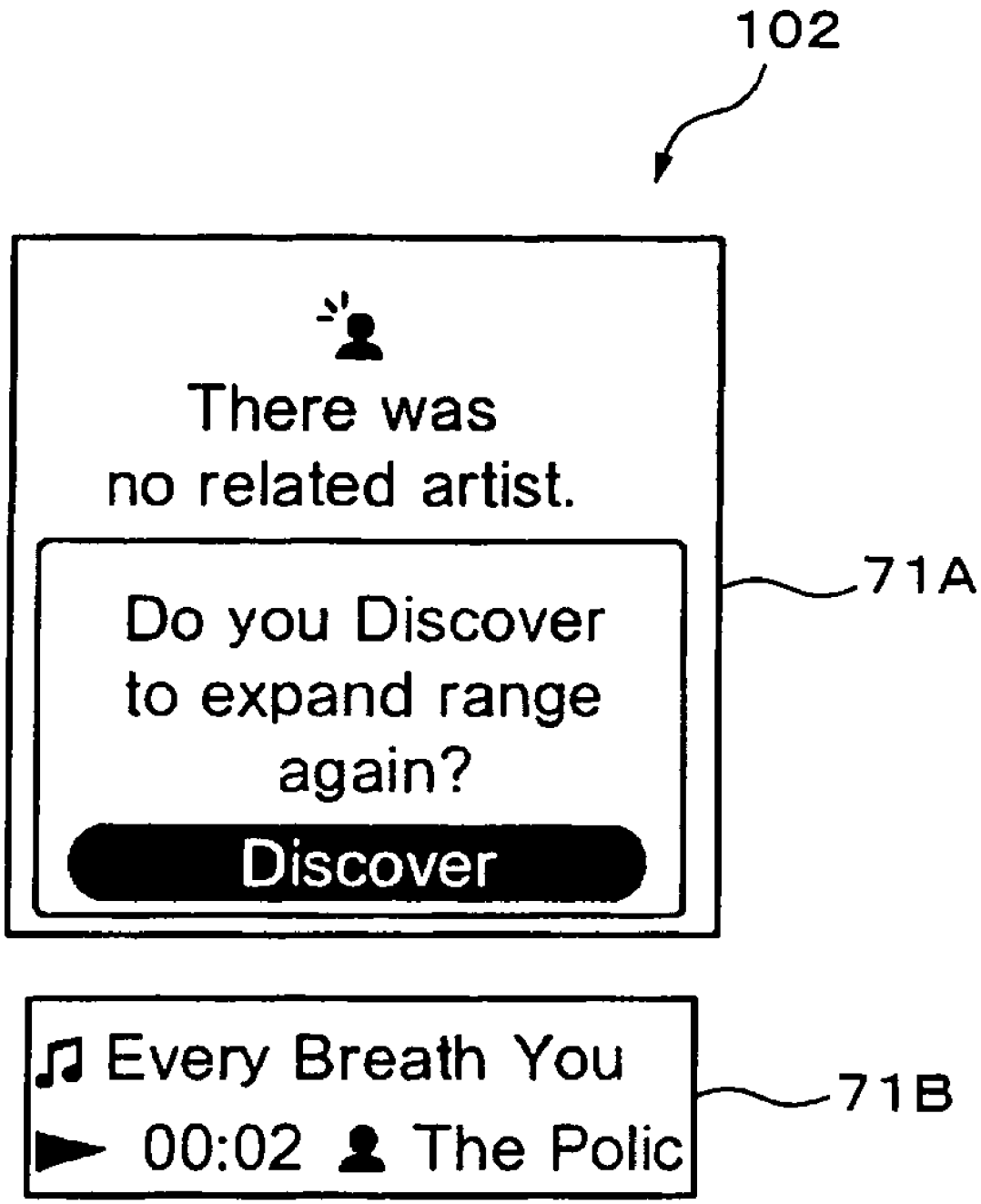
FIG. 15 is a schematic diagram showing an example of a screen that prompts the user whether to lessen the criterion of degree of association.

When the display section 10 displays a screen shown in FIG. 15 in the state at step S42 and the user operates the key 15, he or she decides not to lighten the criterion of degree of association. The screen of the display section 10 is changed to a screen 103 exemplified in FIG. 16 that prompts the user to return to the screen that displays a content that is currently being reproduced. In the example shown in FIG. 16, the display section 10 displays text that represents that there are neither the first artist link information, nor the second artist link information of the target artist and a key to be operated (for example, the key 15) in the list display portion 71A.

When the determined result at step S35 represents that there is associated artist information that represents an artist associated with the target artist according to the artist link information, the flow advances to step S36.

Figure 17:
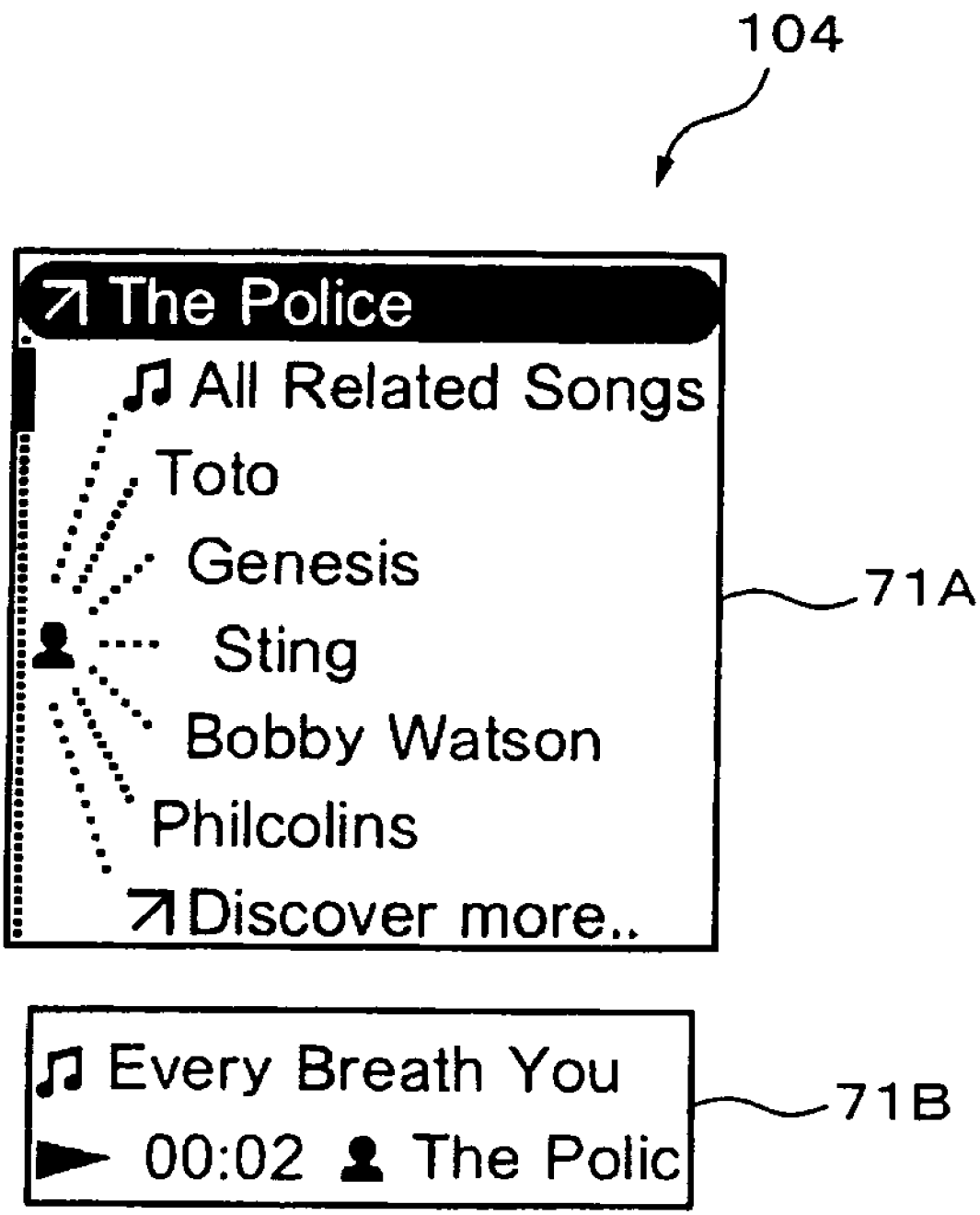
FIG. 17 is a schematic diagram showing an example of an associated artist information screen.

At step S36, the display section 10 displays an associated artist information display screen 104, exemplified in FIG. 17, that displays associated artist information. The associated artist information display screen 104 displays data according to the first artist link information or the second artist link information depending on branches at step S35, step S41, and step S42.

In the example shown in FIG. 17, the associated artist information display screen 104 displays a target artist name at the top along with the cursor indication 70 and a list of associated artist information of the target artist corresponding to the first or second artist link information. In the example shown in FIG. 17, associated artist information according to the first or second artist link information is connected to an icon 75 that represents the target artist with dotted lines.

When the artist link information of the target artist contains more than one page of artist information that cannot be displayed on the associated artist information display screen 104 shown in FIG. 17, when keys of the operation section 20 are operated in a predetermined manner, artist information that does not appear on the screen can be displayed on the display section 10. When for example the down direction key of the key 13 is operated, the cursor indication 70 is moved to a predetermined position of the list display portion 71A (in the example shown in FIG. 17, the position of "Discover more."). As a result, the associated artist information displayed in the list display portion 71A is scrolled by one line at a time.

At the next step, S37, it is determined whether the cursor indication 70 is placed at the position of the artist name of content data that are currently being reproduced on the associated artist information display screen 104. In other words, the user can move the cursor indication 70 to the position of his or her desired associated artist with for example the up direction key and down direction key of the key 13. When the cursor indication 70 is placed at the position of the former artist name (in this example, "The Police") on the associated artist information display screen, the normal reproduction for the content data that is currently being reproduced is continuously performed (at step S38).

Figure 18A:
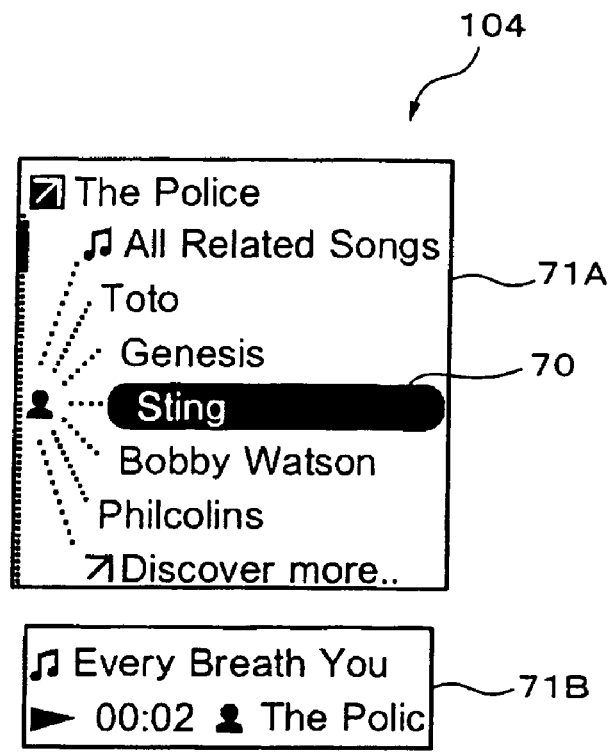
FIG. 18 is a schematic diagram showing an example of the associated artist information screen.

In contrast, when the determined result represents that the cursor indication 70 has been moved from the position of the artist name of the content data that are currently being reproduced, the flow advances to step S39. When the user operates for example the down direction key, the cursor indication 70 is moved. As exemplified in FIG. 18A, the cursor indication 70 is displayed at the position of the artist name ("Sting") different from the artist name of the content data that are currently being reproduced.

Figure 18B:
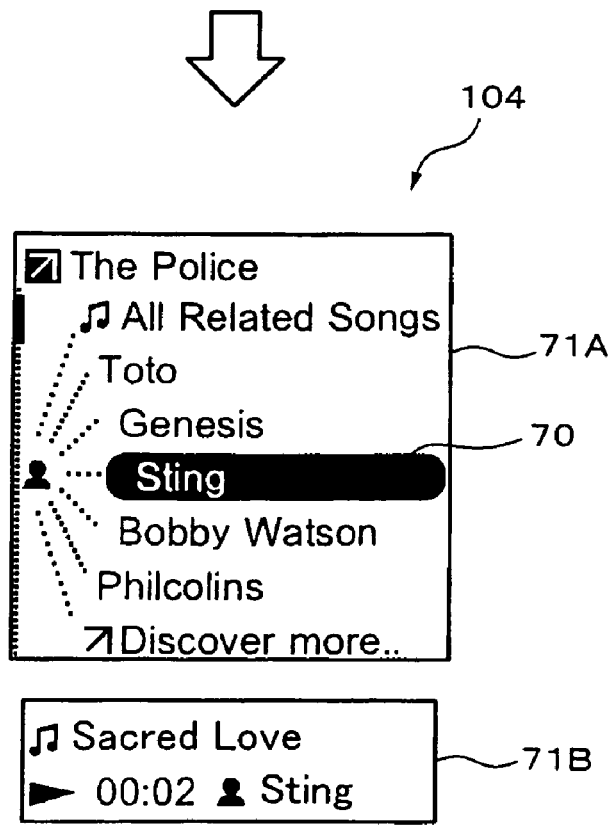

At step S39, it is determined whether the cursor indication 70 has been stopped at the position of an associated artist name for a predetermined time period. When the determined result represents that the cursor indication 70 has been stopped at the position for a predetermined time period, the flow advances to step S40. At step S40, the reproduction mode is changed from the normal reproduction mode to the preview reproduction mode. The artist name at the position of the cursor indication 70 is designated as a selected artist name. Content data of the artist name (in this example, "Sacred Lover") are automatically preview-reproduced. As exemplified in FIG. 18B, the display section 10 displays information of content data that have been newly selected and that are currently being reproduced in the reproduction content display portion 71B.

Next, the preview reproduction that starts at step S40 will be described. In the preview reproduction mode, content data of the artist at the position of the cursor indication 70 are successively reproduced. When all content data of the artist have been reproduced from the hard disk drive 32, the artist information is automatically changed to artist information of the next artist described in the same artist link information. The preview reproduction for content data of the changed artist is started.

Figure 19:
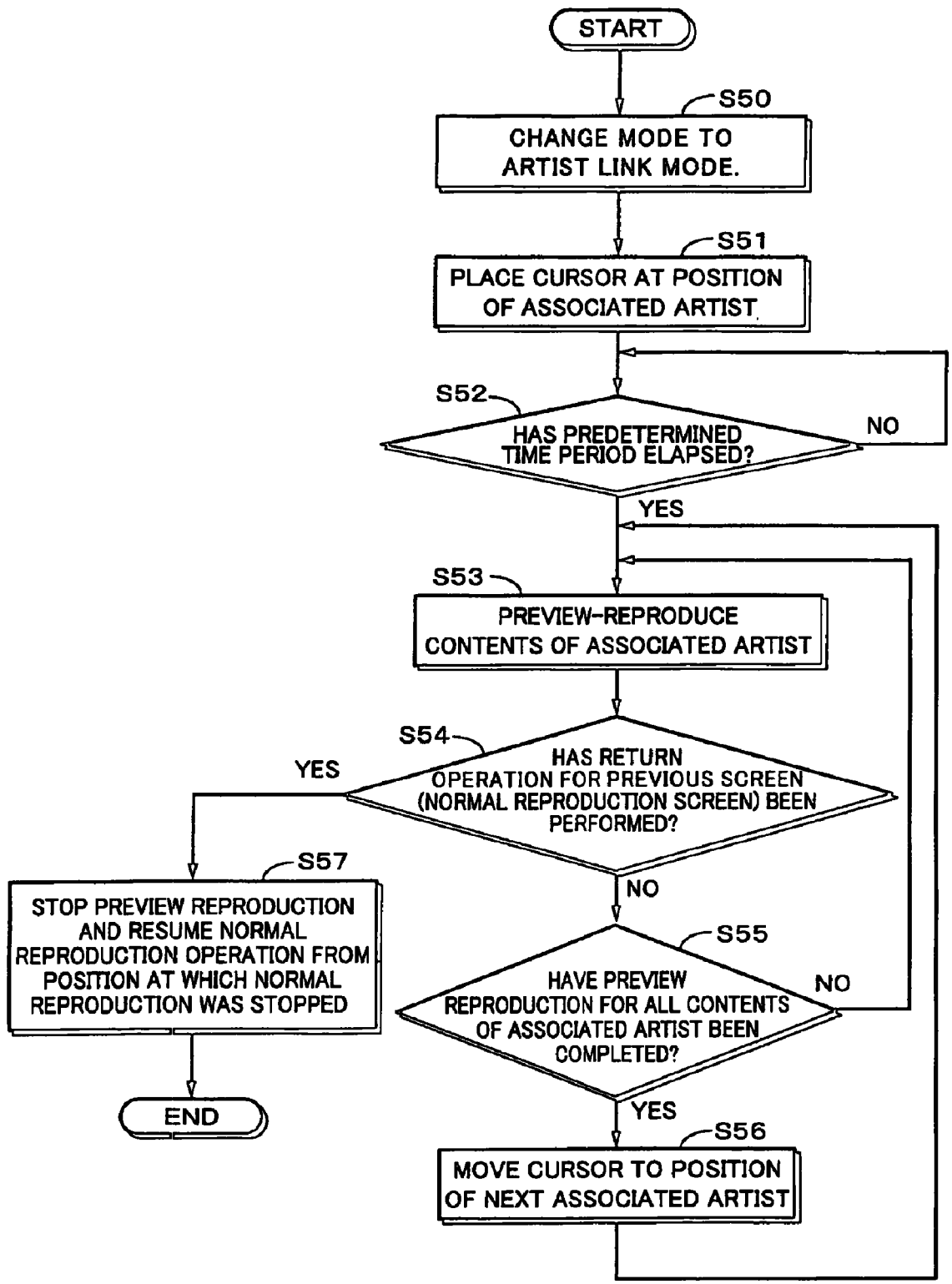
FIG. 19 is a flow chart showing an example of a process that performs a preview reproduction.

In other words, as exemplified in a flow chart of FIG. 19, when a predetermined key (for example, the discovery key 14) of the operation section 20 is operated, the operation mode of the reproduction apparatus 1 is changed to the artist link mode (at step S50). When the mode has been changed to the artist link mode, the display section 10 displays a list of artists associated with the artist of for example a content that has been reproduced.

At the next step, S51, the cursor indication 70 is placed at the position of an associated artist name (for example, "Sting"). Thereafter, it is determined whether the cursor indication 70 has been stopped at the position of the artist name for a predetermined time period or longer (at step S52). When the determined result represents that the cursor indication 70 has been stopped at the position for the predetermined time period or longer, the flow advances to step S53. At step S53, the preview reproduction for the content data of the associated artist is started. At this point, when another content data has been reproduced in the normal reproduction mode, the reproduction for the other content data is stopped. Instead, the preview reproduction is started.

While the preview reproduction is being performed, a predetermined key operation of the operation section 20 is monitored (at step S54). When the preview reproduction for one content has been completed without the predetermined key operation, the flow advances to step S55. At step S55, it is determined whether all contents of the associated artist has been reproduced from the hard disk drive 32.

When the determined result represents that all content data of the associated artist have not been reproduced (No in step S55), the flow returns to step S53. At step S53, the next content data of the associated artist are reproduced. In contrast, when the determined result represents that all content data of the associated artist have been reproduced (Yes in step S55), the flow advances to step S56. At step S56, on the associated artist information display screen 104, the cursor indication 70 is automatically moved to the next associated artist (in the example shown in FIG. 18, "Bobby Watson"). The preview reproduction for the content data of the moved associated artist is automatically started. Thereafter, the flow returns to step S53. Likewise, the preview reproduction for content data of the moved associated artist is preformed.

The predetermined key of the operation section 20 that is monitored at step S54 is a key that causes the screen displayed on the display section 10 in the artist link mode to be changed to the screen for the normal reproduction. This key is for example the back key 15. When the determined result at step S54 represents that the predetermined key of the operation section 20 has been operated while the preview reproduction for the content data has been performed, the flow advances to step S57.

At step S57, the preview reproduction is stopped. In addition, the reproduction for content data that have been normally reproduced immediately before the preview reproduction has been started after the mode had been changed to the artist link mode (before it has been determined that the predetermined time period has elapsed at step S52) is resumed. The reproduction for the content data is started after the position at which the normal reproduction has been stopped when the artist link mode has been started and the preview reproduction has been started.

When a predetermined operation of the operation section 20 is performed while the preview reproduction for the content data is being performed, the screen of the display section 10 can be changed to a screen that displays more detailed information about content data of the associated artist information. Next, with reference to FIG. 20 and FIG. 21, an example of a process that changes the screen shown in FIG. 18A to another screen will be described.

Figure 20:
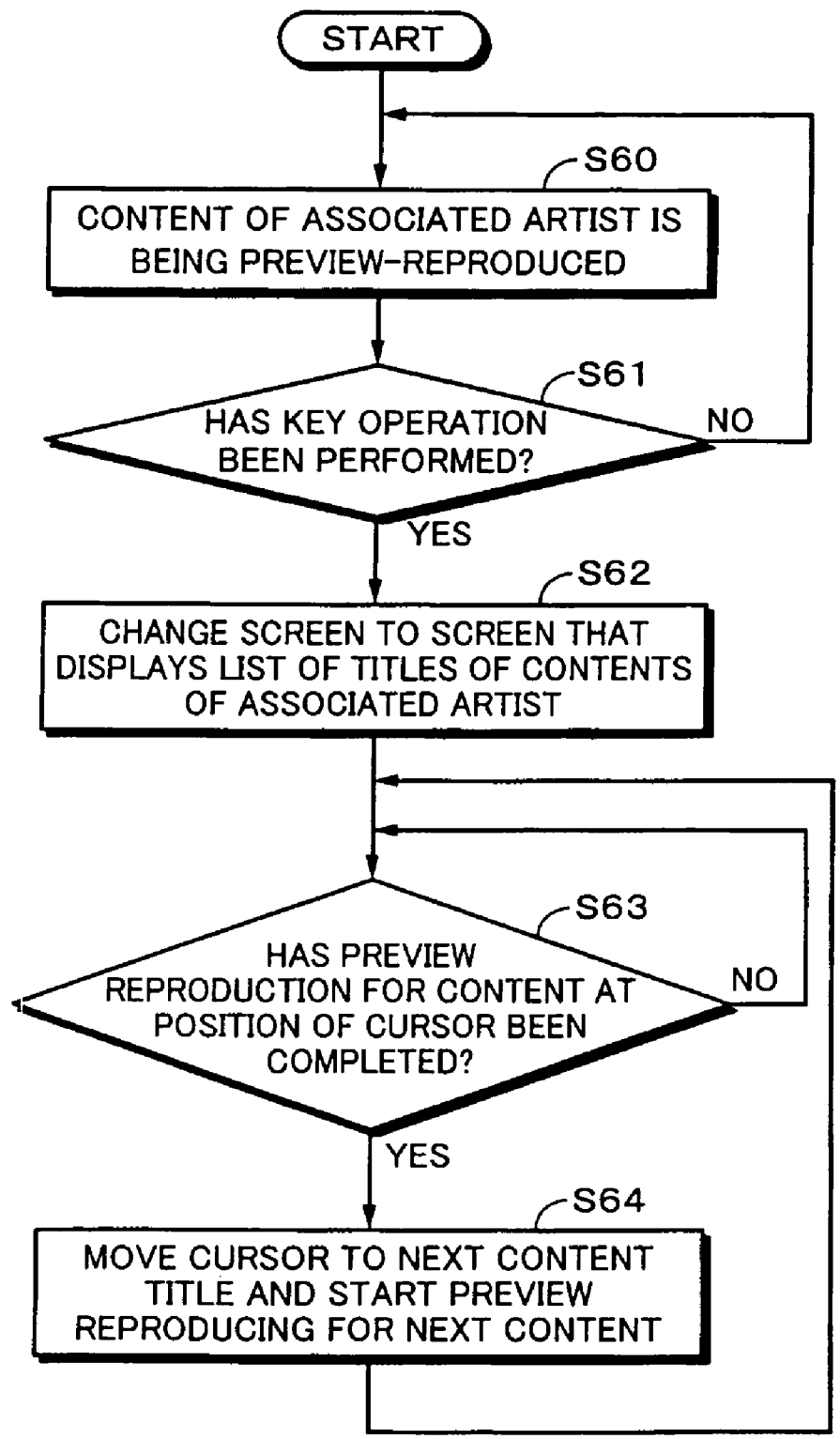
FIG. 20 is a flow chart showing an example of the process that performs the preview reproduction.

In a flow chart shown in FIG. 20, after step S38 or step S40 of the flow chart shown in FIG. 12, the preview reproduction for content data ("Sacred Love") of the associated artist ("String") is performed (at step S60). When a predetermined operation is performed, i.e. a predetermined key is operated, for example the discovery key 14 of the operation section 20 is operated while the preview reproduction is being performed (at step S61), the flow advances to step S62.

At step S62, the display section 10 displays a content title list screen that displays a list of titles of content data of the associated artist that are currently being preview-reproduced.

Figure 21:
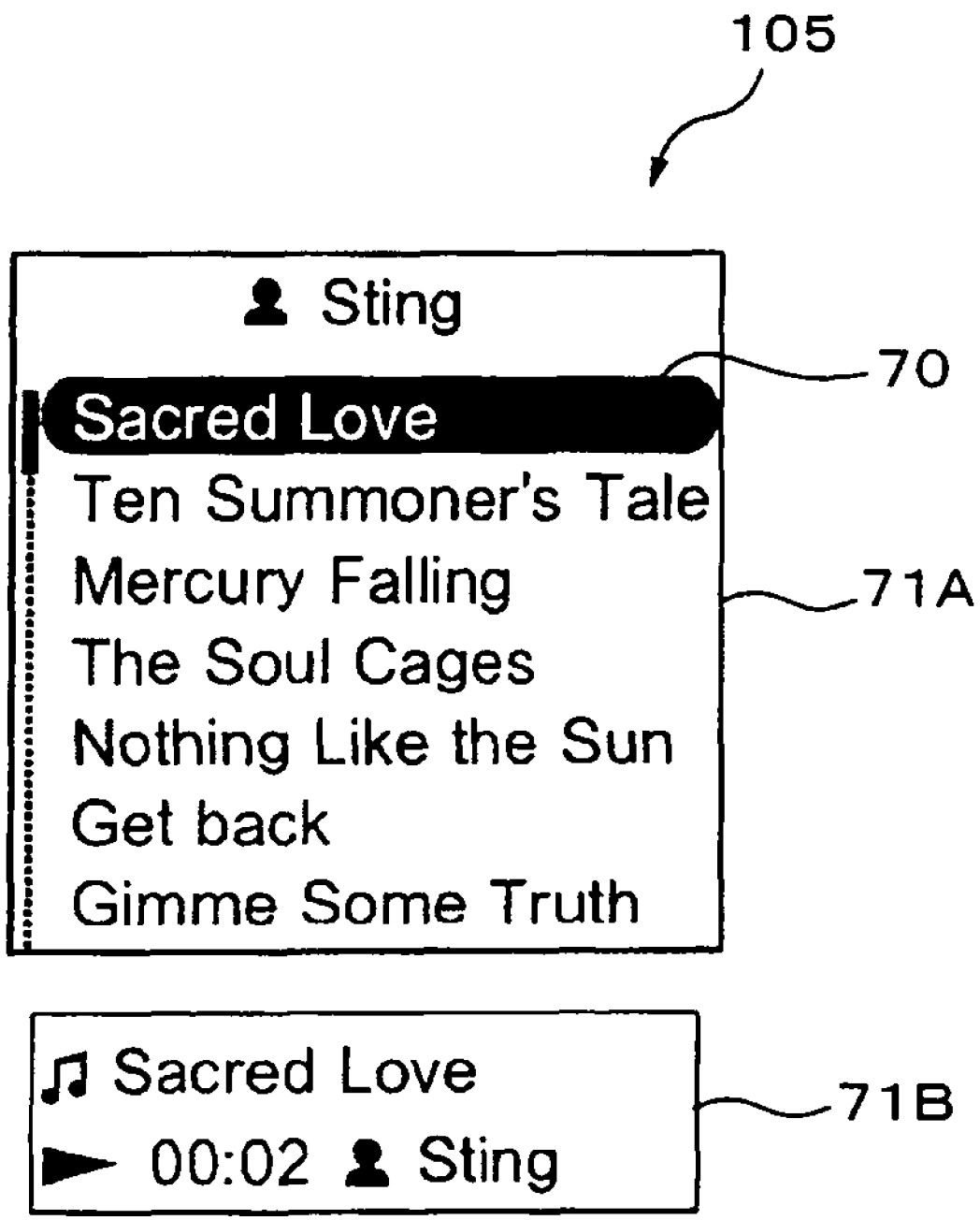
FIG. 21 is a schematic diagram showing an example of a content title list screen.

FIG. 21 shows an example of a content title list screen 105. A list of the titles of content data of the associated artist recorded in the hard disk drive 32 is displayed in the list display portion 71A. The associated artist name ("Sting") is displayed at the top of the content title list screen 105 along with an icon that represents an artist. The artist name is followed by a list of content titles arranged in a predetermined order. The titles that do not appear on the display section 10 can be displayed by scrolling it with for example the up direction key and/or the down direction key of the key 13. In addition, the cursor indication 70 is placed at the position of the title that is currently being preview-reproduced (in this example, "Sacred Love"). Information about the content that is currently being reproduced is displayed in the reproduction content display portion 711B.

It is determined whether the preview reproduction for the content data at the position of the cursor indication 70 has been completed (at step S63). When the determined result represents that the preview reproduction has been completed, the flow advances to the next step, S64. At step S64, the cursor indication 70 is automatically moved to the position of the next content title (in the example shown in FIG. 21, "Ten Summoner's Tale"). In addition, the preview reproduction for the content data of the content title to which the cursor indication 70 has been moved is automatically started.

While the preview reproduction for content data is being performed on the content title list screen 105, this screen of the display section 10 can be changed to a screen that displays information of each content. In addition, the reproduction for content data can be changed from the preview reproduction to the normal reproduction of the whole content data. Next, with reference to FIG. 22 and FIG. 23, an example of this process will be described.

Figure 22:
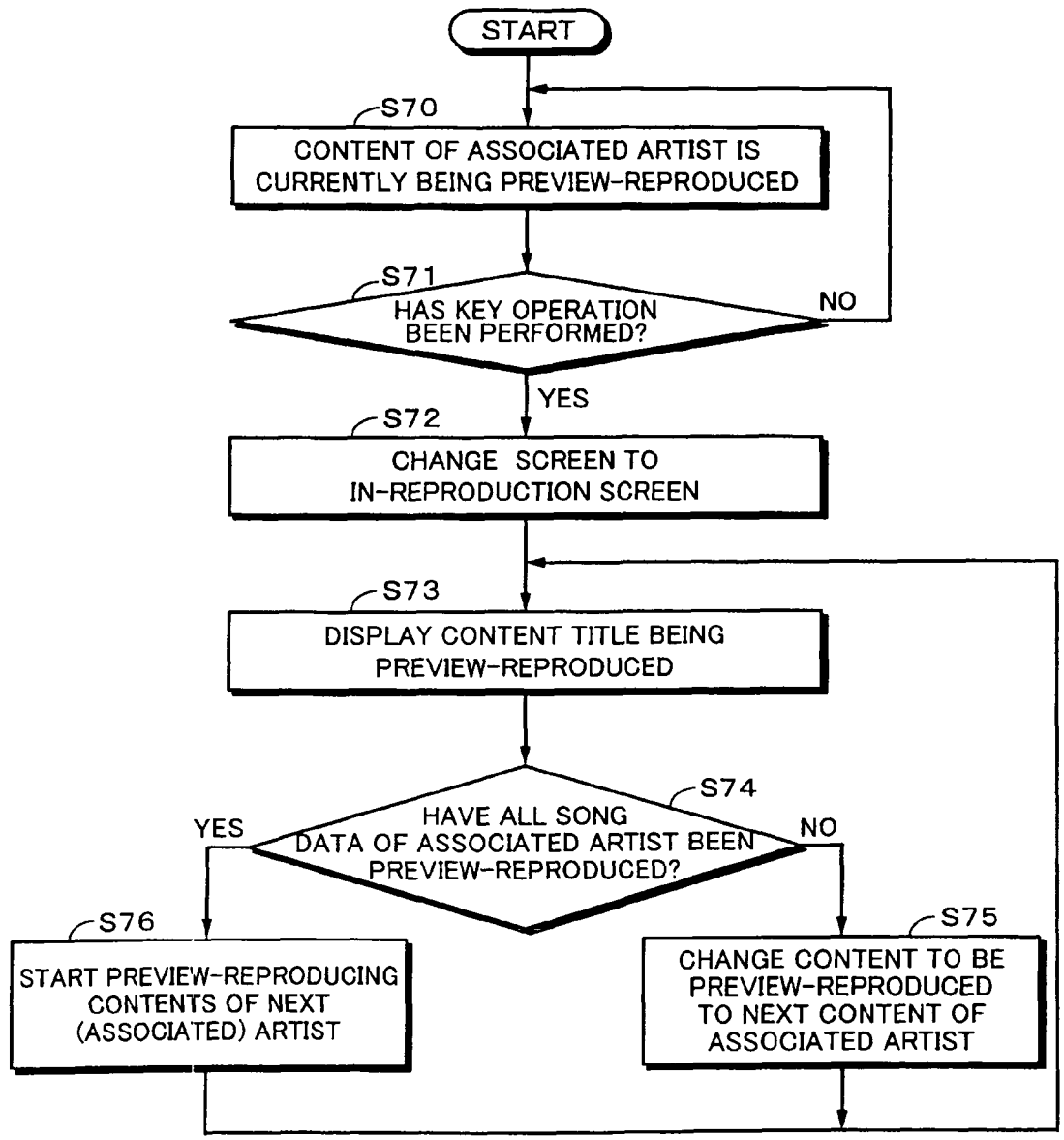
FIG. 22 is a flow chart showing an example of the process that performs the preview reproduction.

In a flow chart shown in FIG. 22, the display section 10 displays for example the content title list screen 105 for the associated artist shown in FIG. 21. The content data at the position of the cursor indication 70 are preview-reproduced (at step S70). When a predetermined operation is performed, i.e. a predetermined key is operated, for example the discovery key 14 of the operation section 20 is operated, while the preview reproduction for the content data is being performed (at step S71), the flow advances to step S72.

At step S72, the screen of the display section 10 is changed to a screen that displays information about content data that is currently being preview-reproduced. At the next step S73, this screen displays information of the content that is currently preview-reproduced. The information of the content that is currently being preview-reproduced can be displayed on a screen that is same as the normal reproduction screen 100.

Figure 23:
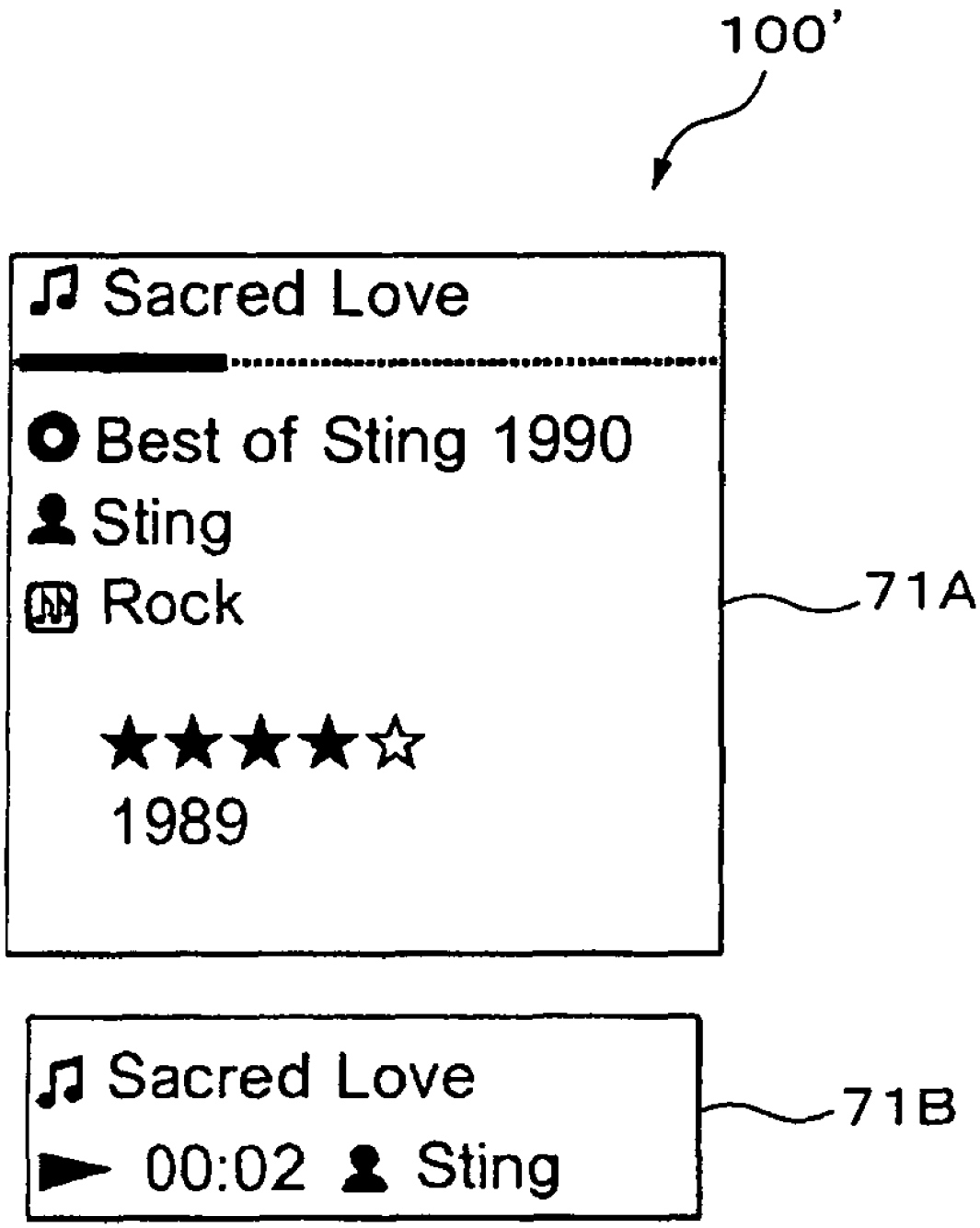
FIG. 23 is a schematic diagram showing an example in the case that preview content information is displayed on the normal reproduction screen.

FIG. 23 shows an example of the preview content information displayed on a normal reproduction screen 100'. The content name of the content that is currently being reproduced, the album name that contains the content, the artist name, the genre to which the content data belong, and the current reproduction elapse time of the content data are displayed in the list display portion 71A along with icons that represent the meanings of these information. Likewise, simplified information about the content data that are currently being reproduced and information that represents the reproduction elapse time after the start of the preproduction are displayed in the reproduction content display portion 71B. The preview content information display screen may also display information that represents that the preview reproduction is currently being performed.

After the preview reproduction for content data that are being reproduced has been completed (not shown), the flow advances to step S74. At step S74, it is determined whether all content data of the associated artist that had been selected have been reproduced from the hard disk drive 32. When the determined result represents that all content data of the associated artist have not been preview-reproduced (No in step S74), the flow advances to step S75. At step S75, the content data to be preview-reproduced are changed to the next content data of the associated artist. Thereafter, the flow returns to step S73. At step S73, information about the changed content data is displayed on the display section 10.

Figure 16:
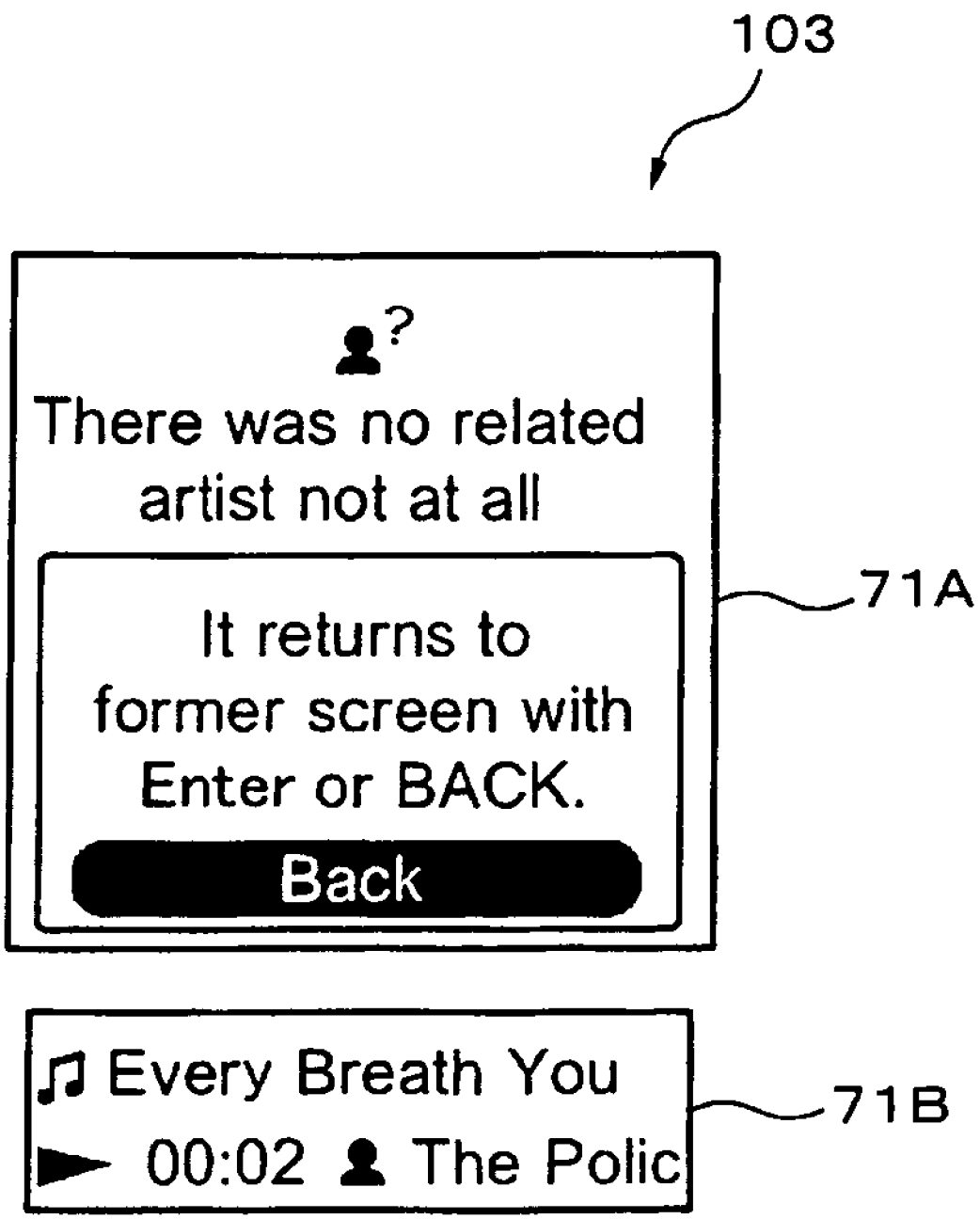
FIG. 16 is a schematic diagram showing an example of a screen that prompts the user to return to a screen that displays a content that is being reproduced.

In contrast, when the determined result at step S74 represents that all content data of the associated artist have been preview-reproduced (Yes in step S74), the flow advances to step S76. At step S76, content data of the next associated artist are successively preview-reproduced. The display section 10 may still display the normal reproduction screen 100', which displays information about content data that are currently being preview-reproduced. Instead, the screen of the display section 10 may be changed to the artist link information display screen as shown in FIG. 16, which displays the cursor indication 70 at the position of the selected associated artist.

When a predetermined operation is performed for the operation section 20 (for example, the reproduction key 12A or the enter key 13A is operated) while the preview reproduction is being performed in each of the foregoing cases, the reproduction mode can be changed from the preview reproduction mode to the normal reproduction mode. Thus, content data that are currently being preview-reproduced can be normally reproduced.

When content data of the selected target artist and content data of an associated artist of the target artist are automatically preview-reproduced, the user can search for his or her desired content data without the need to perform a complicated operation. Thus, while the user is operating the reproduction apparatus 1 outdoors, he or she can search for his or her desired content data without the need to watch data displayed on the display section 10.

In addition, since the screen of the display section 10 can be changed to another screen while the preview reproduction is being performed, the user can obtain various types of information about content data that are currently being reproduced.

3. Control Method of Preview Reproduction

Next, the control method of the foregoing preview reproduction will be described in detail.

3-1. File Structure

Figure 24:
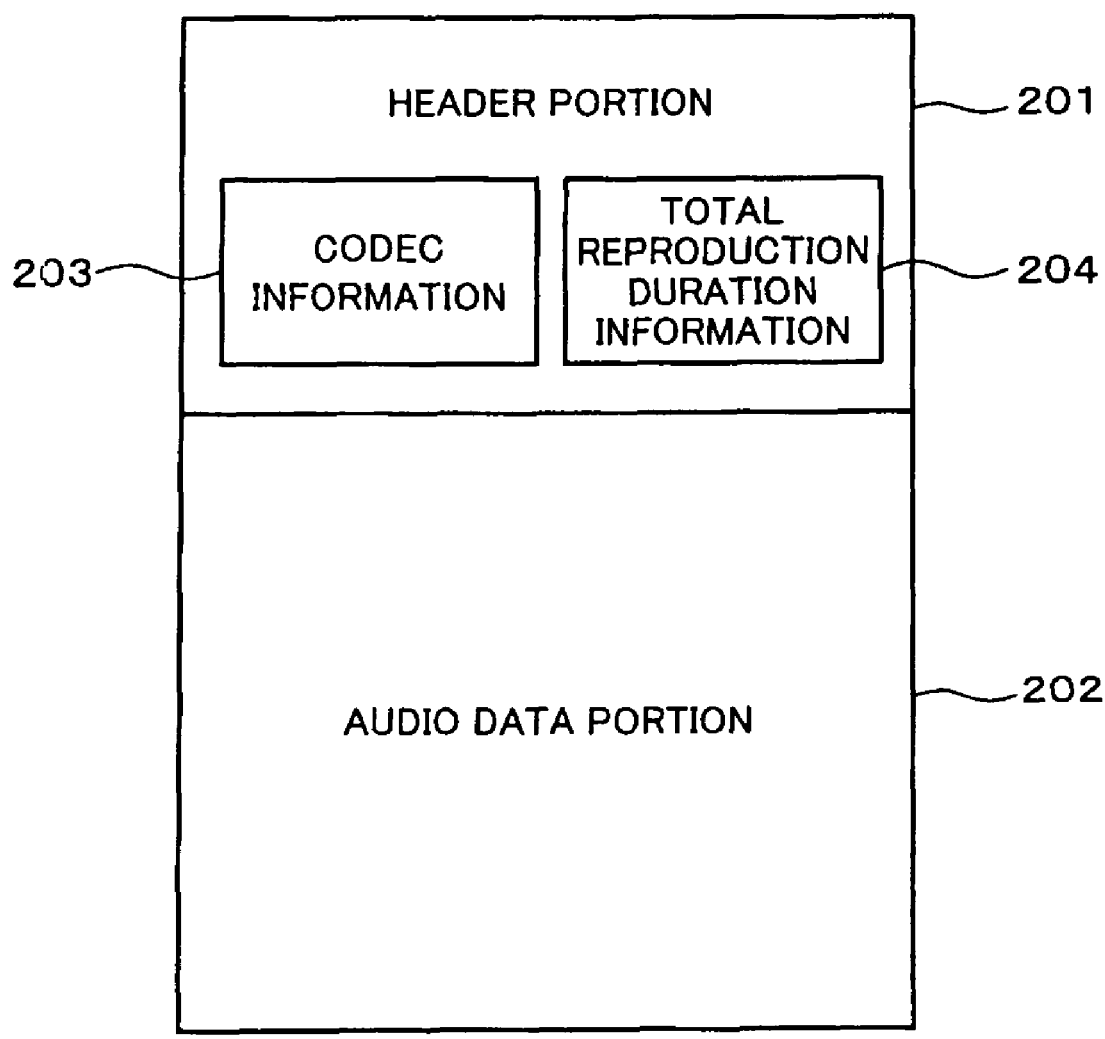
FIG. 24 is a schematic diagram showing an example of the structure of a content data file.

FIG. 24 shows an example of the structure of a content data file 200, which contains content data, according to this embodiment of the present invention. In this example, it is assumed that content data are audio data that have been compression-encoded according to a predetermined system.

The content data file 200 is mainly composed of a header portion 201 and an audio data portion 202. The audio data portion 202 contains the main part of audio data that have been compression-encoded. The header portion 201 contains attribute information about the main part of audio data contained in the audio data portion 202. The data size of the header portion 201 is described at a predetermined position of the header portion 201. With an offset of the data size of the header portion 201, the start position of the audio data portion 202 in the content data file 200 can be obtained.

The compression-encode system for audio data may be one of various systems such as for example MP3 (Moving Pictures Experts Group 1 Audio Layer 3), ATRAC3 (Adaptive Transform Acoustic Coding 3: registered trademark), AAC (Advanced Audio Coding), or WMA (Windows Media Audio: registered trademark). Instead, baseband audio data that have not been compression-encoded may be contained in the audio data portion 202.

The compression-encode system for audio data contained in the header portion 201 can be identified with for example an extension designated in a predetermined manner to the file name of the content data file 200. Instead, information that identifies the compression-encode system may be described at a predetermined position of the header portion 201.

Attribute information of the main part of audio data contained in the header portion 201 includes for example codec information 203 that is information about the compression-encode system for audio data and total reproduction duration information 204 that represents the duration from the beginning of reproduction to the end of reproduction for the whole main part of audio data contained in the audio data portion 202.

The codec information 203 is composed of information necessary to reproduce the audio data. When audio data contained in the content data file 200 are data that have been compression-encoded at a fixed frame bit rate, information that represents the bit rate of the compression-encoded audio data and/or the size of one frame thereof may be contained in the codec information 203. When audio data have been compression-encoded at a variable bit rate of which the bit rate per frame can be varied, information that represents the variable bit rate is contained in the codec information 203.

3-2. First Preview Reproduction Control Method 3-2-1. Flow of Process

Figure 25:
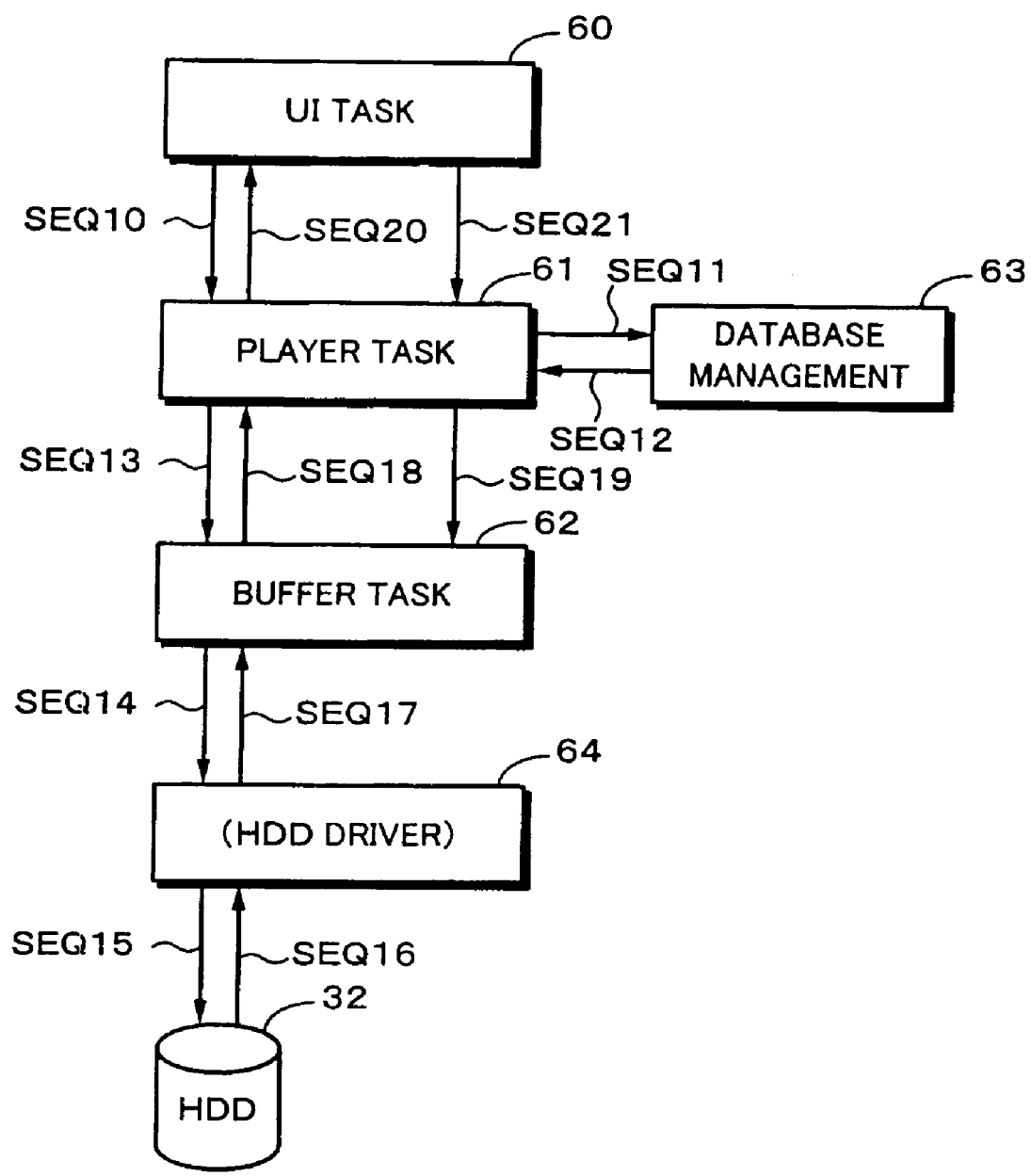
FIG. 25 is a schematic diagram showing an example of a flow of a process of a first preview reproduction control method.

In the first preview reproduction control method, a region to be preview-reproduced of audio data is selectively read from the hard disk drive 32 and stored in the buffer memory. FIG. 25 shows the relationship between an example of a flow of a process according to the first preview reproduction control method and the architecture described with reference to FIG. 4. Next, the case that while content A of artist A is being normally reproduced, the user operates the discovery key 14 of the operation section 20 will be described.

In this case, as described above, the artist link mode is started and the reproduction mode is changed to the preview reproduction mode. When an operation that moves the cursor indication 70 is not performed, audio data of artist A recorded in the hard disk drive 32 are automatically preview-reproduced in a predetermined order. Likewise, when the cursor indication 70 has been moved to the position of another artist information associated with artist A, and the cursor has been stopped for a predetermined time period or longer on the associated artist information display screen 104, audio data of the other artist are automatically preview-reproduced in the predetermined order.

According to the user's operation, the UI task 60 causes the player task 61 to start the preview reproduction (at SEQ 10). According to this, the player task 61 inquires of the database management task 63 about audio data to be preview-reproduced (at SEQ 11). According to this inquiry, the database management task 63 returns information about audio data to be preview-reproduced to the player task 61 (at SEQ 12). According to information returned from the database management task 63, the player task 61 designates audio data that the buffer task 62 needs to read from the hard disk drive 32 (at SEQ 13).

According to the request at SEQ 13, the buffer task 62 controls an HDD driver 64 to read the audio data from the hard disk drive 32 (at SEQ 14). The audio data that have been read are supplied to the buffer task 62 through the HDD driver 64 (at SEQ 16 and SEQ 17) and then stored in a buffer memory area of the RAM 37. Hereinafter, the buffer memory area of the RAM 37 is referred to as the buffer memory.

As described above, the preview reproduction reproduces only a part of the whole audio data. For example, when a target is preview-reproduced, the position at which 45 seconds have elapsed from the beginning of the audio data is referred to as the reproduction start time and the position at which 30 seconds more have elapsed from the reproduction start time, namely 1 minute and 15 seconds from the beginning of the audio data, is referred to as the reproduction end time. In other words, the preview reproduction is performed for 30 seconds from the position 45 into the audio data.

Figure 26:
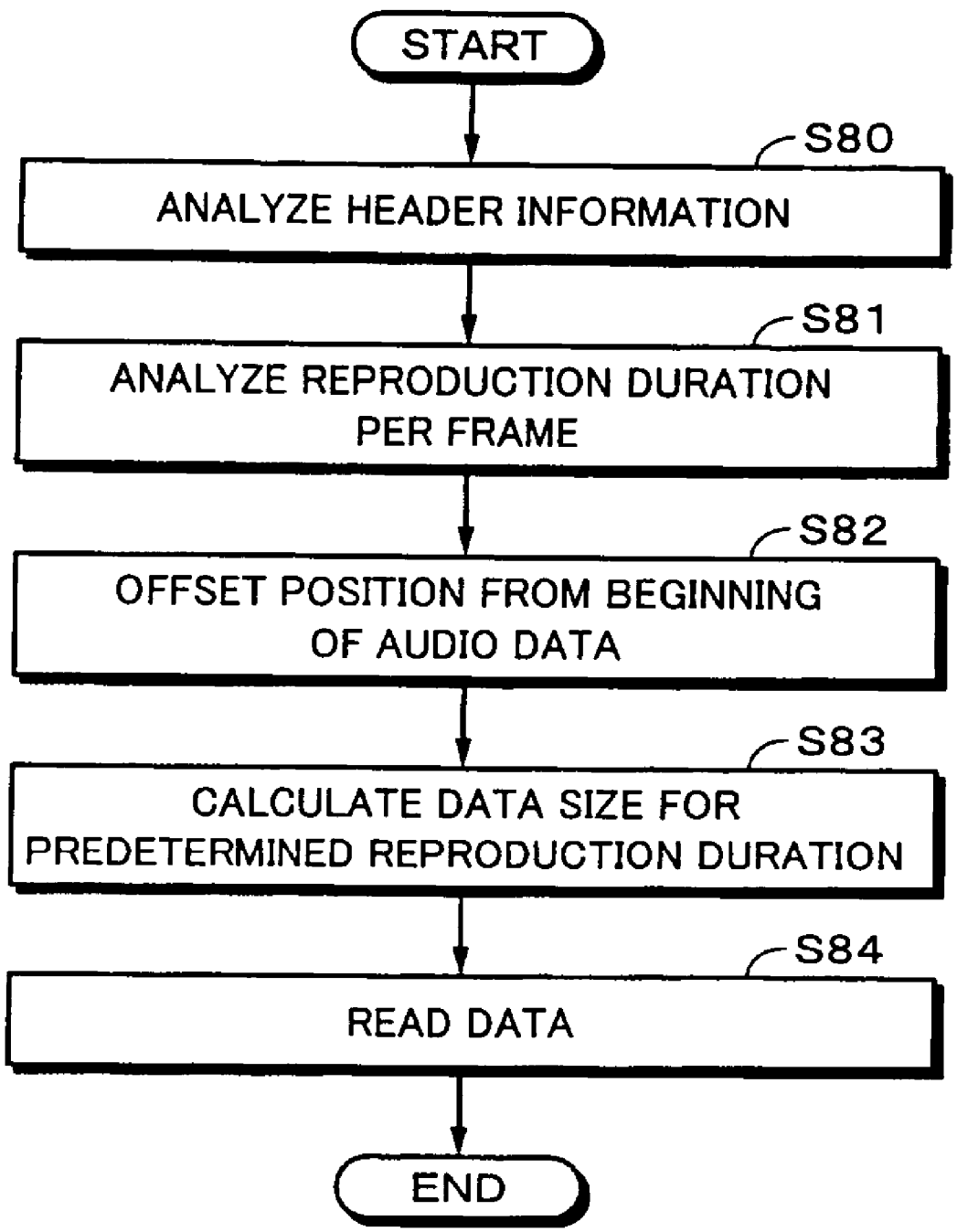
FIG. 26 is a flow chart showing an example of a process that reads audio data from a content data file to perform the preview reproduction in the first preview reproduction control method.

In the first preview reproduction control method, only a part of a content data file that contains audio data to be preview-reproduced is selected and read from the hard disk drive 32 and stored in the buffer memory. FIG. 26 is a flow chart showing an example of a process that reads audio data to be preview-reproduced from the content data file in the first preview reproduction control method. The process according to the flow chart is controlled mainly by the buffer task 62.

At step S80, the buffer task 62 controls the HDD driver 64 to access as a target to be preview-reproduced the content data file 200 recorded in the hard disk drive 32. The buffer task 62 reads the header portion 201 of the content data file 200 and temporarily writes the header portion 201 to the non-buffer area of the RAM 37. The buffer task 62 analyzes header information of the header portion 201 written to the RAM 37 and extracts the codec information 203 and the total reproduction duration information 204 contained in the header portion 201. The extracted information is stored in the non-buffer area of the RAM 37.

Thereafter, the flow advances to step S81. At step S81, according to the analyzed result of the header information, the reproduction duration per frame of the main part of the audio data stored in the audio data portion 202 of the content data file 200 is analyzed. When audio data contained in the content data file 200 have been compression-encoded for example at a fixed bit rate, the reproduction duration per frame can be obtained according to information that represents the frame size described in the codec information 203 and information of the bit rate at which the audio data have been compression-encoded.

Whether audio data contained in the content data file 200 have been compressed-encoded at a fixed bit rate or a variable bit rate can be determined depending on whether information that represents a variable bit rate is described in for example the codec information 203.

At the next step, S82, the offset of the preview reproduction start position from the beginning of the audio data portion 202 is calculated according to the reproduction duration per frame obtained at step S81. When the preview reproduction starts from the position at which 45 seconds have elapsed after the beginning of the audio data, a frame close to the value obtained by (45 seconds)/(reproduction duration per frame) is designated as the offset. At the next step, S83, the data size (the number of frames) necessary to reproduce the predetermined duration (in this example, 30 seconds) is calculated according to the information of the reproduction duration per frame obtained at step S81.

The preview reproduction start position information that represents the start position of the preview reproduction can be pre-stored in for example the ROM 42 when the preview reproduction start position is fixed. Instead, the preview reproduction start position information can be supplied from externally of the reproduction apparatus 1. The preview reproduction start position information may be described in for example the header portion of a content file that contains content data. In this case, when content data are reproduced, the header information of the content file is analyzed. The preview reproduction start position information is extracted. According to the extracted preview reproduction start position information, the offset of the preview reproduction is obtained. When the preview reproduction start position information is supplied externally of the reproduction apparatus 1, the preview reproduction start position can be varied for example in each content.

When the offset of the audio data portion 202 from the beginning of the file and the data size necessary to reproduce audio data for a predetermined duration have been obtained, the flow advances to step S84. At step S84, audio data are read from the hard disk drive 32 according to the obtained information. In other words, at step S84, the content data file 200 of the hard disk drive 32 is accessed. The audio data are read for the data size calculated at step S83 from the offset position obtained at step S82. The audio data that have been read are stored in the buffer memory.

When the audio data stored in the content data file 200 have been compression-encoded at a variable bit rate, the offset of the portion to be preview-reproduced and the data size necessary to reproduce audio data for a predetermined duration may be approximately obtained according to the information contained in the header portion 201 and information supplied from the file system provided by the OS 68.

When the value of the average bit rate at which audio data have been compression-encoded is described as the codec information 203 of the header portion 201, with the value of the average bit rate, the offset value and the data size necessary to preview-reproduce audio data can be obtained.

When the value of the average bit rate is unknown, for example with information of the data size of the audio data portion 202 and the ratio of the preview reproduction start time (45 seconds) to the total reproduction duration information 204, the offset of the start position of the preview reproduction to the audio data portion 202 can be obtained for example as the byte position of the content data file 200. Likewise, with the information of the data size of the audio data portion 202 and the ratio of the preview reproduction end time (45 seconds+30 seconds) to the total reproduction duration information 204, the preview reproduction end position can be obtained for example as the byte position of the file 200.

The size of the audio data portion 202 can be obtained for example with the information that represents the data size of the header portion 201 contained in the codec information 203 and the data size of the content data file 200 supplied from the file system.

At step S84, the buffer task 62 reads audio data from the hard disk drive 32 according to the offset position information and the preview reproduction end position information.

Returning to FIG. 25, after audio data for one content have been read from the hard disk drive 32 and stored in the buffer memory, the buffer task 62 informs the player task 61 of this situation (at SEQ 18). The player task 61 inquires of the database management task 63 about audio data to be read next. The player task 61 supplies the information returned from the database management task 63 about audio data to be read next to the buffer task 62 (at SEQ 19).

In the foregoing manner, the buffer task 62 reads information of the header portion 201 of the content data file 200 according to the supplied information about audio data, obtains the offset position of the audio data portion 202 to be preview-reproduced, the data size of audio data to be preview-reproduced, and so forth, reads audio data from the hard disk drive 32 according to the process from SEQ 14 to SEQ 17, and stores the audio data to the buffer memory.

The operation that stores audio data to be preview-reproduced to the buffer memory starts at step S33 of the flow chart shown in FIG. 12. In other words, while the display section 10 displays the in-search screen 101 shown in FIG. 14, audio data to be preview-reproduced are read from the hard disk drive 32 and the audio data that have been read therefrom are written to the buffer memory.

Figure 27:
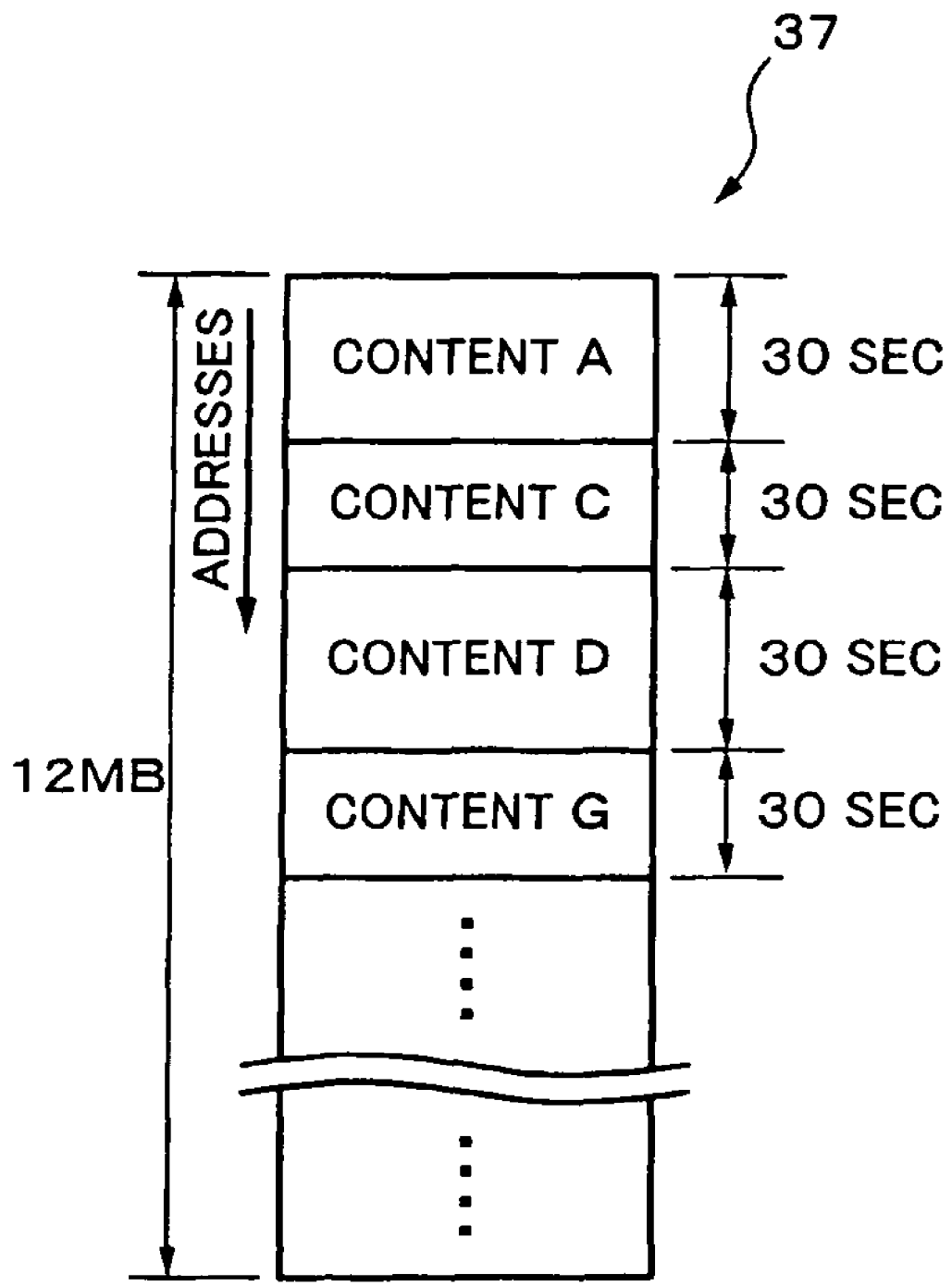
FIG. 27 is a schematic diagram showing the state of which audio data are stored in a buffer memory.

FIG. 27 shows the state of which audio data read from the hard disk drive 32 are stored in the buffer memory. In this example, an area of 12 MB to 16 MB of the RAM 37 is allocated for the buffer area that stores audio data. As exemplified in FIG. 27, audio data that are read from the hard disk drive 32 for a predetermined duration are stored from the beginning of the buffer memory area. In this example, audio data of content A, content C, content D, and so forth stored in the buffer memory differ in bit rate. They also differ in data size although their preview reproduction durations are the same.

When audio data that exceed a predetermined amount are stored in the buffer memory, the player task 61 performs an operation that preview-reproduces audio data from the buffer memory. For example, the buffer task 62 monitors the state of the buffer memory. When audio data that exceed a predetermined amount are stored in the buffer memory, the buffer task 62 informs the decoder control task 65 of this situation. The decoder control task 65 reads audio data from the buffer memory for a decode unit at a time and supplies the audio data to the decoder 43 through the decoder control section 67.

For example, when the preview reproduction for content A that is the first content to be preview-reproduced is started, the buffer task 62 sets the read pointer to the beginning of content A, namely the first address of the buffer memory. According to the read request from the decoder control task 65, the buffer task 62 moves the read pointer. The decoder control task 65 reads audio data from the buffer memory according to the read pointer and decodes the audio data for each decode unit.

After content A has been read and the read pointer has come to the end of content A, namely the beginning of content C, after a predetermined pause time period has elapsed, the buffer task 62 moves the read pointer to the beginning of content C in the same manner. When the buffer task 62 repeats this operation, audio data to be preview-reproduced can be successively reproduced from the buffer memory.

Figure 28A:
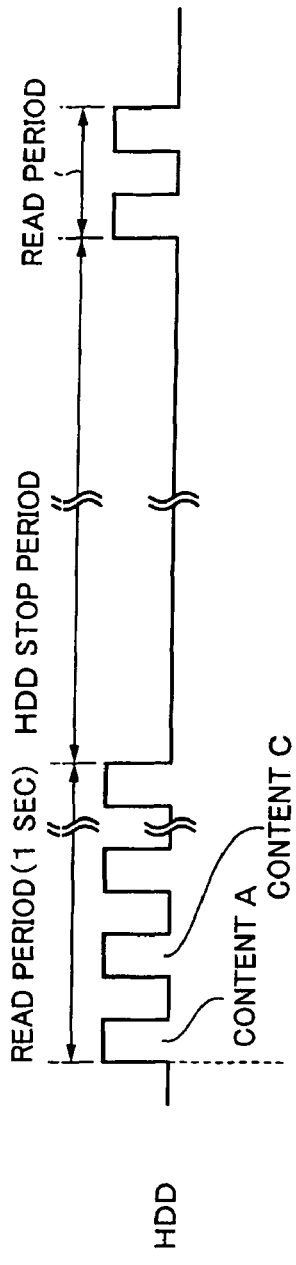
FIGS. 28A-28C are timing charts showing examples of access timings of a hard disk drive and the buffer memory to preview-reproduce audio data.
Figure 28B:
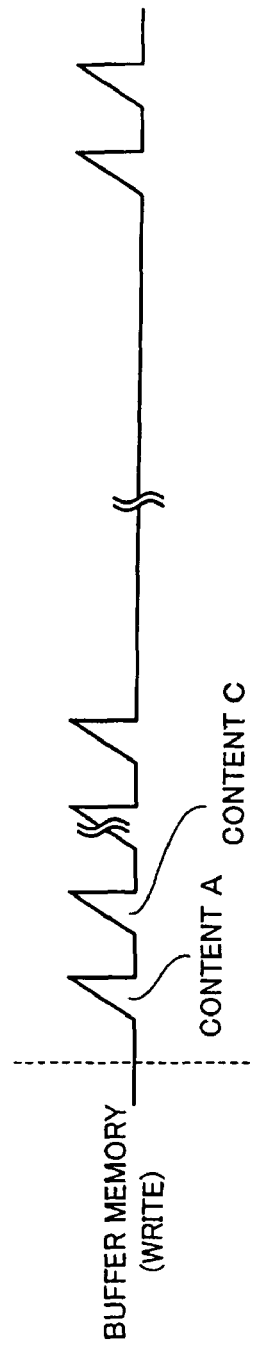
Figure 28C:
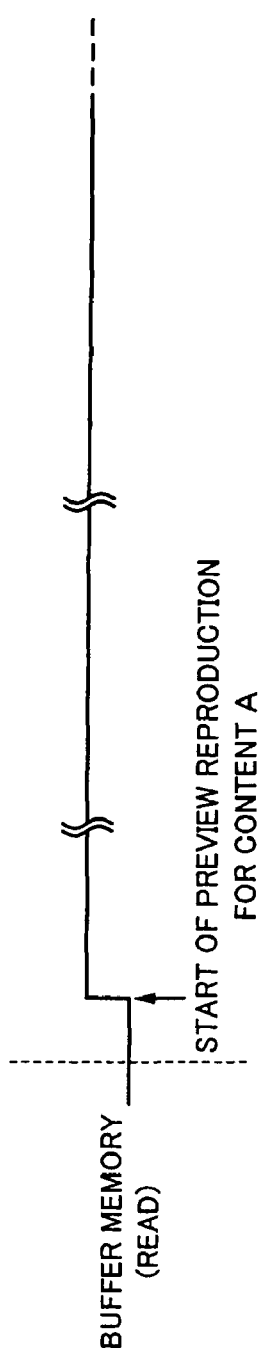

FIG. 28 shows examples of access timings of the hard disk drive 32 and the buffer memory to audio data to be preview-reproduced. FIG. 28A shows a timing at which audio data are read from the hard disk drive 32. FIG. 28B shows a timing at which audio data are read from the hard disk drive 32 and written to the buffer memory. FIG. 28C shows a timing at which audio data to be preview-reproduced are read from the buffer memory.

As described above, after audio data of one content to be preview-reproduced have been stored in the buffer memory, the buffer task 62 requests the player task 61 to send information about audio data to be stored next. In other words, as exemplified in FIG. 28A and FIG. 28B, when data to be preview-reproduced of content A are read from the hard disk drive 32, the data are stored in the buffer memory. After audio data of one content have been written to the buffer memory, the buffer task 62 requests the player task 61 to send information about audio data to be stored next. According to the returned information, data of content C are read from the hard disk drive 32. The data that have been read are written to the buffer memory.

This sequence of operations is repeated until the preview reproduction is completed or the space of the buffer memory becomes zero. The number of tracks of audio data that are preview-reproduced and stored in the buffer memory may be restricted.

Data are read from the hard disk drive 32 and data are written to the buffer memory at a very high speed in comparison with the reproduction duration of audio data that are read. When the number of tracks stored in the buffer memory is limited to for example around 12, the audio data can be read from the hard disk drive 32 and written to the buffer memory within for example around one second.

On the other hand, as exemplified in FIG. 28C, when data of the first content A stored in the buffer memory exceed a predetermined amount, the preview reproduction for data read from the buffer memory can be started.

As described above, when the preview reproduction for content A has been started and around 1 second has elapsed, since a plurality of tracks of data have been stored in the buffer memory, until the preview reproduction for at least one content has been completed, it is not necessary to read data from the hard disk drive 32. Thus, as shown in FIG. 28A, for a time period of for example several ten seconds after a sequence of data are read from the hard disk drive 32 before the next data are read therefrom, the operation thereof can be stopped. Thus, when a plurality of tracks of audio data to be preview-reproduced are successively read and stored in the buffer memory, the operation of the hard disk drive 32 can be stopped. Thus, the power consumption of the hard disk drive 32 can be decreased.

The addresses of data stored in the buffer memory are always managed by the buffer task 62. Thus, while a particular content is being preview-reproduced, for example the next content can be jumped to.

Figure 29:
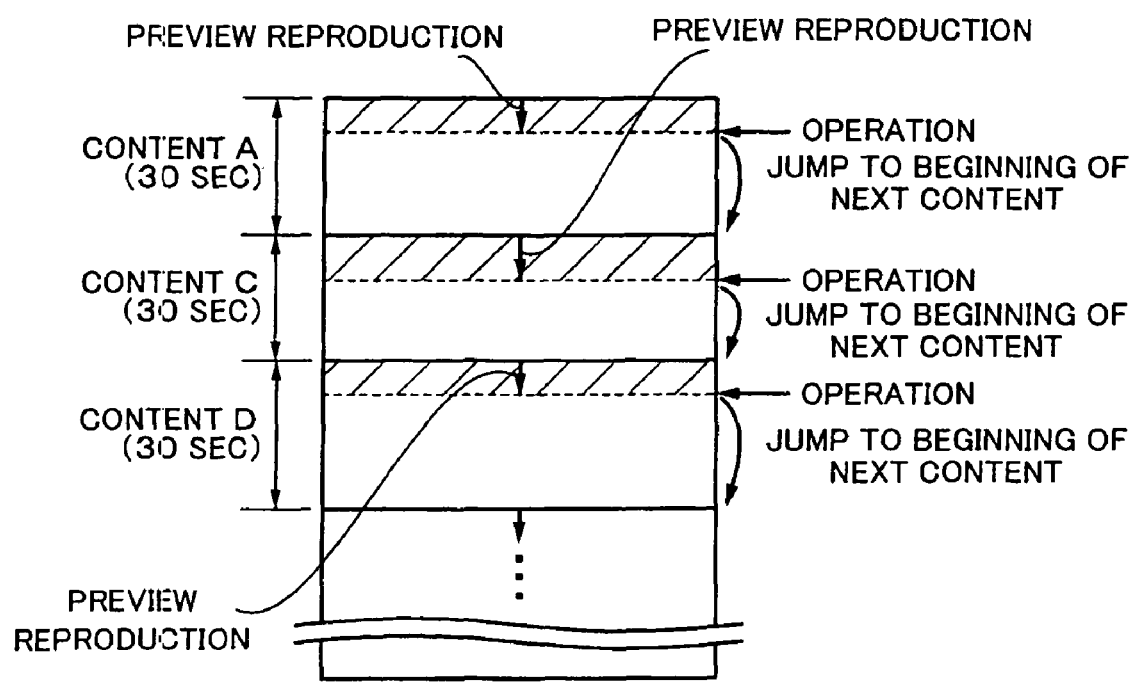
FIG. 29 is a schematic diagram describing a control to jump from a particular content that is being preview-reproduced to the next content to be preview-reproduced.

As exemplified in FIG. 29, while content A is being preview-reproduced, when the user operates the operation section 20 to preview-reproduce content C, the corresponding command is sent from the UI task 60 to the buffer task 62 through the player task 61. According to this command, the buffer task 62 moves the read pointer of the buffer memory to the beginning of content C. According to the read pointer, the decoder control task 65 reads preview reproduction audio data from the beginning of content C and reproduces content C. While content C is being preview-reproduced, the same operation can be performed. In the preview reproduction mode, a part of content data of each track can be successively reproduced without the need to reproduce the whole audio data for the pre-designated preview reproduction duration (in this example, 30 seconds).

The buffer task 62 supplies information about data read by the decoder control task 65 to the player task 61. The player task 61 supplies information about audio data that is currently being preview-reproduced to the UI task 60 according to the information supplied from the buffer task 62. The UI task 61 can display information about audio data that are currently being reproduced on the display section 10 according to the information supplied from the player task 61.

Audio data for which the preview reproduction has been completed can be erased from the buffer memory. At this point, the user may preview-reproduce content data that have been preview-reproduced. Thus, it is preferred that audio data that have been reproduced be stored in the buffer memory for one or two contents.

3-2-2. Operation That Changes Preview Reproduction Mode to Normal Reproduction Mode Next, with reference to FIG. 30, an example of which two operations in the case that the reproduction mode is changed from the preview reproduction mode to the normal reproduction mode described with reference to FIG. 8 are applied to the first preview reproduction control method will be described.

Figure 30A:
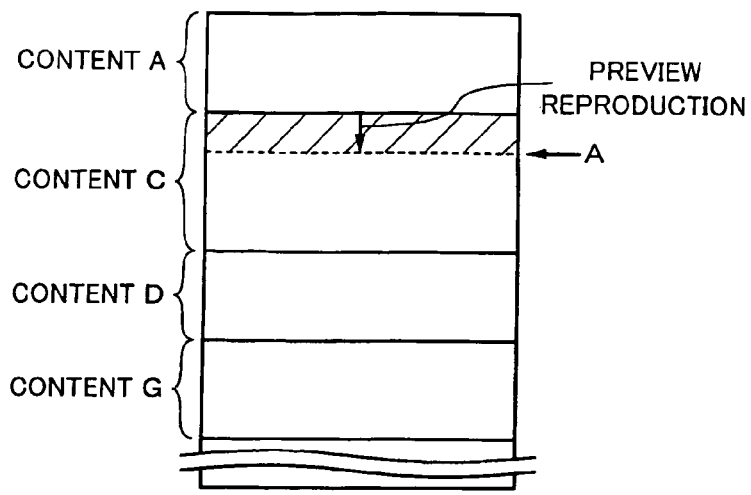
FIGS. 30A-30C are schematic diagrams describing a process that changes the preview reproduction to the normal reproduction in a first preview reproduction control method.
Figure 30B:
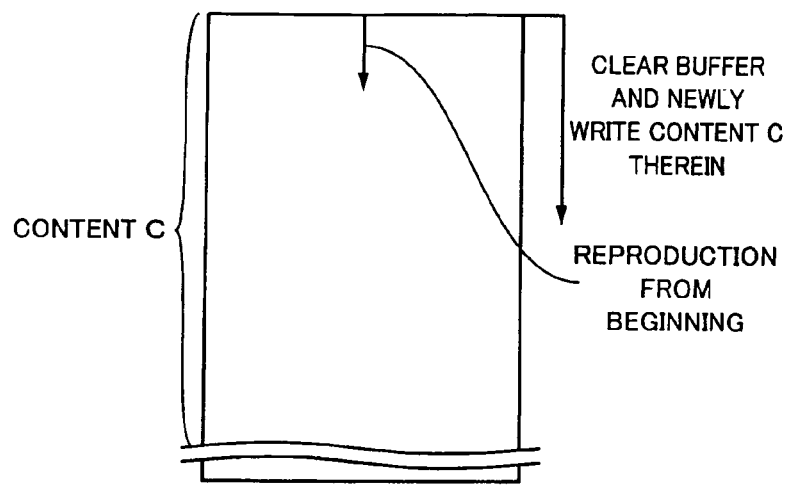
Figure 30C:
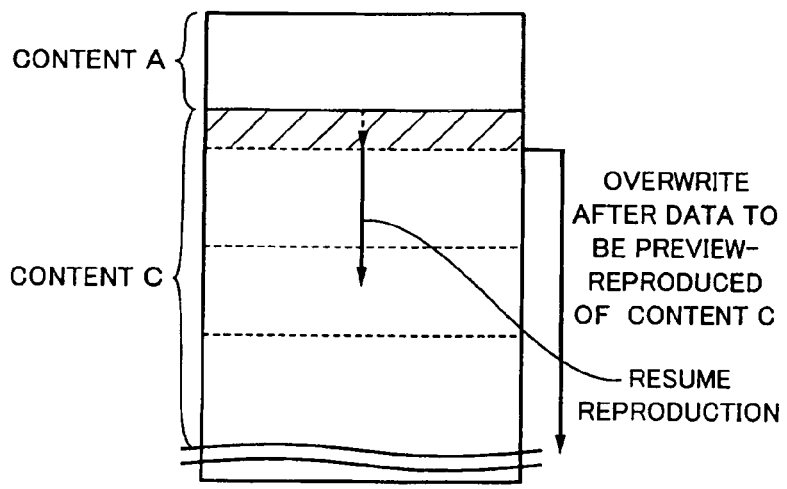

As exemplified in FIG. 30A, it is assumed that audio data to be preview-reproduced have been stored in the buffer memory in the order of content A, content C, content D, content G, and so forth. In addition, it is assumed that while content C is being preview-reproduced, at a timing of which the read pointer is placed at position A, by operating for example the enter key 13A, the reproduction mode is changed from the preview reproduction mode to the normal reproduction mode.

Next, the first method of starting reproducing content data that have been preview-reproduced from the beginning will be described (see FIG. 8A). In this case, as exemplified in FIG. 30B, the contents of the buffer memory are cleared. Thereafter, the whole audio data of content C are read from the hard disk drive 32 and written to the buffer memory. The buffer task 62 sets the read pointer to the beginning (namely, the beginning of the buffer memory) of audio data of content C. The decoder control task 65 decodes audio data of content C according to the read pointer and reproduces the audio data.

Next, the second method of resuming the reproduction from the position at which the preview reproduction has been stopped will be described (see FIG. 8B). In this case, as exemplified in FIG. 30C, audio data of content C are read from the hard disk drive 32 after audio data that have been stored in the buffer memory for the preview reproduction. The audio data that have been read from the hard disk drive 32 are written after the end of audio data of content C that have been stored in the buffer memory. Thus, audio data to be preview-reproduced of content D, content G, and so forth after content C stored in the buffer memory are overwritten with audio data of content C.

In the second method, after the reproduction mode has been changed from the preview reproduction mode to the normal reproduction mode, the buffer task 62 moves the read pointer immediately after the position at which it has been placed in the preview reproduction mode. Thus, when the reproduction mode is changed from the preview reproduction mode to the normal reproduction mode, the decoder control task 65 continuously reproduces audio data of content C from the buffer memory. As a result, when the reproduction mode is changed, audio data can be successively reproduced.

Next, the operation that changes the reproduction mode from the normal reproduction mode to the preview reproduction mode will be described. In this case, there are two methods. In the first method, the contents of the buffer memory are cleared and then audio data to be preview-reproduced are read. In the second method, a part or all of the audio data that are being reproduced in the normal reproduction mode is left in the buffer memory and audio data to be preview-reproduced are overwritten over the audio data left in the buffer memory.

In these methods, the method of clearing the contents of the buffer memory can be performed in the same manner as the method of reading audio data to be preview-reproduced from the hard disk drive 32 and storing them in the buffer memory. For example, after the reproduction of the normal reproduction mode is paused, audio data stored in the buffer memory are cleared. Thereafter, in the foregoing method, audio data to be preview-reproduced are read from the hard disk drive 32 and stored in the buffer memory.

Next, with reference to FIG. 31, the case in which audio data to be preview-reproduced are overwritten in the buffer memory will be described. In this case, when the reproduction mode is changed, the process to be performed next may depend on what part of content data has been reproduced in the normal reproduction mode. (1) When region $PV_A$ to be preview-reproduced of content A has not been reproduced or (2) while it is being reproduced (2) as exemplified in FIG. 31B, after region $PV_A$ to be preview-reproduced of content A, region $PV_B$ to be preview-reproduced of content B, region $PV_C$ to be preview-reproduced of content C, and so forth are overwritten.

Figure 31A:
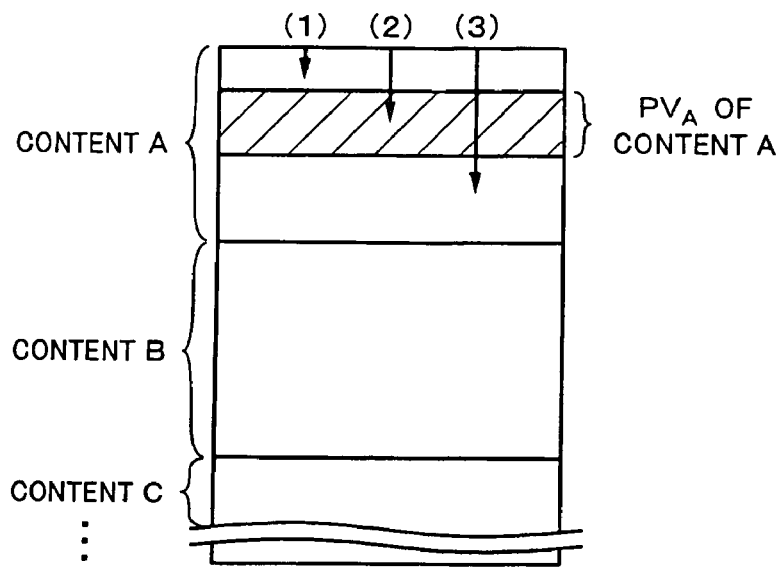
FIGS. 31A-31C are schematic diagrams describing a process that changes the normal reproduction mode to the preview reproduction mode in the first preview reproduction control method.
Figure 31B:
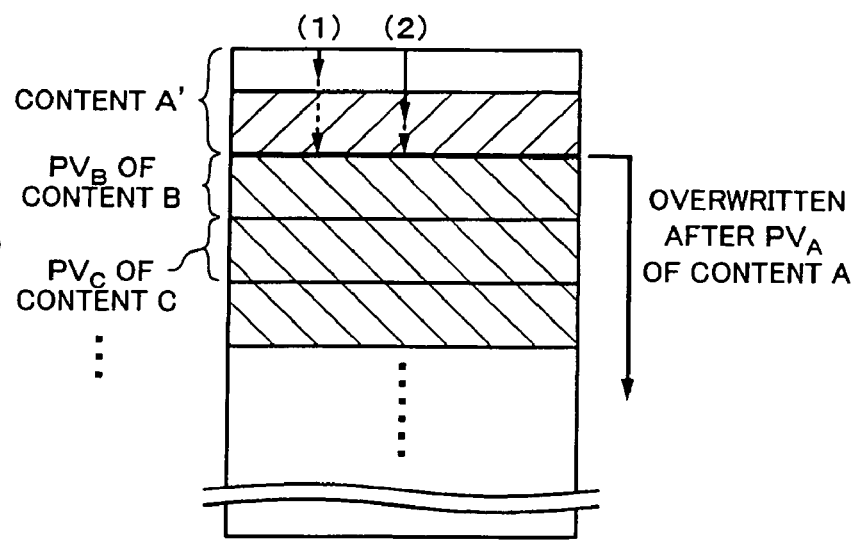
Figure 31C:
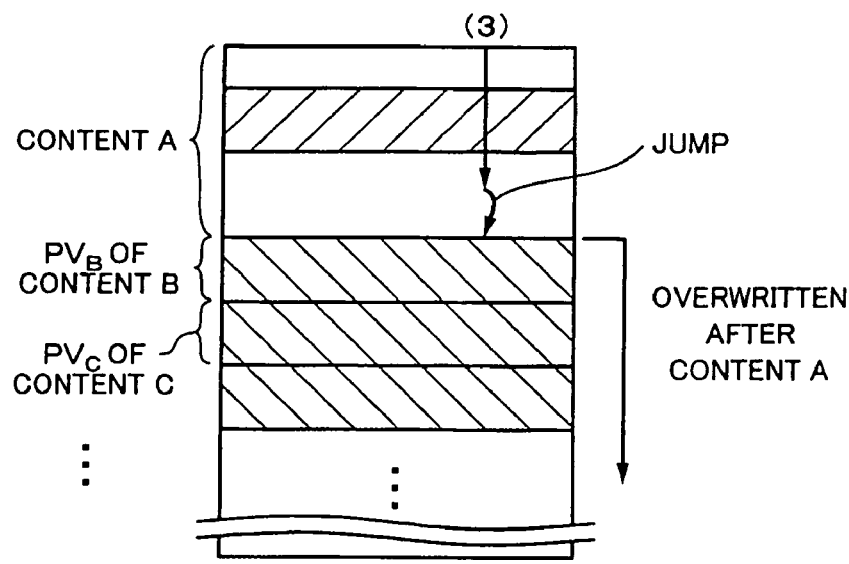

On the other hand, (3) while content data after region $PV_A$ to be preview-reproduced of content A are being reproduced shown in FIG. 31A, when the reproduction mode is changed to the preview reproduction mode, as exemplified in FIG. 31C, audio data of content A are left in the buffer memory and after content A, region $PV_B$ to be preview-reproduced of content B, region PVC to be preview-reproduced of content C, and so forth are overwritten. The read pointer is jumped to the beginning of region $PV_B$ to be preview-reproduced.

These controls that change the normal reproduction mode to the preview reproduction mode are just examples of methods that accomplish this embodiment. The present invention is not limited to these controls.

As described with reference to FIG. 19, while audio data are being reproduced in the normal reproduction mode, the reproduction mode may be changed from the normal reproduction mode to the preview reproduction mode. While audio data are being reproduced in the preview reproduction mode, the reproduction mode may be changed from the preview reproduction mode to the normal reproduction mode. The normal reproduction for a content may be resumed from the position at which the normal reproduction mode has been changed to the preview reproduction mode. Next, with reference to FIG. 32, the buffer memory control that considers this case will be described.

Figure 32A:
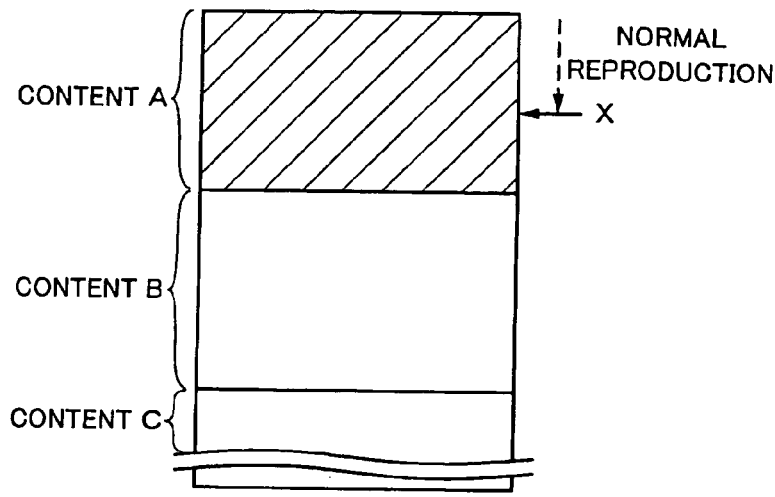
FIGS. 32A-32C are schematic diagrams describing a process that resumes the normal reproduction after the preview reproduction in the first preview reproduction control method.

As exemplified in FIG. 32A, in the normal reproduction mode, whole content data (contents A, B, C, and so forth) to be reproduced are stored from the beginning of the buffer memory. In this example, it is assumed that when content A has been reproduced from the beginning to position X in the normal reproduction mode, the reproduction mode is changed from the normal reproduction mode to the preview reproduction mode.

When the reproduction mode is changed to the preview reproduction mode, the reproduction for content A in the normal reproduction mode is stopped and stop position X is stored. A region to be preview-reproduced of content data is read from the hard disk drive 32 and stored in the buffer memory.

Figure 32B:
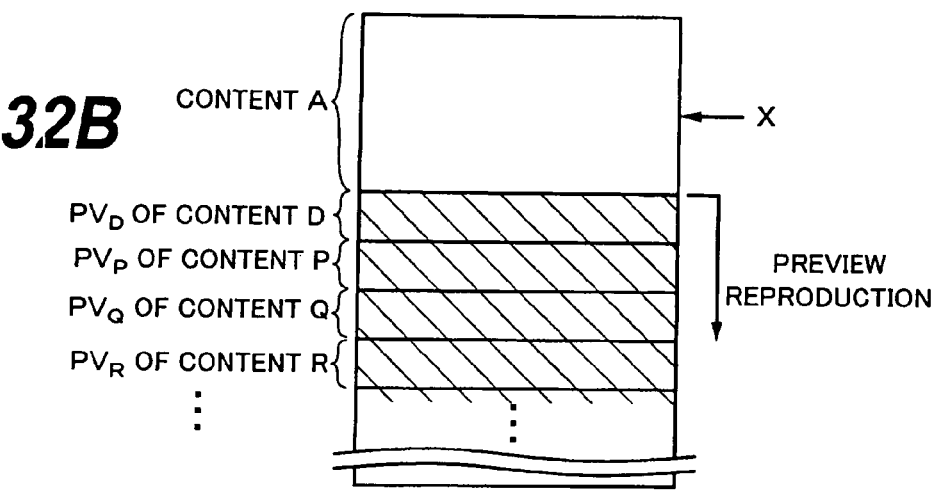

At this point, as exemplified in FIG. 32B, data of a content (in the example shown in FIG. 32, content A) that had been reproduced in the normal reproduction mode immediately before the normal reproduction mode was changed to the preview reproduction mode is left in the buffer memory. Content data to be preview-reproduced (assuming region $PV_D$ to be preview-reproduced, region $PV_P$ to be preview-reproduced, region $PV_Q$ to be preview-reproduced, and so forth) are successively stored after data of content A left in the buffer memory.

When the first data to be preview-reproduced (in the example shown in FIG. 32, region $PV_D$ to be preview-reproduced of content D) are read to the buffer memory, the read pointer is moved from position X at which the reproduction for content A was stopped to the first data to be preview-reproduced, namely the beginning of region $PV_D$ to be preview-reproduced of content D.

Figure 32C:
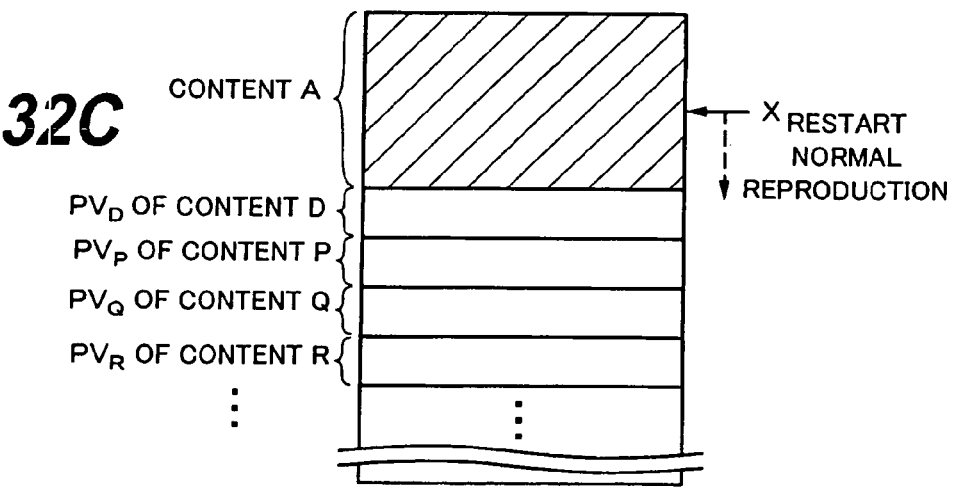

When the preview reproduction is stopped and the reproduction for a content (content A) that had been reproduced in the normal reproduction mode immediately before the reproduction mode was changed to the preview reproduction mode is resumed, as exemplified in FIG. 32C, the read pointer is moved back to position X and content A left in the buffer memory is reproduced from position X.

When the preview reproduction is stopped and the reproduction for content A is resumed, content data (not shown) to be reproduced after content A can be read from the hard disk drive 32. In this case, content data that have been read are overwritten to data of region $PV_D$ to be preview-reproduced, region $PV_P$ to be preview-reproduced, region $PV_Q$ to be preview-reproduced, and so forth and stored after content A whose reproduction has been resumed.

3-3. Second Preview Reproduction Control Method

Next, the second preview reproduction control method will be described. In the second preview reproduction control method, like the normal reproduction mode, whole audio data to be reproduced are read from the hard disk drive 32 and stored in the buffer memory.

3-3-1. Flow of Process

FIG. 33 shows an example of the sequence of the preview reproduction in the second preview reproduction control method. When for example the discovery key 14 of the operation section 20 is operated, the artist link mode is started (at step S90). When the artist link mode is started, a pause command is issued from the UI task 60 to the player task 61 (at SEQ 31). This pause command is sent from the player task 61 to the buffer task 62 (at SEQ 32). When the buffer task 62 receives the pause command, the buffer task 62 temporarily stops reading data from the buffer memory.

The buffer task 62 informs the UI task 60 that the buffer task 62 has executed the pause command through the player task 61 (at SEQ 33 and SEQ 34). When the UI task 60 receives this information, the UI task 60 issues a command that causes the player task 61 to read audio data to be preview-reproduced from the hard disk drive 32 (at SEQ 35). When the player task 61 receives this command, the player task 61 inquires of the database management task 63 about content information to be preview-reproduced (at SEQ 36). According to the obtained content information, the player task 61 issues a data read command to the buffer task 62 (at SEQ 37).

According to the read command, the buffer task 62 reads the content data file 200 from the hard disk drive 32 (at SEQ 38 and SEQ 39). Audio data to be stored in the audio data portion 202 are extracted from the content data file 200 and successively stored in the buffer memory. As in the foregoing example of the first preview reproduction control method, the process that stores audio data to the buffer memory is started at step S33 of the flow chart shown in FIG. 12 and performed while the in-search screen 101 shown in FIG. 14 is displayed.

The buffer task 62 temporarily writes the header portion 201 of the content data file 200 to the non-buffer memory area of the RAM 37 and analyzes the header information (at step S91). The header information as the analyzed result is stored in the RAM 37 and supplied to the player task 61.

The header information is analyzed in the same manner as the foregoing first preview reproduction control method. For example, the buffer task 62 obtains information contained in the header portion 201 (see step S80 of the flow chart shown in FIG. 26). The buffer task 62 obtains the reproduction duration per frame according to the obtained header information (see step S81 of the flow chart shown in FIG. 26). In addition, the buffer task 62 obtains the offset of the start position of the preview reproduction from the beginning of audio data according to information that represents the reproduction duration per frame (see step S82 of the flow chart shown in FIG. 26). In addition, the buffer task 62 calculates the number of frames to reproduce for audio data for a predetermined reproduction duration (in this example, 30 seconds) according to information that represents the reproduction duration per frame (see step S83 of the flow chart shown in FIG. 26).

The buffer task 62 determines whether audio data stored in the buffer memory exceed a predetermined amount. When the determined result represents that audio data stored in the buffer memory exceed a predetermined amount, the buffer task 62 informs the UI task 60 of this situation through the player task 61 (at SEQ 41 and SEQ 42). When the UI task 60 has been informed of this situation, the UI task 60 issues a cue command to the player task 61 (at SEQ 43). According to a cue command, the player task 61 issues a command to the buffer task 62 so that the read pointer is moved to the offset position obtained as the analyzed result of the header information (at SEQ 44).

Figure 34:
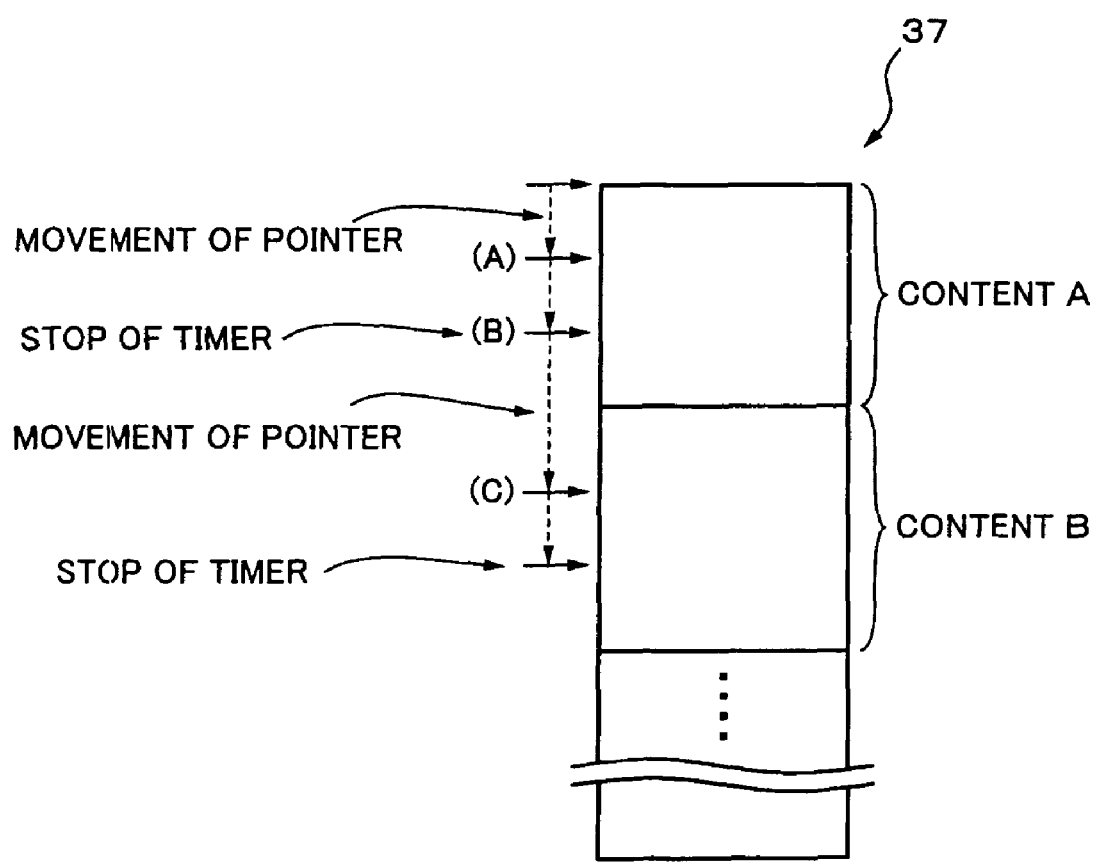
FIG. 34 is a schematic diagram showing the state of which a read pointer is moved in the second preview reproduction control method.

According to this command, the buffer task 62 moves the read pointer to the offset position. FIG. 34 shows the state in which the read pointer is moved by the buffer task 62. It is assumed that whole audio data of content A, content B, and so forth have been stored in the buffer memory. The position of the offset, namely the position at which 45 seconds have elapsed from the beginning of audio data of for example content A is denoted by position (A). The position at which 30 seconds have elapsed from position (A) is denoted by position (B). The region from position (A) to position (B) is a region to be preview-reproduced. The command at SEQ 44 causes the read pointer to be moved from the beginning of audio data of content A to position (A).

After the read pointer has been moved, the buffer task 62 informs the UI task 60 of this situation through the player task (at SEQ 45 and SEQ 46). When the UI task 60 has been informed of this situation, the UI task 60 issues a pause release command to the player task 61 (at SEQ 47). According to this pause release command, the player task 61 issues a command to the buffer task 62 to read data from the buffer memory (at SEQ 48). According to this command, the buffer task 62 reads data from the buffer memory. The data that have been read are sent from the decoder control task 65 to the decoder 43. The decoder 43 decodes the data.

When the UI task 60 issues the pause release command at SEQ 47, the flow advances to step S92. At step S92, the real time clock 46 starts counting time. When a predetermined time period corresponding to the duration of the preview reproduction has elapsed (for example 30 seconds), the UI task 60 issues a pause command. The pause command is supplied to the buffer task 62 through the player task 61 (at SEQ 49 and SEQ 50). According to the pause command, the buffer task 62 stops reading data from the buffer memory. In the example shown in FIG. 34, at position (B), 30 seconds have elapsed from position (A), the buffer task 62 stops reading data from the buffer memory. When the buffer task 62 stops reading data from the buffer memory, the UI task 60 is informed of this situation through the player task 61 (at SEQ 51 and SEQ 52).

When the UI task 60 has been informed of this situation at SEQ 52, the flow returns to SEQ 43 (not shown). At SEQ 43, the UI task 60 issues a cue command to the buffer task 62 though the player task 61 to preview-reproduce the next content. According to the cue command, the buffer task 62 moves the read pointer to the offset position of the next audio data stored in the buffer memory (in the example shown in FIG. 34, position (C) of content B). In this manner, contents can be successively preview-reproduced.

The buffer task 62 reads audio data from the hard disk drive 32 at SEQ 38 and stores the audio data to the buffer memory at SEQ 40 while other processes are being performed after SEQ 38. When whole audio data of one content data file 200 have been stored in the buffer memory, the next content data file 200 is read from the hard disk drive 32. The lower portion below the dotted line of FIG. 33B represents this process.

The process that reads audio data from the hard disk drive 32 and stores the audio data to the buffer memory is continued in parallel with the foregoing preview reproduction control process (at SEQ 40). After one content of audio data has been read from the hard disk drive 32 (at SEQ 60), the buffer task 62 requests the player task 61 to send information about data to be read next (at SEQ 61). According to this request, the player task 61 inquires of the database management task 63 about information of a content to be read next (at SEQ 62). According to the obtained content information, the player task 61 issues a data read command to the buffer task 62 (at SEQ 63).

According to the read command, the buffer task 62 reads the content data file 200 from the hard disk drive 32 (at SEQ 64 and SEQ 65) and analyzes the header information (at step S93). The analyzed header information is stored in the non-buffer memory area of the RAM 37. Audio data contained in the audio data portion 202 are stored in the buffer memory. After one content data file 200 has been read from the hard disk drive 32 (at SEQ 66) and whole audio data of the content data file 200 have been stored in the buffer memory, the buffer task 62 requests the player task 61 to send information of data to be read next (at SEQ 67). This process is repeated until the buffer memory does not have enough space for the next audio data.

Figure 35A:
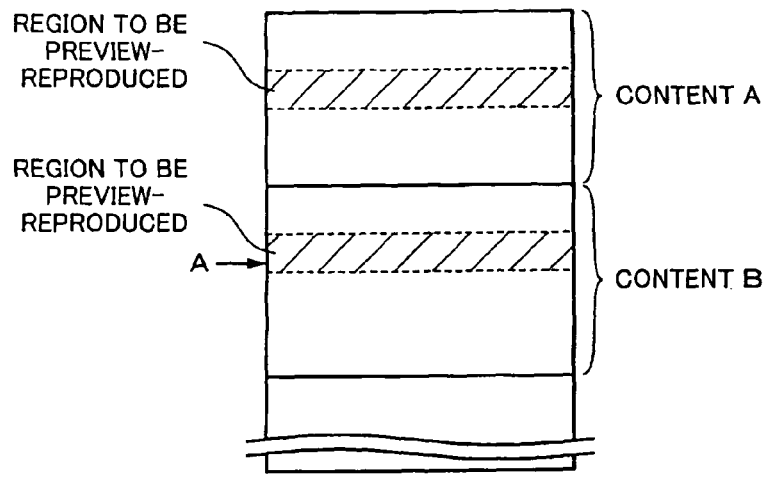
FIGS. 35A-35C are schematic diagrams describing a process that changes the preview reproduction to the normal reproduction in a second preview reproduction control method.

3-3-2. Operation That Changes Preview Reproduction Mode to Normal Reproduction Mode Next, with reference to FIG. 35, an example in which two operations in the case that the reproduction mode is changed from the preview reproduction mode to the normal reproduction mode described with reference to FIG. 8 are applied to the second preview reproduction control method will be described. In the second preview reproduction control method, whole audio data are stored in the buffer memory. As shown in FIG. 35A, it is assumed that content A and content B have been stored in the buffer memory and the normal reproduction has been designated at position A of a region to be preview-reproduced (hatched region) of content B.

Figure 35B:
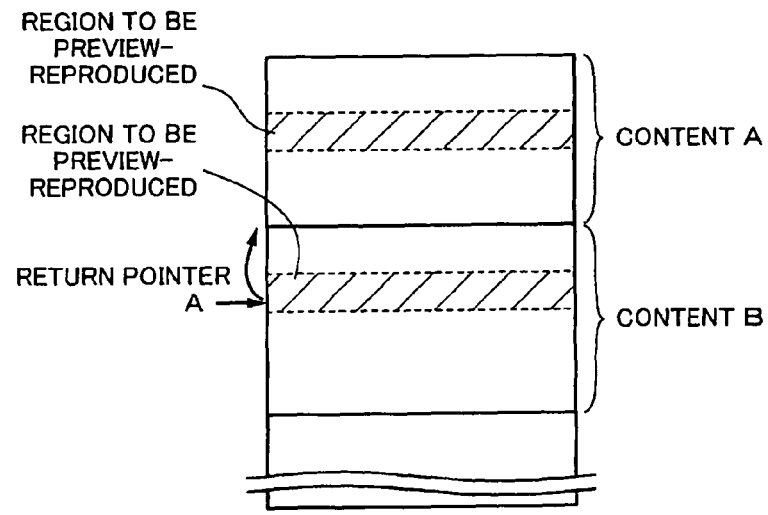
Figure 35C:
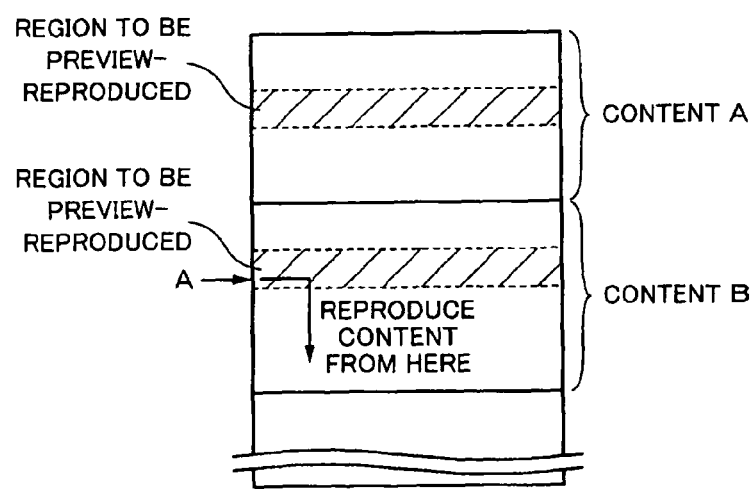

As exemplified in FIG. 35B, the first method of starting reproducing audio data that have been preview-reproduced from the beginning can be accomplished by moving the read pointer to the beginning of the audio data, which have been preview-reproduced. The second method of resuming the reproduction for audio data from the position at which the preview reproduction has been stopped can be accomplished by moving the read pointer immediately after the position at which it has been placed in the preview reproduction mode as shown in FIG. 35C.

As described above, in the second preview reproduction control method, when the preview reproduction is performed, whole audio data are stored in the buffer memory as in the normal reproduction mode. Thus, the efficiency of the buffer memory in the second preview reproduction control method is inferior to that in the first preview reproduction control method. However, as an advantage of the second preview reproduction control method, since whole audio data are stored in the buffer memory, the preview reproduction mode can be easily changed to the normal reproduction mode.

Figure 36:
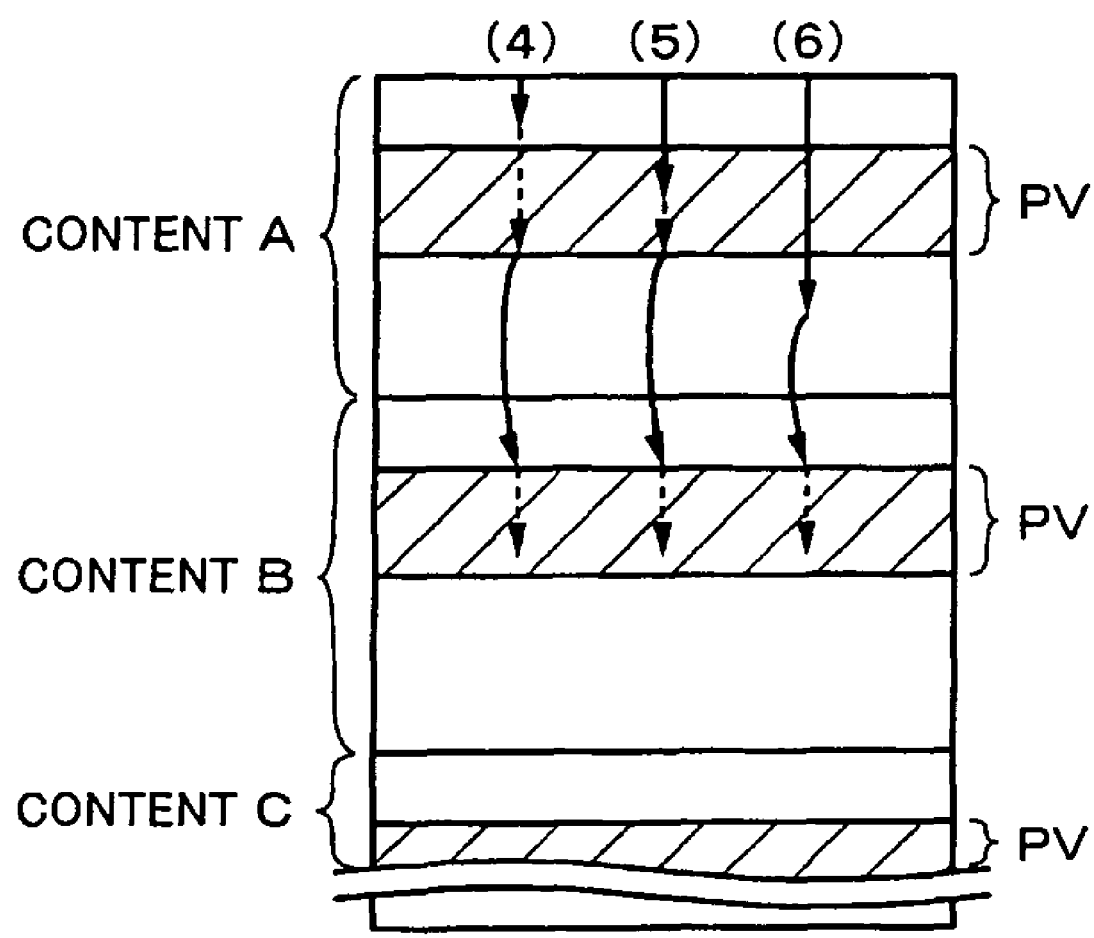
FIG. 36 is a schematic diagram describing a process that changes the normal reproduction to the preview reproduction in the second preview reproduction control method.

Next, the operation that changes the normal reproduction mode to the preview reproduction mode will be described. As described above, in the second preview reproduction control method, regardless of whether the reproduction mode is the normal reproduction mode or the preview reproduction mode, whole audio data are stored in the buffer memory. Thus, as exemplified in FIG. 36, (4) when the reproduction mode is changed before region PV to be preview-reproduced, (5) when the reproduction mode is changed in region PV to be preview-reproduced, and (6) when the reproduction mode is changed after region PV to be preview-reproduced, the reproduction mode can be changed from the normal reproduction mode to the preview reproduction mode only by moving the read pointer.

As described with reference to FIG. 19, while a content is being reproduced in the normal reproduction mode, the reproduction mode may be changed to the preview reproduction mode. While the content is being reproduced in the preview reproduction mode, the reproduction mode may be changed to the normal reproduction mode. The normal reproduction for the content may be resumed from the position at which the normal reproduction mode has been changed to the preview reproduction mode. Next, the buffer memory control in the second preview reproduction control method that considers this case will be described with reference to FIG. 37.

Figure 37A:
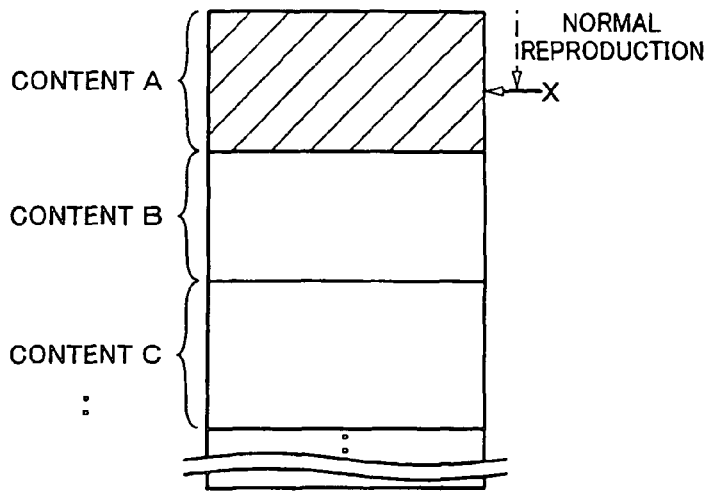
FIGS. 37A-37C are schematic diagrams describing a process that resumes the normal reproduction after the preview reproduction in the second preview reproduction control method.

In the normal reproduction mode, as exemplified in FIG. 37A, whole content data (contents A, B, C, and so forth) are stored from the beginning of the buffer memory. It is assumed that when content A has been reproduced from the beginning to position X in the normal reproduction mode, the reproduction mode is changed from the normal reproduction mode to the preview reproduction mode.

When the reproduction mode is changed to the preview reproduction mode, the reproduction for content A in the normal reproduction mode is stopped and stop position X is stored. In addition, content data (contents P, Q, and so forth) to be preview-reproduced are read from the hard disk drive 32 and stored in the buffer memory.

Figure 37B:
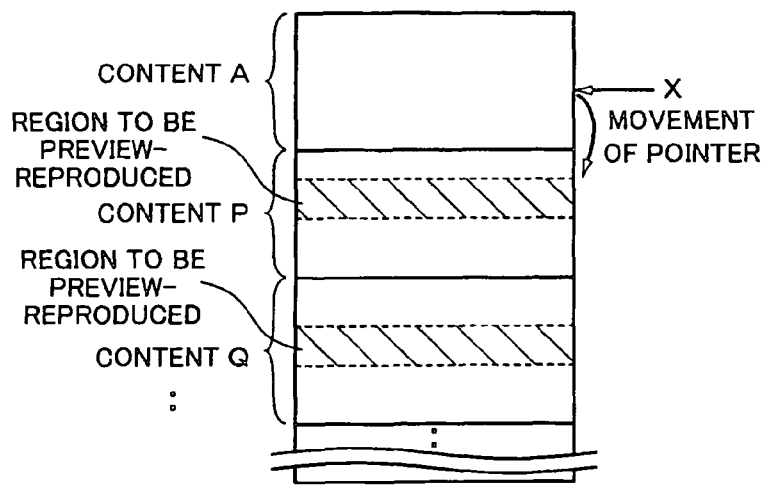

At this point, as exemplified in FIG. 37B, data of a content (in the example shown in FIG. 37, content A) reproduced in the normal reproduction mode immediately before the normal reproduction mode has been changed to the preview reproduction mode is left in the buffer memory. Content data (contents P, Q, and so forth) to be preview-reproduced are stored after data of content A left in the buffer memory in the order of contents to be preview-reproduced. In the second preview reproduction control method, whole content data to be preview-reproduced are read from the hard disk drive 32 and stored in the buffer memory.

When the first data (in the example shown in FIG. 37, content P) to be preview-reproduced have been read to the buffer memory, the read pointer is moved from position X at which the reproduction for content A was stopped to the first data to be preview-reproduced, namely the beginning of a region to be preview-reproduced of content P.

Figure 37C:
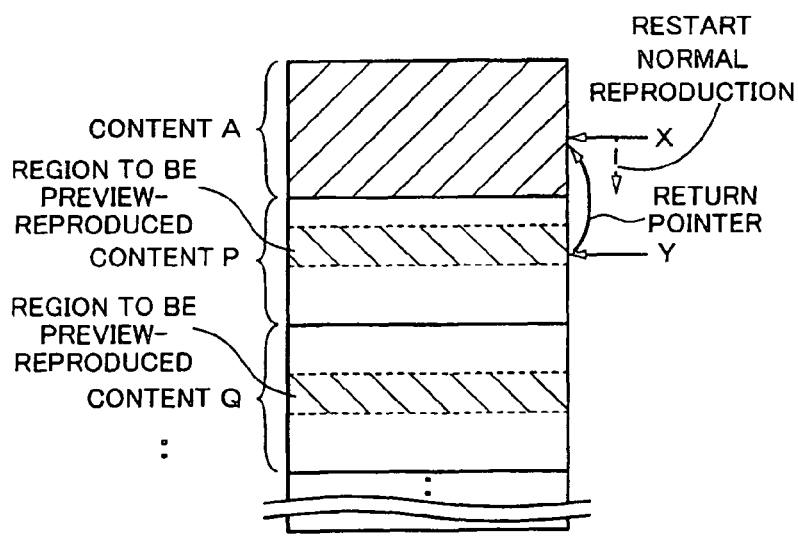

As exemplified in FIG. 37C, when the preview reproduction is stopped at for example position Y and the reproduction for a content (content A) that had been reproduced in the normal reproduction mode immediately before the reproduction mode was changed to the preview reproduction mode is resumed, the read pointer is moved from position Y to position X. Content A left in the buffer memory is reproduced from position X.

When the preview reproduction is stopped and the reproduction for content A is resumed, content data (not shown) to be reproduced after content A can be read from the hard disk drive 32. In this case, content data that have been read are overwritten to contents P, Q, and so forth to be preview-reproduced stored in the buffer memory and stored after content A whose reproduction has been resumed.

4. Modification of Embodiment of Present Invention 4-1. Obtainment of Region to be Preview-Reproduced From External Next, a modification of the foregoing embodiment of the present invention will be described. In the foregoing embodiment, it is assumed that a region to be preview-reproduced is fixed. However, the present invention is not limited to such an example. According to a modification of the foregoing embodiment of the present invention, information that represents a region to be preview-reproduced is correlated with a content so that the region to be preview-reproduced can be designated for each content.

Figure 38:
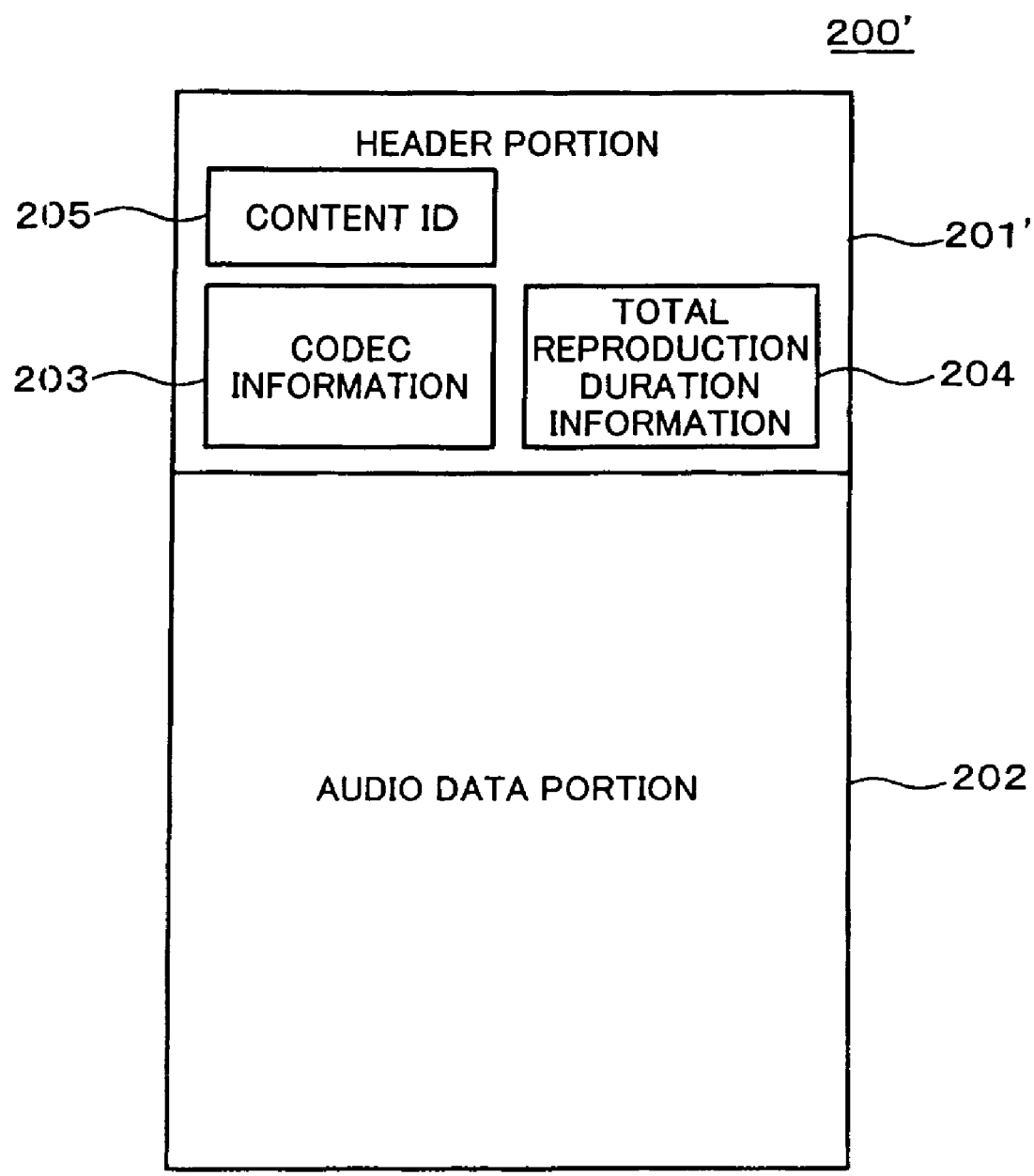
FIG. 38 is a schematic diagram showing an example of the structure of a content data file whose header portion contains a content ID.

For example, as shown in FIG. 38, a content ID 205 that identifies a content is contained in a header portion 201' of a content data file 200'. For example, the music server 4 side pre-describes a content ID in the content data file 200' to be downloaded.

The content ID is not restricted as long as it can uniquely identify a content. When the file name of the content data file 200' is unique, the file name may be used as the content ID. In this case, it is not necessary to describe the content ID in the header portion 201'. In addition, file size information may be used as the content ID.

The music server 4 correlatively stores the content ID and a region to be preview-reproduced. When the content data file 200' is downloaded to the PC 2, the music server 4 transmits information about a region to be preview-reproduced in which the content data are correlated with the content ID to the PC 2 along with the content data file 200'. The PC 2 transfers both the downloaded content data file 200' and the information about the region to be preview-reproduced correlated with the content data file 200' to the reproduction apparatus 1.

When the reproduction apparatus 1 has received the content data file 200' from the PC 2, the reproduction apparatus 1 analyzes the header portion 201', obtains the content ID therefrom, correlates the obtained content ID and the information about the region to be preview-reproduced received along with the content data file 200', and manages them as a table.

FIG. 39 shows an example of a table of information about a region to be preview-reproduced, the table correlating content IDs and regions to be preview-reproduced. In the example shown in FIG. 39, the start position of a region to be preview-reproduced is represented by the reproduction duration for audio data from the beginning. The reproduction duration is correlated with the content ID. In the content data file 200' whose content ID is "xxx01," the position at which 30 seconds have elapsed from the start position of the audio data portion 202 is the start position of a region to be preview-reproduced. Likewise, in the content data file 200' whose content ID is "xxx02," the position at which one minute has elapsed from the beginning of the audio data portion 202 is the start position of a region to be preview-reproduced. In addition, the information about a region to be preview-reproduced may contain the length of the region to be preview-reproduced or the end position of the region to be preview-reproduced.

It is preferred that a region to be preview-reproduced represented by information about the region to be preview-reproduced be selected as a portion that represents a feature of the corresponding content because the user can easily search for his or her desired content in the preview reproduction.

Figure 40:
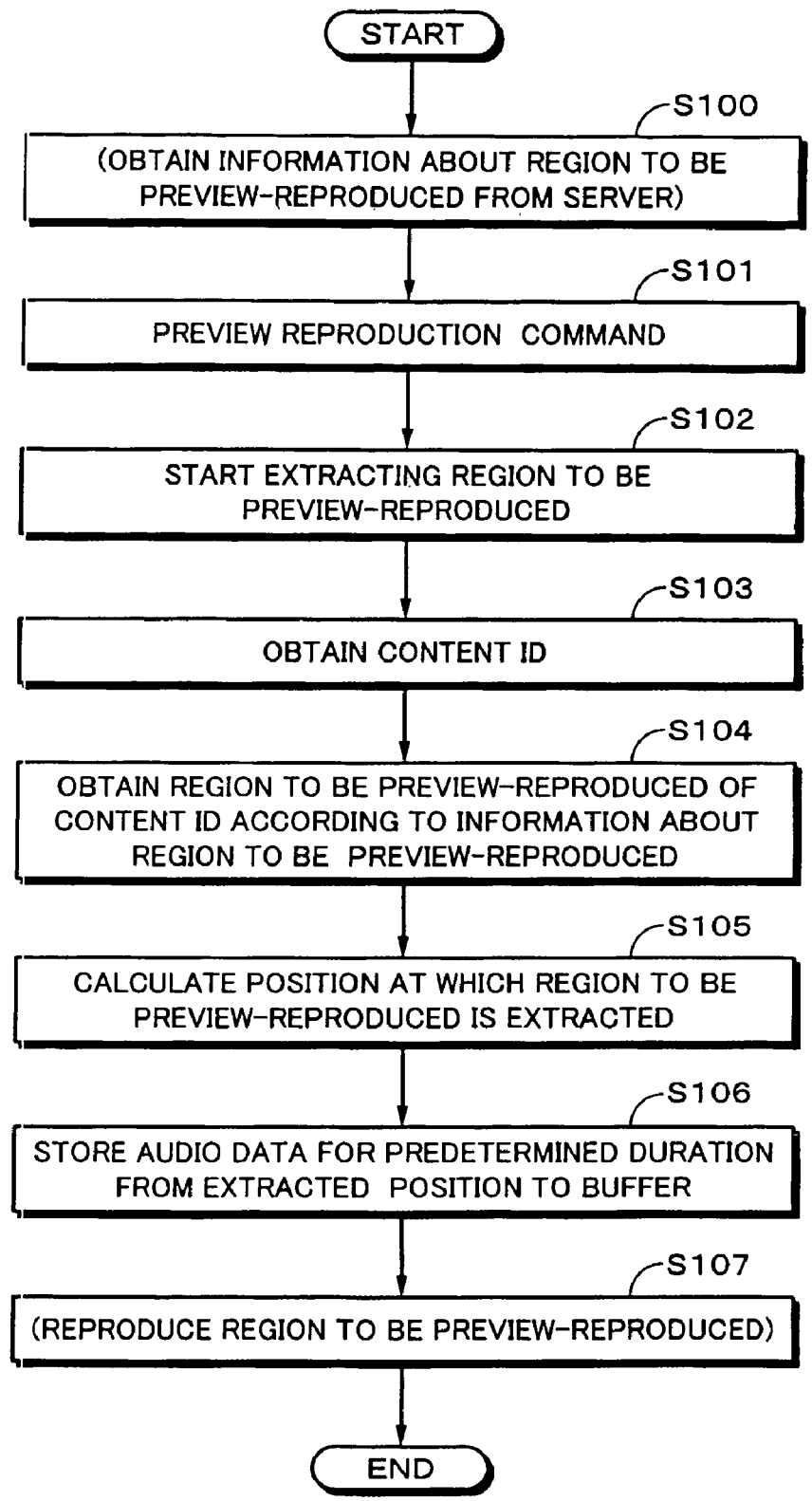
FIG. 40 is a flow chart showing an example of a preview reproduction process that uses information about a region to be preview-reproduced.

FIG. 40 is a flow chart showing an example of the preview reproduction process that uses the information about a region to be preview-reproduced. In this example, the preview reproduction of the reproduction apparatus 1 is performed by storing only a portion corresponding to a region to be preview-reproduced of audio data to the buffer memory according to the first preview reproduction control method.

The reproduction apparatus 1 side pre-obtains information about a region to be preview-reproduced of audio data to be preview-reproduced for example by downloading the information from the music server 4 (at step S100). It is not necessary to download the information about the region to be preview-reproduced from the music server 4 along with the corresponding audio data to be preview-reproduced. In other words, only the information about the region to be preview-reproduced may be downloaded from the music server 4 according to the content ID. The obtained information about the region to be preview-reproduced is described in a table of information about the region to be preview-reproduced exemplified in FIG. 39 so that the region to be preview-reproduced is correlated with the content ID. The table of information about the region to be preview-reproduced is recorded in for example the hard disk drive 32 of the reproduction apparatus 1.

It is assumed that the user operates the discovery key 14 of the operation section 20 to preview-reproduce a particular content (content P) (at step S101). A command corresponding to this operation is sent from the UI task 60 to the player task 61. The player task 61 inquires of the database management task 63 about information of content P to be preview-reproduced. The database management task 63 returns information corresponding to the inquiry to the player task 61. The player task 61 designates the content data file 200' that the buffer task 62 needs to read from the hard disk drive 32 according to the information returned from the database management task 63.

When the buffer task 62 has read the content data file 200', the buffer task 62 starts an extraction process for the region to be preview-reproduced of the content data file 200' (at step S102). First, the buffer task 62 analyzes the header portion 201' of the content data file 200' and obtains the content ID 205 (at step S103). Thereafter, the buffer task 62 references the table of information about the region to be preview-reproduced according to the obtained content ID and obtains the information about the region to be preview-reproduced corresponding to the content ID (at step S104).

The buffer task 62 obtains the reproduction duration per frame of the main part of the audio data contained in the content data file 200' according to the analyzed result of the header portion 201', for example information that represents the frame size described in the codec information 203 and information of the bit rate at which audio data have been compression-encoded.

At the next step, S105, the buffer task 62 calculates the offset of the start position of the preview reproduction from the beginning of the audio data portion 202 according to the reproduction duration per frame and the information about the region to be preview-reproduced obtained according to the content ID at step S104. For example, a frame close to the calculated value of (time information of information about the region to be preview-reproduced)/(reproduction duration per frame) is treated as the offset. In addition, the buffer task 62 calculates the data size (the number of frames) necessary to reproduce content data for a predetermined duration (in this example, 30 seconds) according to the information of the reproduction duration pre frame.

As described above, the information about the region to be preview-reproduced may contain the duration for the preview reproduction. In this case, the buffer task 62 calculates the data size of audio data to be preview-reproduced with information described in the table of information about the region to be preview-reproduced corresponding to the content ID of audio data.

After the offset from the beginning of the file of the audio data portion 202 and the data size of the region to be preview-reproduced have been obtained, the flow advances to step S106. At step S106, according to the obtained information, audio data are read from the hard disk drive 32. In other words, at step S106, the content data file 200' in the hard disk drive 32 is accessed. Audio data are read from the data size of the region to be preview-reproduced from the position of the offset obtained at step S105. The audio data that have been read are stored in the buffer memory.

After audio data stored in the buffer memory exceed a predetermined amount, the buffer task 62 informs the decoder control task 65 of this situation. When the decoder control task 65 has been informed of this situation, the decoder control task 65 reads audio data from the buffer memory and supplies the audio data to the decoder control section 67. The decoder control section 67 reproduces audio data of the region to be preview-reproduced (at step S107).

When the content ID, which identifies a content, and the region to be preview-reproduced of the content are correlated in such a manner, the music server 4 side can designate an optimum preview region for each content. In addition, the user side can more accurately select his or her desired content by the preview reproduction.

4-2. Another System of Modification of Embodiment

Figure 41:
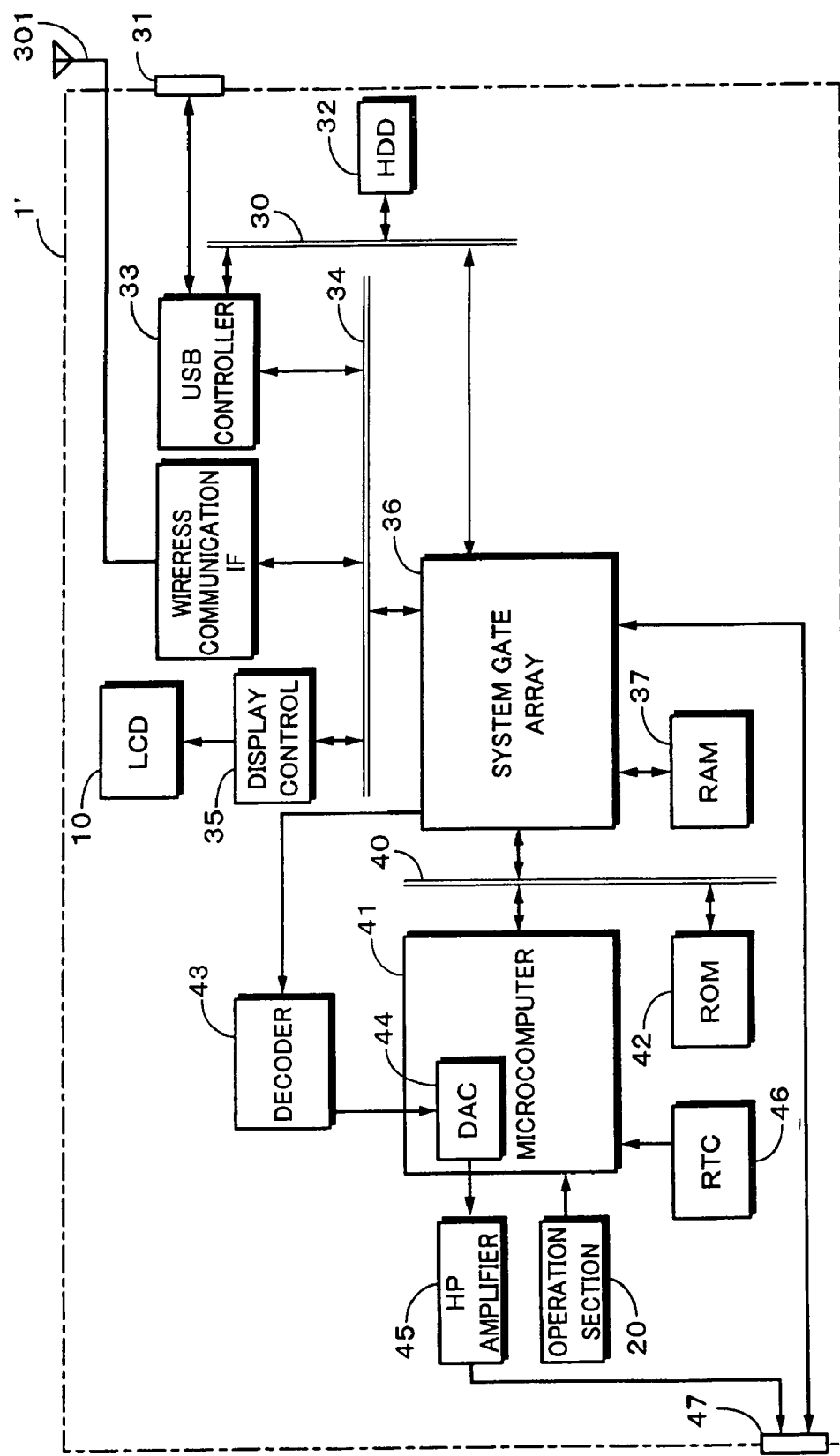
FIG. 41 is a block diagram showing an example of the structure of a reproduction apparatus that has a wireless communication I/F.

In the foregoing example, the information about the region to be preview-reproduced is supplied from the music server 4 to the reproduction apparatus 1 through the PC 2. However, the present invention is not limited to this example. For example, as exemplified in FIG. 41, a reproduction apparatus 1' may be composed of a wireless communication I/F 300 that controls a wireless data communication and an antenna 301 in addition to the structure of the reproduction apparatus 1 shown in FIG. 3. When the reproduction apparatus 1' communicates with an external point through the antenna 301, the reproduction apparatus 1' can obtain information about the region to be preview-reproduced.

Although the communication system applicable to the wireless communication I/F 300 is not restricted, a communication system based on for example IEEE (Institute Electrical and Electronics Engineers) 802.11 standard may be used.

Figure 42:
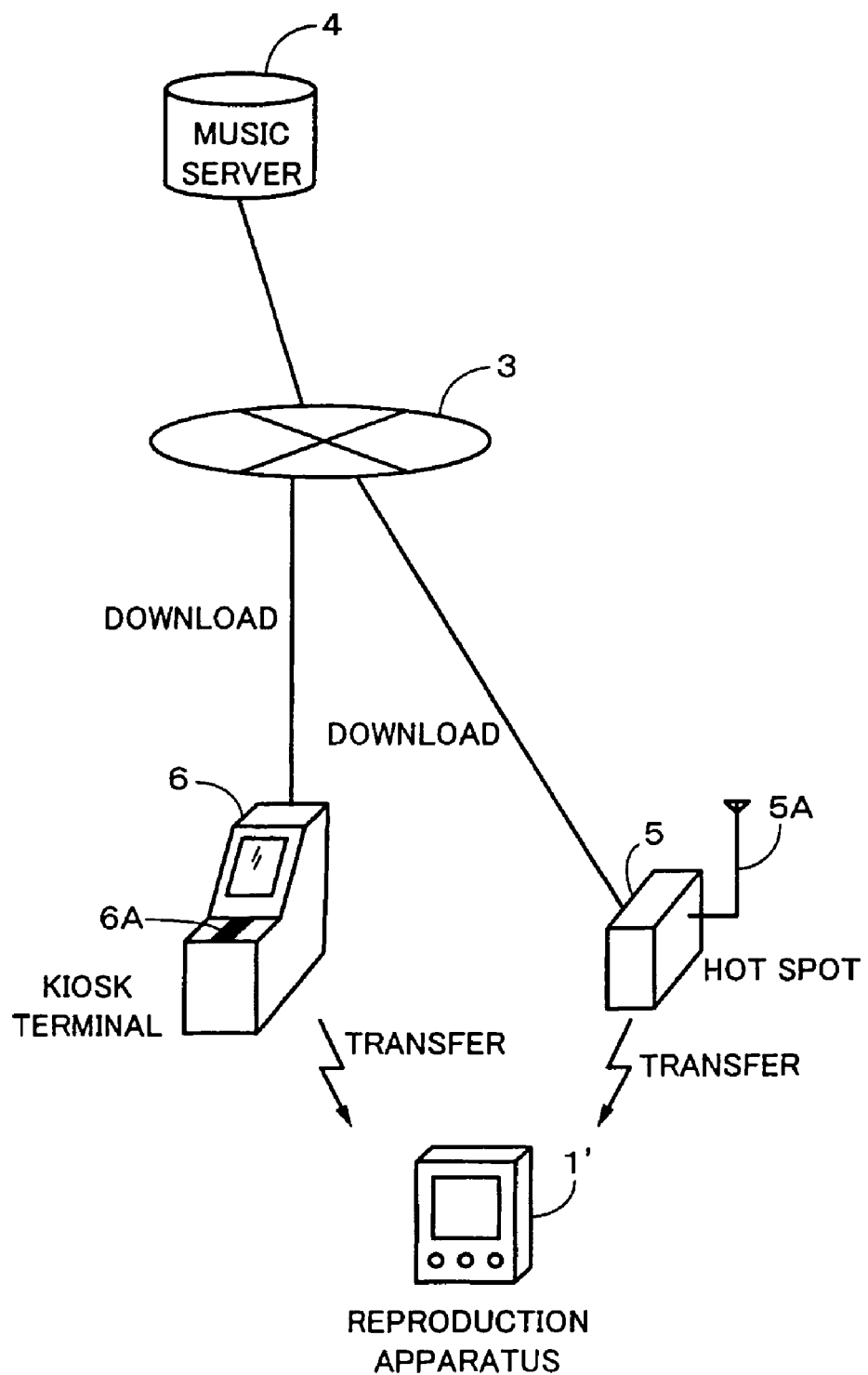
FIG. 42 is a schematic diagram showing an example of an application of which the reproduction apparatus obtains the information about a region to be previewed-reproduced is obtained through a wireless communication.

FIG. 42 shows an example of an application of the reproduction apparatus 1' that obtains information about the region to be preview-reproduced through a wireless communication. It is assumed that content data obtained from the music server 4 through the PC 2 have been recorded in the reproduction apparatus 1'. A terminal 5 is a wireless terminal that provides a hot spot service. The terminal 5 is connected to the Internet 3. In addition, the terminal 5 has a wireless LAN (Local Area Network) communication function. The hot spot service is a service that locally provides an Internet connectable environment using a wireless LAN. The terminal 5 is installed at public facilities such as stations, airports, retailer stores that provide the hot spot service, and so forth. The terminal 5 can communicate with a computer device that can communicate using the wireless LAN through an antenna SA.

An information terminal device 6 is installed at for example large-scale stores and so-called convenience stores and connected to a predetermined network. When the user operates the information terminal device according to a menu displayed on the screen, he or she can obtain the selected information. The information terminal device 6 can wirelessly exchange data with the reproduction apparatus 1' through a communication section 6A. When the user operates the information terminal device, he or she can wirelessly obtain information through the reproduction apparatus 1'.

It is assumed that the reproduction apparatus 1' has stored the URL (Uniform Resource Locator) of the music server 4 in for example the ROM 42. When the reproduction apparatus 1' downloads the content data file 200' from the music server 4, the reproduction apparatus 1' obtains the content ID 205 from the header portion 201' of the content data file 200' and describes only the content ID 205 in the table of information about the region to be preview-reproduced. Instead, a list of content IDs 205 may be separately created. Instead, the content ID 205 may be described in the attribute information table.

When the user uses the terminal 5, he or she enters in the wireless communication area of the terminal 5 with the reproduction apparatus 1'. When the user performs a predetermined operation with the operation section 20 of the reproduction apparatus 1', the reproduction apparatus 1' communicates with the terminal 5.

When the reproduction apparatus 1' has established a communication with the terminal 5, the reproduction apparatus 1' communicates with the music server 4 through the Internet 3. For example, the reproduction apparatus 1' transmits a list of content IDs 205 not correlated with information about the region to be preview-reproduced of contents recorded in the hard disk drive 32 to the music server 4 through the terminal 5 according to information of the table of information about the region to be preview-reproduced. The music server 4 searches for information about the region to be preview-reproduced corresponding to the content ID 205 contained in the list, correlates the information about the region to be preview-reproduced and the content IDs 205, and transmits correlated data. The transmitted information about the region to be preview-reproduced is received by the terminal 5. The terminal 5 wirelessly transfers the information about the region to be preview-reproduced to the reproduction apparatus 1'.

When the information terminal device 6 is used, since it has a display section and an operation section, the user can select information about the region to be preview-reproduced to be downloaded and can be easily charged with the information about the region to be preview-reproduced that is downloaded.

For example, when the user approaches the reproduction apparatus 1' to the information terminal device 6 and operates the information terminal device 6 in a predetermined manner, the reproduction apparatus 1' communicates with the information terminal device 6. When the reproduction apparatus 1' has established a communication with the information terminal device 6, the information terminal device 6 requests the reproduction apparatus 1' to send the table of information about the region to be preview-reproduced and information of the attribute information table. With the information transmitted from the reproduction apparatus 1' according to the request, the information terminal device 6 displays a list of content names corresponding to the content ID 205 on the display section. The user selects a content of information about the region to be preview-reproduced that he or she wants to download with the operation section of the information terminal device 6 according to the list displayed on the display section. The content ID 205 of the selected content is transmitted from the information terminal device 6 to the music server 4 through the Internet 3. The music server 4 searches for information about the region to be preview-reproduced corresponding to the received content ID 205 and transmits the obtained information about the region to be preview-reproduced to the information terminal device 6 through the Internet 3. The information terminal device 6 transfers the received information about the region to be preview-reproduced to the reproduction apparatus 1'.

When the reproduction apparatus 1' having the wireless communication function is used, as long as the foregoing hot spot terminal 5 or the information terminal device 6 is installed, even if there is no PC 2 connected to the Internet 3, contents can be downloaded from the music server 4.

5. Another Modification of Embodiment of Present Invention

Next, another modification of the foregoing embodiment of the present invention will be described. In the foregoing embodiment and the foregoing modification thereof, the reproduction apparatus 1' or the reproduction apparatus 1' has the hard disk drive 32 as a record medium. Content data downloaded from the music server 4 are recorded to the hard disk drive 32. However, the present invention is not limited to this example.

Figure 43:
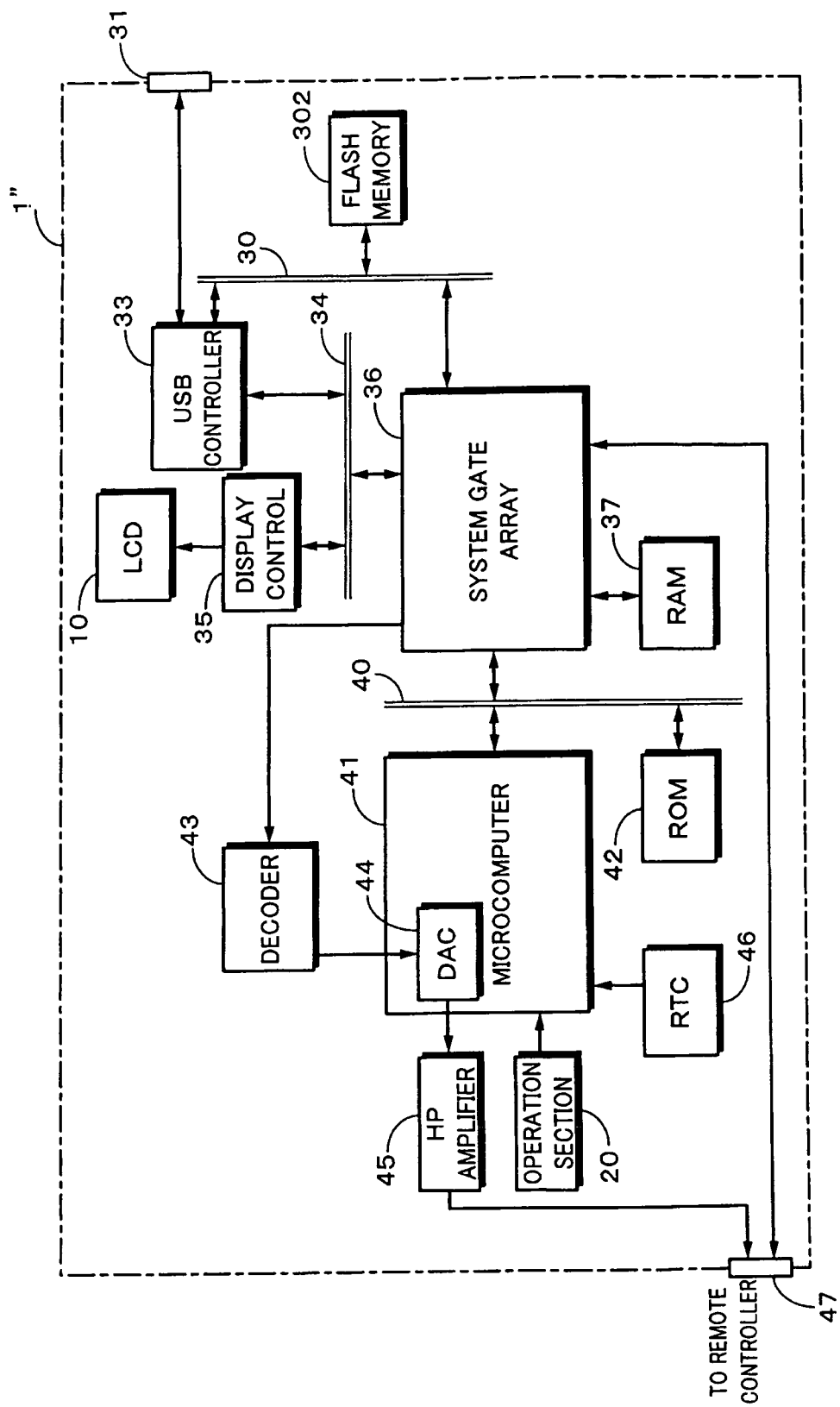
FIG. 43 is a block diagram showing an example of the structure of the reproduction apparatus that uses a rewritable ROM as a record medium.

As exemplified in FIG. 43, a rewritable memory such as a flash memory 302 can be used as a record medium on which content data are recorded. The flash memory has a faster access speed than the hard disk drive 32 and has no mechanical parts. Thus, the flash memory has a resistance against vibrations. In addition, the flash memory has a lower power consumption than the hard disk drive 32. Thus, when audio data stored in the flash memory 302 are directly accessed, the preview reproduction can be accomplished. In this case, the preview reproduction control may be performed according to the foregoing second preview reproduction control method.

FIG. 43 shows that the flash memory 302 is disposed in the reproduction apparatus 1". Instead, the flash memory 302 may be attachable to the reproduction apparatus 1". When the flash memory 302 can be attached to the reproduction apparatus 1", content data may be recorded to the flash memory 302 outside the reproduction apparatus 1'. Thereafter, the flash memory 302 may be attached to the reproduction apparatus 1". In this case, the USB controller 33 and the USB connector 31 may be omitted from the structure of the reproduction apparatus 1".

In the foregoing example, contents are described as audio data. However, the present invention is not limited to this example. In other words, according to the present invention, as long as contents contain time information and the information chronologically varies, the present invention can be applied to other types of contents. For example, contents may be video data. In this case, the reproduction apparatus 1 has a decoder for video data. Video data that have been compression-encoded are downloaded and recorded to the hard disk drive 32 or the like. The video data are decoded and displayed on the display section 10. Also, contents may be musical instrument command information such as MIDI (Musical Instrument Digital Interface) data. In this case, the reproduction apparatus 1 may have a sound source circuit according to the MIDI.

Obviously numerous additional modifications and variations are possible in light of the above teachings. It is therefore to be understood that within the scope of the appended claims, the disclosure of this patent specification may be practiced in ways other than those specifically described herein.

The invention claimed is:

1. A reproduction apparatus, comprising:
a reproduction section configured to reproduce first content data;
an input section configured to accept an operation to search for content information data associated with the first content data;
a control section configured to search the content information data when the first content data is being reproduced and to control the reproduction section to reproduce at least a part of second content data corresponding to the content information data; and
a display section configured to display a plurality of pieces of the content information data and a cursor;
wherein the control section is further configured to control the reproduction section to reproduce at least a part of the second content data corresponding to a piece of the content information data when it has been determined that the cursor has been placed at a position of the piece of the content information data for a predetermined time period or longer,
wherein the control section controls the display section to display a list of content identification data corresponding to a piece of other content information data when it has determined that the cursor has been placed at the position of the piece of the other content information data for a predetermined time period or longer, and
wherein the control section controls the cursor to move from a content identification data to next content identification data on a list when a reproduction of the part of content data corresponding to the content identification data is completed.

2. The reproduction apparatus as set forth in claim 1, wherein the control section is further configured to keep reproducing the first content data before the part of the second content data is started to be reproduced.

3. The reproduction apparatus as set forth in claim 1, wherein when the control section has determined that the cursor has been placed at the position of the piece of the content information data for the predetermined time period, the control section controls the reproduction section to reproduce at least a part of the second content data corresponding to the piece of the content information, and then starts reproducing a part of third content data corresponding to a piece of a next content information data.

4. The reproduction apparatus as set forth in claim 3, wherein the control section searches plural pieces of content data corresponding to the content information data and controls the reproduction section to reproduce plural parts of the content data continuously.

5. The reproduction apparatus as set forth in claim 4, wherein the control section controls the reproduction section to reproduce content data corresponding to next content information data after reproduction of all content data corresponding to the content information data.

6. The reproduction apparatus as set forth in claim 3, wherein the piece of content information data includes artist information.

7. The reproduction apparatus as set forth in claim 6, wherein the control section is further configured to control the cursor to move from the content information data to next other information data when reproduction of all content data corresponding to the content information data is finished.

8. The reproduction apparatus as set forth in claim 1, wherein the control section starts counting the predetermined time period when the cursor stops at the position of a piece of the other content information data.

9. The reproduction apparatus as set forth in claim 1, wherein the control section controls the reproduction section to reproduce a part of content data in an order of a higher rating thereof.

10. The reproduction apparatus as set forth in claim 9, wherein the rating is based on a reproduction history of the content data in the reproduction section.

11. The reproduction apparatus as set forth in claim 1, wherein the control section controls the reproduction section to start reproducing a part of content data in descending order of release dates thereof.

12. The reproduction apparatus as set forth in claim 1, wherein while the reproduction section is reproducing a part of content data, when an operation is determined, the control section controls the reproduction section to start reproducing the whole content data whose part has been reproduced.

13. The reproduction apparatus as set forth in claim 1, wherein the control section controls the reproduction section to reproduce a part of the other content information data based on a preview reproduction start position information.

14. The reproduction apparatus as set forth in claim 13, wherein the control section reads the preview reproduction start position information from a header of an other content data corresponding to the other content information data.

15. A reproduction apparatus, comprising:
a reproduction section configured to reproduce first content data;
an input section configured to accept an operation to search for content information data associated with the first content data;
a control section configured to search the content information data when the first content data is being reproduced and to control the reproduction section to reproduce at least a part of second content data corresponding to the content information data; and
a display section configured to display a plurality of pieces of the content information data and a cursor;
wherein the control section is further configured to control the reproduction section to reproduce at least a part of the second content data corresponding to a piece of the content information data when it has been determined that the cursor has been placed at a position of the piece of the content information data for a predetermined time period or longer,
wherein the reproduction apparatus has a first reproduction mode in which the reproduction section reproduces a part of the content data and a second reproduction mode in which the reproduction section reproduces the whole content data, and
wherein the control section starts counting the predetermined time period when the first reproduction mode is selected.

16. A reproduction method, comprising:
reproducing first content data in a reproduction section;

accepting an operation to search for content information data associated with the first content data;
searching the content information data when the first content data is being reproduced; and
reproducing at least a part of second content data corresponding to the content information data;
displaying, in a display section, a plurality of pieces of the content information data and a cursor;
controlling the reproduction section to reproduce at least a part of the second content data corresponding to a piece of the content information data when it has been determined that the cursor has been placed at a position of the piece of the content information data for a predetermined time period or longer;
controlling the display section to display a list of content identification data corresponding to a piece of other content information data when it has determined that the cursor has been placed at the position of the piece of the other content information data for a predetermined time period or longer; and
controlling the cursor to move from a content identification data to next content identification data on a list when a reproduction of the part of content data corresponding to the content identification data is completed.

17. A reproduction apparatus, comprising:
means for reproducing first content data;
means for accepting an operation to search for content information data associated with the first content data;
means for searching the content information data when the first content data is being reproduced, and controlling the means for reproducing to reproduce at least a part of second content data corresponding to the content information data, and
means for displaying a plurality of pieces of the content information data and a cursor;
wherein the means for searching and controlling further controls the means for reproducing to reproduce at least a part of the second content data corresponding to a piece of the content information data when it has been determined that the cursor has been placed at a position of the piece of the content information data for a predetermined time period or longer,
wherein the means for searching and controlling controls the means for displaying to display a list of content identification data corresponding to a piece of other content information data when it has determined that the cursor has been placed at the position of the piece of the other content information data for a predetermined time period or longer,
wherein the means for searching and controlling controls the cursor to move from a content identification data to next content identification data on a list when a reproduction of the part of content data corresponding to the content identification data is completed.

* * * * *